United States Patent
Ito et al.

(10) Patent No.: US 11,423,924 B2
(45) Date of Patent: Aug. 23, 2022

(54) SIGNAL ANALYSIS DEVICE FOR MODELING SPATIAL CHARACTERISTICS OF SOURCE SIGNALS, SIGNAL ANALYSIS METHOD, AND RECORDING MEDIUM

(71) Applicant: NIPPON TELEGRAPH AND TELEPHONE CORPORATION, Tokyo (JP)

(72) Inventors: Nobutaka Ito, Soraku-gun (JP); Tomohiro Nakatani, Soraku-gun (JP); Shoko Araki, Soraku-gun (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 137 days.

(21) Appl. No.: 16/971,695

(22) PCT Filed: Feb. 1, 2019

(86) PCT No.: PCT/JP2019/003671
§ 371 (c)(1),
(2) Date: Aug. 21, 2020

(87) PCT Pub. No.: WO2019/163487
PCT Pub. Date: Aug. 29, 2019

(65) Prior Publication Data
US 2020/0411031 A1 Dec. 31, 2020

(30) Foreign Application Priority Data

Feb. 23, 2018 (JP) .............................. JP2018-030701
Jul. 13, 2018 (JP) .............................. JP2018-133592
Aug. 31, 2018 (JP) .............................. JP2018-164051

(51) Int. Cl.
*G10L 21/0308* (2013.01)
*G06F 17/16* (2006.01)
(Continued)

(52) U.S. Cl.
CPC .......... *G10L 21/0308* (2013.01); *G06F 17/16* (2013.01); *G06V 10/75* (2022.01); *G10L 21/0264* (2013.01)

(58) Field of Classification Search
CPC ...................................................... G06F 17/16
See application file for complete search history.

(56) References Cited

U.S. PATENT DOCUMENTS

2014/0056435 A1* 2/2014 Kjems .................... H04R 3/005
381/317
2017/0140771 A1* 5/2017 Taniguchi ............... G10L 15/05
(Continued)

OTHER PUBLICATIONS

International Search Report and Written Opinion dated Apr. 23, 2019 for PCT/JP2019/003671 filed on Feb. 31, 2019, 8 pages including English Translation of the International Search Report.
(Continued)

*Primary Examiner* — Douglas Godbold
(74) *Attorney, Agent, or Firm* — Xsensus LLP

(57) ABSTRACT

A signal analysis device includes a memory and processing circuitry coupled to the memory and configured to obtain, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a simultaneous decorrelation matrix P as a matrix in which all $P^H R_j P$ are diagonal matrices, or/and Hermitian transposition $P^H$ thereof, as a parameter for decorrelating components corresponding to the J source signals for observation signal vectors based on observation signals acquired at I (I is an integral number equal to or larger than 2) different positions.

20 Claims, 21 Drawing Sheets

(51) Int. Cl.
*G10L 21/0264* (2013.01)
*G06V 10/75* (2022.01)

(56) References Cited

U.S. PATENT DOCUMENTS

2017/0347206 A1* 11/2017 Pedersen ............... H04R 3/005
2019/0191259 A1* 6/2019 Wang .................... G10L 25/21
2019/0267019 A1* 8/2019 Ito ...................... G10L 21/0272
2019/0318757 A1* 10/2019 Chen ...................... G10L 17/04

OTHER PUBLICATIONS

Duong, N.Q.K., et al., "Under-Determined Reverberant Audio Source Separation Using a Full-Rank Spatial Covariance Model," IEEE Transactions on Audio, Speech, and Language Processing, vol. 18, No. 7, Sep. 2010, pp. 1830-1840.

Ito, N. and Nakatani, T., "FASTFCA-AS: Joint Diagonalization Based Acceleration of Full-Rank Spatial Covariance Analysis for Separating Any Number of Sources," arXiv preprint, May 24, 2018, 5 pages.

Ito, N. and Nakatani, T., "Multiplicative Updates and Joint Diagonalization Based Acceleration for Under-Determined BSS Using a Full-Rank Spatial Covariance Model," Proceeding of 2018 EEE Global Conference on Signal and Information Processing (GlobalSIP), Nov. 2018, pp. 231-235.

Ito, N. and Nakatani, T., FASTFCA-AS: Joint Diagonalization Based Acceration of Full-Rank Spatial Covariance Analysis for Separating Any Number of Sources, International Workshop on Acoustic Signal Enhancement (IWAENC2018), Tokyo, Japan, Sep. 2018, pp. 151-155.

Ito, N., et al., "FASTFCA: A Joint Diagonalization Based Fast Algorithm for Audio Source Separation Using a Full-Rank Spatial Covariance Model," arXiv preprint, May 17, 2018, 5 pages.

Ito, N., et al., "FastFCA: Acceleration of Sound Source Categorization Methods that Use Time-Varying Complex Gaussian Distributions Based on Simultaneous Diagonalization of Spatial Covariance Matrices," Proceedings of the 2018 Spring Meeting of the Acoustical Society of Japan, Feb. 27, 2018, pp. 427-430 (with English Translation).

Ito, N., et al., "FastFCA: Joint Diagonalization Based Acceleration of Audio Source Separation Using a Full-Rank Spatial Covariance Model," 2018 26th European Signal Processing Conference (EUSIPCO), Sep. 2018, pp. 1681-1685.

Ito, N., et al., "New application of the simultaneous diagonalization based on the problem of universalization eigenvalue: Speedup of the sound source separation," Program of the 14th Joint Meeting of Study Groups, The Japan Society for Industrial and Applied Mathematics, Mar. 12, 2018, 20 pages (with partial translation).

Ito, N. and Nakatani, T., Accepted Papers; FASTFCA-AS: Joint Diagonalization Based Acceleration of Full-Rank Spatial Covariance Analysis for Separating Any Number of Sources, International Workshop on Acoustic Signal Enhancement (IWAENC2018), http://www.iwaenc2018.org/abstracts/57798.html, Tokyo, Japan, Sep. 2018, 1 Page.

* cited by examiner

SIGNAL ANALYSIS DEVICE FOR MODELING SPATIAL CHARACTERISTICS OF SOURCE SIGNALS, SIGNAL ANALYSIS METHOD, AND RECORDING MEDIUM

CROSS-REFERENCE TO RELATED APPLICATIONS

The present application is based on PCT filing PCT/JP2019/003671, filed Feb. 1, 2019, which claims priority to JP 2018-030701, filed Feb. 23, 2018, JP 2018-133592, filed Jul. 13, 2018, and JP 2018-164051, filed Aug. 31, 2018, the entire contents of each are incorporated herein by reference.

TECHNICAL FIELD

The present invention relates to a signal analysis device, a signal analysis method, and a recording medium.

BACKGROUND ART

In the related art, there has been developed a method of estimating, in a situation in which two source signals are present in a mixed manner, a source signal component as a component derived from each of the source signals from a plurality of observation signals acquired at different positions.

CITATION LIST

[Non Patent Citation]
Non Patent Document 1: N. Q. K. Duong, E. Vincent and R. Gribonval, "Under-Determined Reverberant Audio Source Separation Using a Full-Rank Spatial covariance Model", IEEE Transactions on Audio, Speech, and Language Processing, vol. 18, no. 7, pp. 1830-1840, September 2010.

SUMMARY OF INVENTION

Technical Problem

The following describes a signal analysis device in the related art with reference to FIG. 24. FIG. 24 is a diagram illustrating a configuration of the signal analysis device in the related art. As illustrated in FIG. 24, a signal analysis device 1P in the related art includes a multichannel Wiener filter unit 10a. In a case of denoting a vector, a matrix, or a scalar A as "^A", "^A" is assumed to be equivalent to a "symbol with "^" added right above "A"".

The multichannel Wiener filter unit 10a calculates an estimation value of a source signal component based on an observation signal $y_i(k)$ (i is an index of the observation signal, and k is an index of a sample point), a variance parameter $v_j(k)$ (j is an index of a source signal) as a parameter for modeling a variance for each sample point of the source signal, and a spatial covariance matrix $R_j$ as a parameter for modeling a spatial characteristic of the source signal.

Specifically, the multichannel Wiener filter unit 10a creates an observation signal vector y(k) as an I-dimensional column vector including all observation signals as elements by the following expression (1). In the following description, a superscript of T represents transposition.

$$y(k)=(y_1(k) \ldots y_I(k))^T \qquad (1)$$

The observation signal vector y(k) is modeled by the following expression (2) as a sum of components (source signal components) $x_1(k)$ and $x_2(k)$ derived from two source signals.

$$y(k)=x_1(k)+x_2(k) \qquad (2)$$

The multichannel Wiener filter unit 10a further calculates an estimation value $\hat{x}_j(k)$ of a source signal component $x_j(k)$ by the following expression (3) by applying a multichannel Wiener filter $W_j(k)$ as a matrix of I×I to the observation signal vector y(k).

$$\hat{x}_j(k) = \underbrace{v_j(k)R_j(v_1(k)R_1 + v_2(k)R_2)^{-1}}_{W_j(k)} y(k) \qquad (3)$$

However, the signal analysis device 1P in the related art is requested to perform an inverse matrix operation that requests a large calculation amount for each sample point. Specifically, the signal analysis device 1P in the related art is requested to calculate an inverse matrix $(v_1(k)R_1+v_2(k)R_2)^{-1}$ for each k. Thus, with the signal analysis device 1P in the related art, a large calculation amount is requested for calculating the estimation value of the source signal component as a component derived from the source signal.

The present invention is made in view of such a situation, and provides a signal analysis device, a signal analysis method, and a signal analysis program that can calculate an estimation value of a source signal component with a small calculation amount.

Solution to Problem

To solve the above problem and attain the object, a signal analysis device according to the present invention includes: a memory; and processing circuitry coupled to the memory and configured to: obtain, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a simultaneous decorrelation matrix P as a matrix in which all $P^H R_j P$ are diagonal matrices, or/and Hermitian transposition $P^H$ thereof, as a parameter for decorrelating components corresponding to the J source signals for observation signal vectors based on observation signals acquired at I (I is an integral number equal to or larger than 2) different positions.

A signal analysis device according to the present invention includes: a memory; and processing circuitry coupled to the memory and configured to: obtain a simultaneous decorrelation matrix P as a matrix including I (I is an integral number equal to or larger than 2) different generalized eigenvectors $p_1, \ldots, p_I$ as column vectors satisfying $p_i^H R_2 p_m = 0$ (i and m are any integral numbers equal to or larger than 1 and equal to or smaller than I different from each other) for spatial covariance matrices $R_1$ and $R_2$ for modeling spatial characteristics of two source signals that are present in a mixed manner, or Hermitian transposition $P^H$ thereof, as a parameter for decorrelating components corresponding to two source signals for observation signal vectors based on observation signals acquired at I positions.

A signal analysis device according to the present invention includes: a memory; and processing circuitry coupled to the memory and configured to: obtain a simultaneously decorrelated observation signal vector in which components corresponding to J source signals are decorrelated by assuming, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a matrix P in which all $P^H R_j P$ become diagonal matrices as a simultaneous decorrelation matrix for decorrelating components corresponding to the J source signals for observation signal vectors based on observation signals acquired at I (I is an integral number equal to or larger than 2) different positions, and multiplying Hermitian transposition of the simultaneous decorrelation matrix by the observation signal vector.

A signal analysis device according to the present invention includes: a memory; and processing circuitry coupled to the memory and configured to: obtain a spatial covariance matrix as a parameter for modeling a spatial characteristic of a source signal based on a covariance matrix subjected to simultaneous decorrelation obtained from J (J is an integral number equal to or larger than 2) source signals that are present in a mixed manner, or/and obtain a variance parameter as a parameter for modeling a variance for each sample point of the source signal based on the covariance matrix subjected to simultaneous decorrelation.

Advantageous Effects of Invention

According to the present invention, an estimation value of a source signal component can be calculated with a small calculation amount.

EMBODIMENTS FOR CARRYING OUT THE INVENTION

Figure 1:
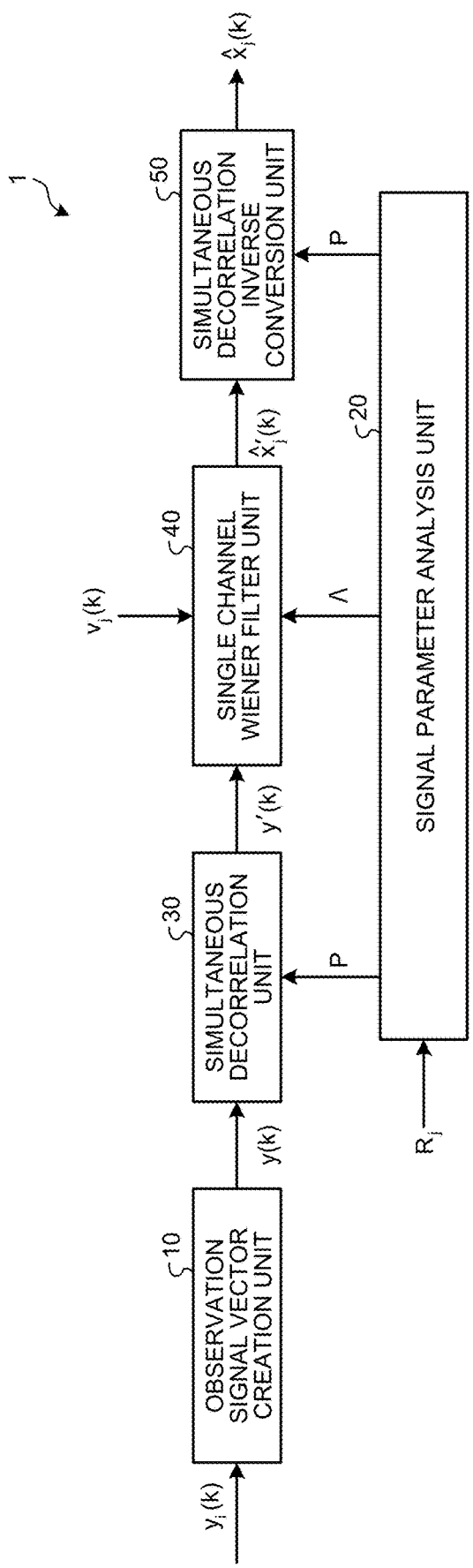
FIG. 1 is a diagram illustrating an example of a configuration of a signal analysis device according to a first embodiment.

The following describes embodiments of a signal analysis device, a signal analysis method, and a signal analysis program according to the present application in detail based on the drawings. The present invention is not limited to the embodiments described below. In the following description, in a case of denoting a vector, a matrix, or a scalar A as "^A", "^A" is assumed to be equivalent to a "symbol with "^"" added right above "A"". In a case of denoting a vector, a matrix, or a scalar A as "~A", "~A" is assumed to be equivalent to a "symbol with" added right above "A"". In the following description, signal separation is assumed to be a subordinate concept of signal analysis.

First Embodiment

First, the following describes a configuration, a processing procedure, and an effect of a signal analysis device according to a first embodiment. In the first embodiment, in a situation in which two source signals are present in a mixed manner, I (I is an integral number equal to or larger than 2) observation signals $y_i(k)$ (i=1, . . . ; I is an index of the observation signal, and k is an index of a sample point) acquired by a sensor such as a microphone at different positions, a variance parameter $v_j(k)$ (j=1, 2 is an index of the source signal) as a parameter for modeling a variance (power) for each sample point of the source signal, and a spatial covariance matrix $R_j$ as a parameter for modeling a spatial characteristic of the source signal are assumed to be input to the signal analysis device.

Examples of a "signal" in the first embodiment include sound, brainwaves, and radio signals. The "observation signal" in the first embodiment indicates a signal acquired by a plurality of sensors (sensor array). Examples of the sensor array include a microphone array, an electroencephalograph, a magnetoencephalograph, and an antenna array. The "source signal" in the first embodiment indicates a signal as a constituent element of the observation signal. The observation signal is modeled as a sum of the two source signals.

In addition to a problem setting (for example, sound source separation) for estimating, in a situation in which two object signals (for example, voice) are present in a mixed manner, components corresponding thereto, a problem setting for "signal separation" in the first embodiment includes a problem setting (also referred to as noise removal) for estimating, in a situation in which an object signal (for example, voice) and noise (for example, music coming through a television, or a rowdy crowd) are present in a mixed manner, components corresponding thereto (or only a component corresponding to the object signal). The source signal in the former case is the object signal (for example, voice). The source signals in the latter case are the object signal (for example, voice) and noise (for example, music coming through a television, or a rowdy crowd). The "rowdy crowd" is mixture of many kinds of noise, which is collectively regarded as one source signal in this case.

[Configuration and Processing of Signal Analysis Device]

Figure 2:
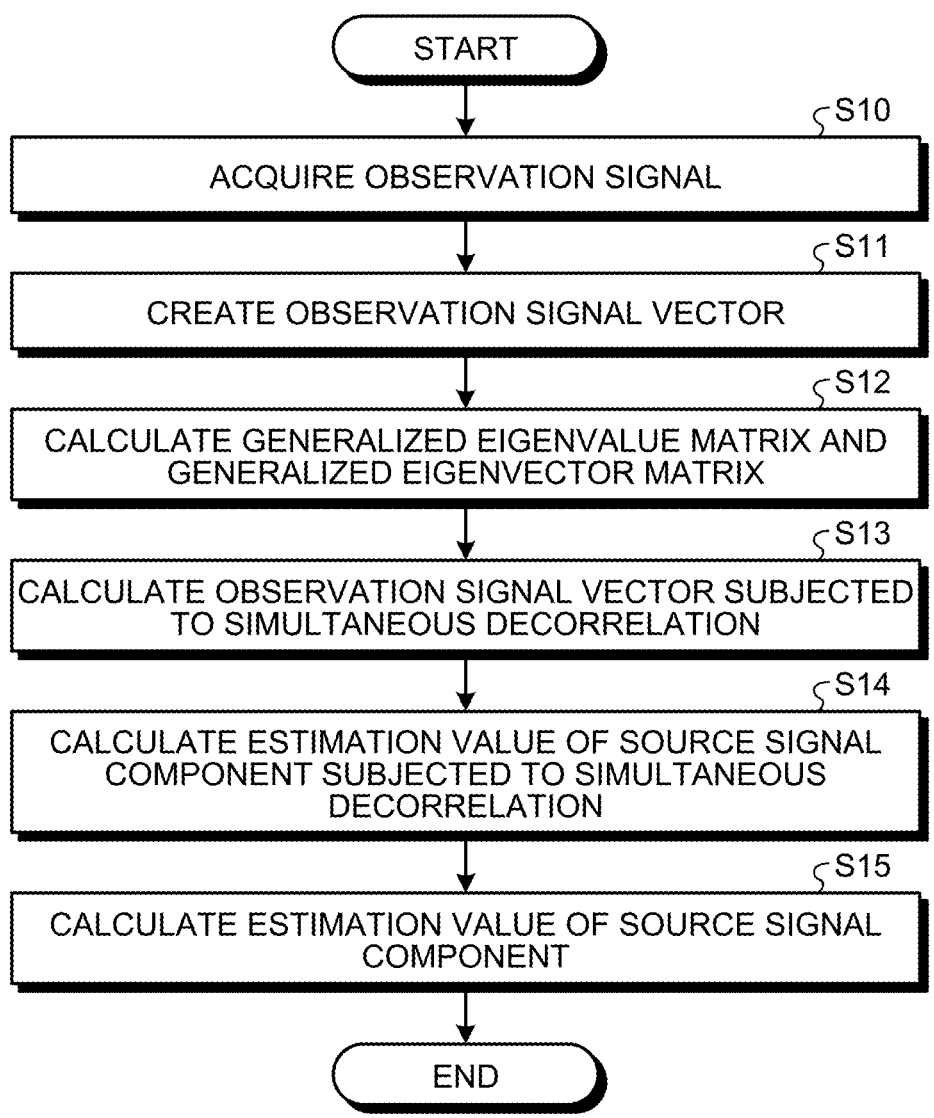
FIG. 2 is a flowchart illustrating an example of a processing procedure of signal analysis processing according to the first embodiment.

First, with reference to FIG. 1 and FIG. 2, the following describes a configuration of the signal analysis device and a processing procedure of signal analysis processing according to the first embodiment. FIG. 1 is a diagram illustrating an example of the configuration of the signal analysis device according to the first embodiment. FIG. 2 is a flowchart illustrating an example of the processing procedure of the signal analysis processing according to the first embodiment. A signal analysis device 1 according to the first embodiment is, for example, implemented by a predetermined computer program being read by a computer and the like including a read-only memory (ROM), a random-access memory (RAM), a central processing unit (CPU), and the like, and the CPU executing the predetermined computer program.

As illustrated in FIG. 1, the signal analysis device 1 includes an observation signal vector creation unit 10, a signal parameter analysis unit 20, a simultaneous decorrelation unit 30, a single channel Wiener filter unit 40, and a simultaneous decorrelation inverse conversion unit 50.

First, the following describes an outline of each unit of the signal analysis device 1. The observation signal vector creation unit 10 acquires an input observation signal $y_i(k)$ (Step S10), and creates an observation signal vector as an I-dimensional column vector constituted of all observation signals represented by expression (4) for each sample point (Step S11).

$$y(k)=(y_1(k) \ldots y_I(k))^T \quad (4)$$

The signal parameter analysis unit 20 acquires an input spatial covariance matrix $R_j$, and solves a generalized eigenvalue problem to calculate a generalized eigenvalue matrix $\Lambda$ and a generalized eigenvector matrix P (Step S12).

The simultaneous decorrelation unit 30 calculates an observation signal vector y'(k) subjected to simultaneous decorrelation based on the observation signal vector y(k) from the observation signal vector creation unit 10 and the generalized eigenvector matrix P from the signal parameter analysis unit 20 (Step S13). Specifically, as represented by expression (5), the simultaneous decorrelation unit 30 multiplies the observation signal vector y(k) by Hermitian transposition $P^H$ of the generalized eigenvector matrix P to calculate the observation signal vector y'(k) subjected to simultaneous decorrelation.

$$y'(k)=P^H y(k) \quad (5)$$

In this case, "'" (superscript of prime)" represents a variable subjected to simultaneous decorrelation. Simultaneous decorrelation indicates linear transformation of simultaneously decorrelating components (source signal components) corresponding to two source signals included in the observation signal vector y(k).

The single channel Wiener filter unit 40 acquires the input variance parameter $v_j(k)$, and calculates an estimation value $\hat{x}'_j(k)$ of a source signal component $x'_j(k)$ subjected to simultaneous decorrelation based on the generalized eigenvalue matrix $\Lambda$ from the signal parameter analysis unit 20 and the observation signal vector y'(k) subjected to simultaneous decorrelation from the simultaneous decorrelation unit 30 (Step S14). Specifically, the single channel Wiener filter unit 40 calculates the estimation value $\hat{x}'_j(k)$ of the source signal component $x'_j(k)$ subjected to simultaneous decorrelation by the expressions (6) and (7).

$$\hat{x}'_1(k) = \left( \frac{v_1(k)[\Lambda]_{11}}{v_1(k)[\Lambda]_{11}+v_2(k)}[y'(k)]_1 \ldots \frac{v_1(k)[\Lambda]_{II}}{v_1(k)[\Lambda]_{II}+v_2(k)}[y'(k)]_I \right)^T \quad (6)$$

$$\hat{x}'_2(k) = \left( \frac{v_2(k)}{v_1(k)[\Lambda]_{11}+v_2(k)}[y'(k)]_1 \ldots \frac{v_2(k)}{v_1(k)[\Lambda]_{II}+v_2(k)}[y'(k)]_I \right)^T \quad (7)$$

Regarding a vector $\alpha$, $[\alpha]_l$ represents the l-th element of $\alpha$, and regarding a matrix A, $[A]_{lm}$ represents an (l, m) element of A. Additionally, ˆ (hat) above a variable represents an estimation value.

The simultaneous decorrelation inverse conversion unit 50 calculates and outputs an estimation value $\hat{x}_j(k)$ of the source signal component $x_j(k)$ based on the generalized eigenvector matrix P from the signal parameter analysis unit 20 and the estimation value $\hat{x}'_j(k)$ of the source signal component $x'_j(k)$ subjected to simultaneous decorrelation from the single channel Wiener filter unit 40 (Step S15). Specifically, as represented by expression (8), the simultaneous decorrelation inverse conversion unit 50 multiplies the estimation value $\hat{x}'_j(k)$ of the source signal component $x'_j(k)$ subjected to simultaneous decorrelation by an inverse matrix $(P^H)^{-1}$ of the Hermitian transposition $P^H$ of the generalized eigenvector matrix P multiplied by the simultaneous decorrelation unit 30 to calculate and output the estimation value $\hat{x}_j(k)$ of the source signal component $x_j(k)$.

$$\hat{x}_j(k)=(P^H)^{-1}\hat{x}'_j(k) \quad (8)$$

Background of Processing in First Embodiment

Next, the following describes a background of processing in the first embodiment. The following describes a case in which the observation signal is represented by a complex number (description of a case in which the observation signal is represented by a real number is almost the same, so that the description thereof is omitted). In the first embodiment, the observation signal vector y(k) is modeled by the following expression (9) as a sum of components (source signal components) $x_1(k)$ and $x_2(k)$ corresponding to the two source signals.

$$y(k)=x_1(k)+x_2(k) \tag{9}$$

It is assumed that a mean of the source signal component $x_j(k)$ is 0, a covariance matrix thereof is $S_j(k)$, and the two source signal components $x_1(k)$ and $x_2(k)$ are not correlated with each other. Both of the two source signal components $x_1(k)$ and $x_2(k)$ may be the source signal components corresponding to the object signal (for example, voice). Alternatively, one of the source signal components $x_1(k)$ and $x_2(k)$ may be the source signal component corresponding to the object signal (for example, voice), and the other one thereof may be the source signal component corresponding to noise (for example, noise from a television or a rowdy crowd).

As a method of estimating the source signal component $x_j(k)$ from the observation signal vector y(k), there is known a method based on a multichannel Wiener filter. In this method, the estimation value $\hat{x}_j(k)$ of the source signal component $x_j(k)$ is calculated by expression (10).

$$\hat{x}_j(k) = \underbrace{S_j(k)(S_1(k)+S_2(k))^{-1}}_{\text{multichannel wiener filter}} y(k) \tag{10}$$

That is, in this method, the estimation value $\hat{x}_j(k)$ of the source signal component $x_j(k)$ is calculated by multiplying the observation signal vector y(k) by a multichannel Wiener filter $S_j(k)(S_1(k)+S_2(k))^{-1}$ as a matrix of I×I.

[Conventional Signal Analysis Method]

In a conventional signal analysis method (for example, the signal analysis method described in Non Patent Document 1), the estimation value $\hat{x}_j(k)$ of the source signal component $x_j(k)$ is calculated based on expression (10). In this case, the covariance matrix $S_j(k)$ of the source signal component $x_j(k)$ is modeled by the following expression (11). In expression (11), E represents an expected value operation.

$$S_j(k)=E(x_j(k)x_j(k)^H)=v_j(k)R_j \tag{11}$$

In this case, $v_j(k)$ is a variance parameter as a parameter for modeling variance for each sample point (for each k) of the source signal, and $R_j$ is a spatial covariance matrix as a parameter for modeling a spatial characteristic of the source signal. In the conventional signal analysis method, the estimation value $\hat{x}_j(k)$ of the source signal component $x_j(k)$ is calculated by using expression (12) that is obtained by substituting expression (11) for expression (10).

$$\hat{x}_j(k) = \underbrace{v_j(k)R_j(v_1(k)R_1+v_2(k)R_2)^{-1}}_{\text{multichannel wiener filter}} y(k) \tag{12}$$

There has been the problem that the conventional signal analysis method described above is difficult to be applied to processing of a large-scale data set (the number of sample points k is extensive), real-time processing (short-time processing is requested), an appliance having a low calculation capacity, and the like because a huge amount of calculation is requested.

Actually, in the related art, at the time of calculating the estimation value $\hat{x}_j(k)$ of the source signal component $x_j(k)$, inverse matrix calculation (specifically, calculation of $(v_1(k)R_1+v_2(k)R_2)^{-1}$) is requested to be performed for each sample point (that is, multiple times). The inverse matrix calculation is an arithmetic operation that requests a large calculation amount of $O(I^3)$ for the I-th order matrix. The number of sample points ranges typically from several hundreds to tens of millions. Thus, in the conventional signal analysis method, a huge amount of calculation is requested at the time of calculating the estimation value $\hat{x}_j(k)$ of the source signal component $x_j(k)$.

[Signal Analysis Method According to First Embodiment]

On the other hand, the first embodiment provides a method of calculating the estimation value $\hat{x}_j(k)$ of the source signal component $x_j(k)$ with a small calculation amount based on simultaneous decorrelation of the two source signal components $x_1(k)$ and $x_2(k)$. The following describes a concept of the first embodiment.

When a covariance matrix $E(\alpha(k)\alpha(k)^H)$ of a signal $\alpha(k)$ is a diagonal matrix with respect to each sample point k, $\alpha(k)$ is decorrelated. To put it briefly, this means that "elements having different vectors $\alpha(k)$ are not correlated with each other". Assuming that covariance matrices $v_j(k)R_j$ (j is 1 or 2) of the source signal components $x_j(k)$ in expression (11) are both diagonal matrices, the inverse matrix operation $(v_1(k)R_1+v_2(k)R_2)^{-1}$ in expression (12) can be implemented by a simple reciprocal operation for each diagonal element, so that calculation can be performed with a small calculation amount. However, normally, elements having different source signal components $x_j(k)$ are strongly correlated with each other, so that the covariance matrix $v_j(k)R_j$ thereof is not a diagonal matrix. Thus, in the first embodiment, it is considered that the two source signal components $x_1(k)$ and $x_2(k)$ are simultaneously decorrelated.

As represented by expression (13) and expression (14), simultaneous decorrelation of the two source signal components $x_1(k)$ and $x_2(k)$ indicates that linear transformation is performed by multiplying $x_1(k)$ and $x_2(k)$ by a regular matrix V to cause source signal components $x'_1(k)$ and $x'_2(k)$ after the linear transformation to be simultaneously decorrelated (that is, covariance matrices $S'_1(k)$ and $S'_2(k)$ of $x'_1(k)$ and $x'_2(k)$ become diagonal matrices at the same time). Due to this simultaneous decorrelation, the covariance matrices $v_j(k)R_j$ of the source signal components $x_j(k)$ are both converted into diagonal matrices. Thus, due to the simultaneous decorrelation, the inverse matrix operation $(v_1(k)R_1+v_2(k)R_2)^{-1}$ in expression (12) is changed into an inverse matrix operation for the diagonal matrix, which can be implemented by a simple reciprocal operation for each diagonal element, so that calculation can be performed with a small calculation amount.

$$x'_1(k)=Vx_1(k) \tag{13}$$

$$x'_2(k)=Vx_2(k) \tag{14}$$

When the covariance matrices $S'_1(k)$ and $S'_2(k)$ of $x'_1(k)$ and $x'_2(k)$ are calculated, the following expressions (15) to (19) are obtained.

$$S'_1(k) = E(x'_1(k)x'_1(k)^H) \quad (15)$$

$$= VE(x_1(k)x_1(k)^H)V^H \quad (16)$$

$$= VS_1(k)V^H \quad (17)$$

$$= v_1(k)VR_1V^H \quad (18)$$

$$S'_2(k) = v_2(k)VR_2V^H \quad (19)$$

The condition for simultaneous decorrelation is that these matrices become diagonal matrices at the same time, that is, the following expression (20) and expression (21) are established at the same time. In this case, $\Lambda_1$ and $\Lambda_2$ are certain diagonal matrices.

$$VR_1V^H = \Lambda_1 \text{(diagonal matrix)} \quad (20)$$

$$VR_2V^H = \Lambda_2 \text{(diagonal matrix)} \quad (21)$$

That is, an object of simultaneous decorrelation is to obtain the regular matrix V such that, when spatial covariance matrices $R_1$ and $R_2$ are multiplied by the regular matrix V from the left and multiplied by Hermitian transposition $V^H$ of V from the right, these matrices become diagonal matrices at the same time (simultaneous diagonalization).

The matrix V can be obtained as follows based on the generalized eigenvalue problem. The generalized eigenvalue problem for the spatial covariance matrices $R_1$ and $R_2$ represented by expression (22) is solved.

$$R_1 p = \lambda R_2 p \quad (22)$$

As a result, I generalized eigenvalues $\lambda_1, \ldots, \lambda_I$, and I generalized eigenvectors $p_1, \ldots, p_I$ respectively corresponding to $\lambda_1, \ldots, \lambda_I$ are obtained. In this case, the generalized eigenvectors $p_1, \ldots, p_I$ can be taken to satisfy the following expression (23).

$$p_l^H R_2 p_m = \begin{cases} 1, & l = m \\ 0, & l \neq m \end{cases} \quad (23)$$

When the matrix P is determined by the following expression (24) using these generalized eigenvectors $p_1, \ldots, p_I$, the following expression (25) and expression (26) are satisfied (for example, refer to reference document 1 "G. Strang, "Linear Algebra and Its Applications", Harcourt Brace Jovanovich, 1988").

$$P = (p_1 \ldots p_I) \quad (24)$$

$$P^H R_1 P = \Lambda \quad (25)$$

$$P^H R_2 P = I \quad (26)$$

In this case, I is a unit matrix, and $\Lambda$ is a diagonal matrix of expression (27) constituted of generalized eigenvalues $\lambda_1, \ldots, \lambda_I$.

$$\Lambda = \begin{pmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_I \end{pmatrix} \quad (27)$$

Thus, when the matrix V is determined by the following expression (28), expression (20) and expression (21) as the conditions for simultaneous decorrelation are satisfied ($\Lambda_1 = \Lambda$, and $\Lambda_2 = I$).

$$V = P^H \quad (28)$$

Hereinafter, the diagonal matrix $\Lambda$ constituted of the generalized eigenvalues in expression (27) is referred to as a generalized eigenvalue matrix, and the matrix P constituted of the generalized eigenvectors in expression (24) is referred to as a generalized eigenvector matrix in some cases. As described above, P is also a matrix that implements simultaneous decorrelation, so that P is also referred to as a simultaneous decorrelation matrix from that point of view.

The signal parameter analysis unit 20 calculates the generalized eigenvalues $\lambda_1, \ldots, \lambda_I$ for the spatial covariance matrices $R_1$ and $R_2$ and the generalized eigenvectors $p_1, \ldots, p_I$ respectively corresponding to $\lambda_1, \ldots, \lambda_I$ that satisfy expression (23), and creates the generalized eigenvalue matrix $\Lambda$ as a diagonal matrix including the generalized eigenvalues $\lambda_1, \ldots, \lambda_I$ as diagonal elements and the generalized eigenvector matrix P as a regular matrix including the generalized eigenvectors $p_1, \ldots, p_I$ as column vectors by expression (27) and expression (24).

As described above, the two source signal components $x_1(k)$ and $x_2(k)$ are simultaneously decorrelated by linear transformation of multiplying the source signal components $x_1(k)$ and $x_2(k)$ by the Hermitian transposition $P^H$ of the matrix P defined by expression (24). When both sides of expression (9) representing a model of the observation signal vector are subjected to this linear transformation, the following expression (29) is obtained.

$$\underbrace{P^H y(k)}_{=y'(k)} = \underbrace{P^H x_1(k)}_{=x'_1(k)} + \underbrace{P^H x_2(k)}_{=x'_2(k)} \quad (29)$$

In this case, based on expression (18), expression (19), expression (25), expression (26), and expression (28), the covariance matrices $S'_1(k)$ and $S'_2(k)$ of $x'_1(k)$ and $x'_2(k)$ are both diagonal matrices as represented by the following expression (30) and expression (31).

$$S'_1(k) = v_1(k)\Lambda \quad (30)$$

$$S'_2(k) = v_2(k)I \quad (31)$$

In this case, $\Lambda$ is a diagonal matrix defined by expression (27). In a case of applying the multichannel Wiener filter to expression (29), the estimation value $\hat{x}'_j(k)$ of $x'_j(k)$ is given by the following expression (32).

$$\hat{x}'_j(k) = \underbrace{S'_j(k)(S'_1(k) + S'_2(k))^{-1} y(k)}_{\text{multichannel wiener filter}} \quad (32)$$

The covariance matrices $S'_1(k)$ and $S'_2(k)$ in expression (32) are diagonal matrices as represented by expression (30) and expression (31). Thus, expression (32) becomes very simple as represented by the following expression (36) and expression (40). In this way, due to simultaneous decorrelation, the inverse matrix operation $(v_1(k)R_1 + v_2(k)R_2)^{-1}$ in expression (12) is changed into the inverse matrix operation $(v_1(k)\Lambda + v_2(k)I)^{-1}$ for the diagonal matrix as represented by expression (33) and expression (37), which can be implemented by a simple reciprocal operation for each diagonal element, so that calculation can be performed with a small calculation amount.

$$\hat{x}'_1(k) = v_1(k)\Lambda(v_1(k)\Lambda + v_2(k)I)^{-1}y'(k) \quad (33)$$

$$= v_1(k)\begin{pmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_I \end{pmatrix} \times \quad (34)$$

$$\begin{pmatrix} v_1(k)\lambda_1 + v_2(k) & 0 & \cdots & 0 \\ 0 & v_1(k)\lambda_2 + v_2(k) & \cdots & 0 \\ \vdots & \vdots & \ddots & \vdots \\ 0 & 0 & \cdots & v_1(k)\lambda_I + v_2(k) \end{pmatrix}^{-1} y'(k)$$

$$= \begin{pmatrix} \frac{v_1(k)\lambda_1}{v_1(k)\lambda_1 + v_2(k)} & 0 & \cdots & 0 \\ 0 & \frac{v_1(k)\lambda_2}{v_1(k)\lambda_2 + v_2(k)} & \cdots & 0 \\ \vdots & \vdots & \ddots & \vdots \\ 0 & 0 & \cdots & \frac{v_1(k)\lambda_I}{v_1(k)\lambda_I + v_2(k)} \end{pmatrix} y'(k) \quad (35)$$

$$= \left( \frac{v_1(k)\lambda_1}{v_1(k)\lambda_1 + v_2(k)}[y'(k)]_1 \ \cdots \ \frac{v_1(k)\lambda_I}{v_1(k)\lambda_I + v_2(k)}[y'(k)]_I \right)^T \quad (36)$$

$$\hat{x}'_2(k) = v_2(k)(v_1(k)\Lambda + v_2(k)I)^{-1}y'(k) \quad (37)$$

$$= \quad (38)$$

$$v_2(k)\begin{pmatrix} v_1(k)\lambda_1 + v_2(k) & 0 & \cdots & 0 \\ 0 & v_1(k)\lambda_2 + v_2(k) & \cdots & 0 \\ \vdots & \vdots & \ddots & \vdots \\ 0 & 0 & \cdots & v_1(k)\lambda_I + v_2(k) \end{pmatrix}^{-1} y'(k)$$

$$= \begin{pmatrix} \frac{v_2(k)}{v_1(k)\lambda_1 + v_2(k)} & 0 & \cdots & 0 \\ 0 & \frac{v_2(k)}{v_1(k)\lambda_2 + v_2(k)} & \cdots & 0 \\ \vdots & \vdots & \ddots & \vdots \\ 0 & 0 & \cdots & \frac{v_2(k)}{v_1(k)\lambda_I + v_2(k)} \end{pmatrix} y'(k) \quad (39)$$

$$= \left( \frac{v_2(k)}{v_1(k)\lambda_1 + v_2(k)}[y'(k)]_1 \ \cdots \ \frac{v_2(k)}{v_1(k)\lambda_I + v_2(k)}[y'(k)]_I \right)^T \quad (40)$$

The single channel Wiener filter unit 40 calculates the estimation value $\hat{x}'_j(k)$ of the source signal component $x'_j(k)$ subjected to simultaneous decorrelation by expression (36) and expression (40).

Processing of expression (36) and expression (40) can also be interpreted as processing based on the single channel Wiener filter. To explain that fact, first, the following explains what the single channel Wiener filter is. While the multichannel Wiener filter performs estimation by using a plurality of (I) observation signals, the single channel Wiener filter performs estimation by using only one observation signal. With the single channel Wiener filter, one observation signal (scalar) y(k) is modeled as a sum of the two source signal components (scalars) $x_1(k)$ and $x_2(k)$ by the following expression (41).

$$y(k) = x_1(k) + x_2(k) \quad (41)$$

In this case, in accordance with the fact that there is only one observation signal, y(k), $x_1(k)$, and $x_2(k)$ are all scalars. It is assumed that a mean of the source signal component $x_j(k)$ is 0, variance thereof is $\sigma^2_j(k)$, and the two source signal components $x_1(k)$ and $x_2(k)$ are not correlated with each other. In the method based on the single channel Wiener filter, the estimation value $\hat{x}_j(k)$ of the source signal component $x_j(k)$ is calculated by the following expression (42).

$$\hat{x}_j(k) = \underbrace{\frac{\sigma^2_j(k)}{\sigma^2_1(k) + \sigma^2_2(k)}}_{\text{single channel wiener filter}} y(k) \quad (42)$$

That is, in this method, the estimation value $\hat{x}_j(k)$ of the source signal component $x_j(k)$ is calculated by multiplying the observation signal y(k) by a single channel Wiener filter $\sigma^2_j(k)/(\sigma^2_1(k)+\sigma^2_2(k))$.

In a case of seeing expression (29) for each element, the following expression (43) is obtained based on the i-th element.

$$[y'(k)]_i = [x'_1(k)]_i + [x'_2(k)]_i \quad (43)$$

It is considered that $[x'_j(k)]_i$ is estimated from $[y'(k)]_i$ using the single channel Wiener filter based on the above expression. Typically, when a covariance matrix of a probability vector $\alpha$ is A, a variance of the l-th element $[\alpha]_l$ of $\alpha$ is an (l, l) element $[A]_{ll}$ of A, so that a variance of $[x'_j(k)]_i$ is $[S'_j(k)]_{ii}$. Thus, based on expression (30) and expression (31), the variance of $[x'_1(k)]_i$ is $v_1(k)\lambda_i$, and the variance of $[x'_2(k)]_i$ is $v_2(k)$. Accordingly, an estimation value $[\hat{x}'_j(k)]_i$ of $[x'_j(k)]_i$ based on the single channel Wiener filter is given by the following expression (44) and expression (45).

$$[\hat{x}'_1(k)]_i = \underbrace{\frac{v_1(k)\lambda_i}{v_1(k)\lambda_i + v_2(k)}}_{\text{single channel wiener filter}} [\hat{y}'(k)]_i \quad (44)$$

$$[\hat{x}'_2(k)]_i = \underbrace{\frac{v_2(k)}{v_1(k)\lambda_i + v_2(k)}}_{\text{single channel wiener filter}} [\hat{y}'(k)]_i \quad (45)$$

These values are nothing but the i-th elements of expression (36) and expression (40), respectively.

The estimation value $\hat{x}'_j(k)$ of the source signal component $x'_j(k) = P^H x_j(k)$ subjected to simultaneous decorrelation that is obtained as described above is expected to take a value close to a true value as represented by the following expression (46) if estimation has been successively performed.

$$\hat{x}'_j(k) \approx P^H x_j(k) \quad (46)$$

The following expression (47) is obtained by multiplying both sides of the above expression by the matrix $(P^H)^{-1}$.

$$x_j(k) \approx (P^H)^{-1} \hat{x}'_j(k) \quad (47)$$

Thus, the estimation value $\hat{x}_j(k)$ of the source signal component $x_j(k)$ is calculated by the following expression (48).

$$\hat{x}_j(k) = (P^H)^{-1} \hat{x}'_j(k) \quad (48)$$

In this way, according to the first embodiment, an inverse matrix operation is not requested to be performed for each sample point in calculating the estimation value $\hat{x}_j(k)$ of the source signal component $x_j(k)$, so that signal separation can be implemented with a small calculation amount. It is noted that the above expression includes the inverse matrix $(P^H)^{-1}$, but the inverse matrix $(P^H)^{-1}$ does not depend on k, so that calculation is not requested to be performed for each sample point but may be performed only once.

The estimation value of the source signal component $x_j(k)$ in the conventional signal analysis method is represented by $\hat{x}_j^{conv}(k)$, and the estimation value of the source signal component $x_j(k)$ in the first embodiment is represented by $\hat{x}_j^{prop}(k)$. It is demonstrated that $\hat{x}_j^{conv}(k)$ is identical to $\hat{x}_j^{prop}(k)$ in theory. In this case, $\hat{x}_j^{conv}(k)$ is given by expression (49).

$$\hat{x}_j^{conv}(k) = v_j(k) R_j (v_1(k) R_1 + v_2(k) R_2)^{-1} y(k) \qquad (49)$$

Based on expression (5), expression (33) to expression (40), and expression (48), $\hat{x}_j^{prop}(k)$ is equal to the following expression (50) and expression (51).

[Expression 41]

$$\hat{x}_1^{prop}(k) = (P^H)^{-1} (v_1(k)\Lambda)(v_1(k)\Lambda + v_2(k)I)^{-1} P^H y(k) \qquad (50)$$

$$\hat{x}_2^{prop}(k) = (P^H)^{-1} (v_2(k))(v_1(k)\Lambda + v_2(k)I)^{-1} P^H y(k) \qquad (51)$$

The following describes a case of j=1. A case of j=2 is the same as the case of j=1, so that the description thereof will not be made. Based on expression (25) and expression (26), the following expression (52) and expression (53) are derived.

$$R_1 = (P^H)^{-1} \Lambda P^{-1} \qquad (52)$$

$$R_2 = (P^H)^{-1} P^{-1} \qquad (53)$$

By substituting these expressions for expression (49), the following expression (54) to expression (57) are obtained.

$$\hat{x}_1^{conv}(k) = \qquad (54)$$
$$v_1(k)(P^H)^{-1}\Lambda P^{-1}\left(v_1(k)(P^H)^{-1}\Lambda P^{-1} + v_2(k)(P^H)^{-1}P^{-1}\right)^{-1} y(k)$$

$$= v_1(k)(P^H)^{-1}\Lambda P^{-1}\left((P^H)^{-1}(v_1(k)\Lambda + v_2(k)I)P^{-1}\right)^{-1} y(k) \qquad (55)$$

$$= v_1(k)(P^H)^{-1}\Lambda P^{-1} P(v_1(k)\Lambda + v_2(k)I)^{-1} P^H y(k) \qquad (56)$$

$$= \hat{x}_1^{prop}(k) \qquad (57)$$

According to the above description, calculation results of the estimation value $\hat{x}_j(k)$ of the source signal component $x_j(k)$ are identical to each other in theory between the conventional signal analysis method and the first embodiment. However, as a matter of course, a calculation error is caused by a computer in some cases.

In this way, in the signal analysis device 1 according to the first embodiment, the signal parameter analysis unit 20 obtains the simultaneous decorrelation matrix P as a matrix including the I (I is an integral number equal to or larger than 2) generalized eigenvectors $p_1, \ldots, p_I$ different from each other as column vectors satisfying $p_i^H R_2 p_m = 0$ (i and m are any integral numbers equal to or larger than 1 and equal to or smaller than I different from each other) for the spatial covariance matrices $R_1$ and $R_2$ that model spatial characteristics of the two respective source signals that are present in a mixed manner, or the Hermitian transposition $P^H$ thereof, as a parameter for decorrelating components corresponding to the two source signals for observation signal vectors based on observation signals acquired at I positions. The signal analysis device 1 performs simultaneous decorrelation using this parameter for decorrelation, so that it is sufficient that multiplication may be performed for each element with a small calculation amount in filtering, and the calculation amount of the estimation value of the source signal component can be reduced.

By multiplying the observation signal vectors based on the input I observation signals by the Hermitian transposition $P^H$ of the simultaneous decorrelation matrix P obtained by the signal parameter analysis unit 20, the simultaneous decorrelation unit 30 obtains a simultaneously decorrelated observation signal vector the components of which corresponding to the two source signals are decorrelated.

The single channel Wiener filter unit 40 then applies the single channel Wiener filter based on a diagonal component of a matrix $P^H R_j P$ (j is an integral number equal to or larger than 1 and equal to or smaller than 2) based on the simultaneous decorrelation matrix P to each element of the simultaneously decorrelated observation signal vector obtained by the simultaneous decorrelation unit 30, and obtains a vector based on a simultaneously decorrelated source signal component estimation value.

Additionally, by multiplying the vector based on the simultaneously decorrelated source signal component estimation value obtained by the single channel Wiener filter unit 40 by the inverse matrix $(P^H)^{-1}$ of the Hermitian transposition $P^H$ of the simultaneous decorrelation matrix P, the simultaneous decorrelation inverse conversion unit 50 obtains the estimation value of the source signal component.

Effect of First Embodiment

According to the first embodiment having such a configuration, as described above, signal separation can be implemented with a smaller calculation amount without deteriorating signal separation performance as compared with the conventional signal analysis method. That is, in the first embodiment, the observation signal vector is subjected to filtering after being subjected to simultaneous decorrelation, and lastly subjected to inverse conversion of simultaneous decorrelation to calculate the estimation value of the source signal component. In this case, the matrix P that implements simultaneous decorrelation can be obtained by solving the generalized eigenvalue problem for the spatial covariance matrix.

As a result, in the first embodiment, the estimation value of the source signal component can be calculated with a smaller calculation amount as compared with the related art. The main reason therefor is described below.

First, in the first embodiment, filtering becomes processing of multiplication for each element with a small calculation amount due to simultaneous decorrelation, and processing of an inverse matrix operation for each sample point with a large calculation amount is not requested. Second, in the first embodiment, simultaneous decorrelation is performed by using the matrix P that is obtained by solving the generalized eigenvalue problem for the spatial covariance matrix without using the sample point, so that the generalized eigenvalue problem is not requested to be solved for each sample point but may be solved once. This processing is enabled by modeling the covariance matrix of the source signal component to be scalar multiplication of the spatial covariance matrix without using the sample point. Third, in the first embodiment, an inverse matrix operation for the matrix $P^H$ of simultaneous decorrelation is requested to be performed at the time of performing inverse conversion of simultaneous decorrelation, but the inverse matrix operation is not requested to be performed for each sample point but may be performed only once based on the same reason.

Furthermore, in the first embodiment, the processing of performing filtering on the observation signal vector after performing simultaneous decorrelation, and lastly performing inverse conversion of simultaneous decorrelation in the first embodiment is equivalent to the processing of directly performing filtering on the observation signal vector in the related art. Due to this, according to the first embodiment, the estimation value of the source signal component can be calculated with a smaller calculation amount than that in the related art without deteriorating the signal separation performance as compared with the related art.

First Modification of First Embodiment

Next, the following describes a first modification of the first embodiment. In the first embodiment, the generalized eigenvectors $p_1, \ldots, p_I$ are assumed to satisfy the constraint condition of expression (23). The first modification of the first embodiment describes the signal analysis device in a case of assuming that the generalized eigenvectors $p_1, \ldots, p_I$ satisfy the constraint condition other than expression (23). The signal parameter analysis unit of the signal analysis device according to the first modification of the first embodiment solves a generalized eigenvalue problem represented by expression (58) for the spatial covariance matrices $R_1$ and $R_2$.

$$R_1 p = \lambda R_2 p \tag{58}$$

As a result, the I generalized eigenvalues $\lambda_1, \ldots, \lambda_I$ and the I generalized eigenvectors $p_1, \ldots, p_I$ respectively corresponding to $\lambda_1, \ldots, \lambda_I$ are obtained. In the example of the first embodiment described above, the generalized eigenvectors $p_1, \ldots, p_I$ are taken to satisfy the following expression (59).

$$p_l^H R_2 p_m = \begin{cases} 1, & l = m \\ 0, & l \neq m \end{cases} \tag{59}$$

On the other hand, in the first modification of the first embodiment, the generalized eigenvectors $p_1, \ldots, p_I$ are taken to satisfy the following expression (60) (each $\sigma_l$ is a predetermined positive number).

$$p_l^H R_2 p_m = \begin{cases} \sigma_l, & l = m \\ 0, & l \neq m \end{cases} \tag{60}$$

When the matrix P is determined by the following expression (61) using these generalized eigenvectors $p_1, \ldots, p_I$, expression (62) and expression (63) are satisfied.

$$P = (p_1 \ldots p_I) \tag{61}$$

$$P^H R_1 P = \Lambda_1 \tag{62}$$

$$P^H R_2 P = \Lambda_2 \tag{63}$$

In this case, $\Lambda_1$ and $\Lambda_2$ are diagonal matrices represented by the following expression (64) and expression (65).

$$\Lambda_1 = \begin{pmatrix} \lambda_1 \sigma_1 & 0 & \ldots & 0 \\ 0 & \lambda_2 \sigma_2 & \ldots & 0 \\ \vdots & \vdots & \ddots & \vdots \\ 0 & 0 & \ldots & \lambda_I \sigma_I \end{pmatrix} \tag{64}$$

$$\Lambda_2 = \begin{pmatrix} \sigma_1 & 0 & \ldots & 0 \\ 0 & \sigma_2 & \ldots & 0 \\ \vdots & \vdots & \ddots & \vdots \\ 0 & 0 & \ldots & \sigma_I \end{pmatrix} \tag{65}$$

Thus, when the matrix V is determined by the following expression (66), expression (20) and expression (21) as the conditions for simultaneous decorrelation are satisfied. In this case, $\Lambda_1$ and $\Lambda_2$ in expression (64) and expression (65) correspond to $\Lambda_1$ and $\Lambda_2$ in expression (20) and expression (21).

$$V = P^H \tag{66}$$

Hereinafter, the diagonal matrix $\Lambda$ constituted of the generalized eigenvalues in expression (27) is referred to as a generalized eigenvalue matrix, and the matrix P constituted of the generalized eigenvectors in expression (61) is referred to as a generalized eigenvector matrix in some cases. The matrix P obtained as described above can be used as the simultaneous decorrelation matrix. The single channel Wiener filter unit of the signal analysis device according to the first modification of the first embodiment calculates the estimation value $\hat{x}'_j(k)$ of the source signal component $x'_j(k)$ subjected to simultaneous decorrelation by the following expression (67) and expression (68).

$$\hat{x}'_1(k) = \left( \frac{v_1(k)[\Lambda_1]_{11}}{v_1(k)[\Lambda_1]_{11} + v_2(k)[\Lambda_2]_{11}} [y'(k)]_1 \quad \ldots \quad \frac{v_1(k)[\Lambda_1]_{11}}{v_1(k)[\Lambda_1]_{11} + v_2(k)[\Lambda_2]_{11}} [y'(k)]_I \right)^T \tag{67}$$

$$\hat{x}'_2(k) = \left( \frac{v_2(k)[\Lambda_2]_{11}}{v_1(k)[\Lambda_1]_{11} + v_2(k)[\Lambda_2]_{11}} [y'(k)]_1 \quad \ldots \quad \frac{v_2(k)[\Lambda_2]_{11}}{v_1(k)[\Lambda_1]_{11} + v_2(k)[\Lambda_2]_{11}} [y'(k)]_I \right)^T \tag{68}$$

Pieces of processing performed by the other units are the same as those in the first embodiment described above.

In this way, in the first modification of the first embodiment, the signal parameter analysis unit 20 obtains the simultaneous decorrelation matrix P as a matrix including the I (I is an integral number equal to or larger than 2) generalized eigenvectors $p_1, \ldots, p_I$ different from each other as column vectors satisfying $p_i^H R_2 p_m = 0$ (i and m are any integral numbers equal to or larger than 1 and equal to or smaller than I different from each other) for the spatial covariance matrices $R_1$ and $R_2$ that model spatial characteristics of the two respective source signals that are present in a mixed manner, or the Hermitian transposition $P^H$ thereof, as a parameter for decorrelating components corresponding to the two source signals for observation signal vectors based on observation signals acquired at I positions.

Second Modification of First Embodiment

Next, the following describes a second modification of the first embodiment. The second modification of the first embodiment describes another modification of the processing performed by the signal parameter analysis unit. In the first embodiment, the signal parameter analysis unit 20 obtains the matrix P in which $P^H R_1 P$ and $P^H R_2 P$ become diagonal matrices, and the diagonal matrix $\Lambda = P^H R_1 P$ at this point, based on eigenvalue analysis. On the other hand, in the second modification of the first embodiment, the signal parameter analysis unit 20 obtains the matrix P in which $\Lambda_1 = P^H R_1 P$ and $\Lambda_2 = P^H R_2 P$ are caused to be closer to certain diagonal matrices $\Sigma_1$ and $\Sigma_2$ as much as possible, and $\Lambda_1 = P^H R_1 P$ and $\Lambda_2 = P^H R_2 P$ at this point, based on optimization.

That is, in the second modification of the first embodiment, the signal parameter analysis unit 20 obtains the matrix P as described below, and $\Lambda_1 = P^H R_1 P$ and $\Lambda_2 = P^H R_2 P$ at this point (refer to expression (69) and expression (70)).

$$P^H R_1 P \simeq \Sigma_1 {}^{(diagonal\ matrix)} \tag{69}$$

$$P^H R_2 P \simeq \Sigma_2 {}^{(diagonal\ matrix)} \tag{70}$$

Specifically, by minimizing a cost function of the following expression (71) for the matrix P and the diagonal matrices $\Sigma_1$ and $\Sigma_2$, the matrix P can be obtained.

$$\underbrace{\left\| P^H R_2 P - \sum\nolimits_2 \right\|_F^2}_{\text{error between } P^H R_1 P \text{ and } \Sigma_1} + \underbrace{\left\| P^H R_1 P - \sum\nolimits_1 \right\|_F^2}_{\text{error between } P^H R_2 P \text{ and } \Sigma_2} \tag{71}$$

In this case, $\|A\|_F$ represents a Frobenius norm of the matrix A. For example, minimization of the cost function of the above expression can be performed in accordance with an algorithm described in reference document 2 "A. Yeredor, "Non-Orthogonal Joint Diagonalization in the Least-Squares Sense with Application in Blind Source Separation", IEEE Transactions on Signal Processing, vol. 50, no. 7, pp. 1545-1553, July 2002.". The matrix P obtained as described above can be used as the simultaneous decorrelation matrix.

Based on $\Lambda_1 = P^H R_1 P$ and $\Lambda_2 = P^H R_2 P$, similarly to the first modification of the first embodiment, the estimation value $\hat{x}'_j(k)$ of the source signal component $x'_j(k)$ subjected to simultaneous decorrelation can be calculated by the single channel Wiener filter unit 40. Pieces of processing performed by the other units are the same as those in the first embodiment described above.

In this way, in the second modification of the first embodiment, the signal parameter analysis unit 20 obtains the simultaneous decorrelation matrix P as a matrix that is obtained so that all $P^H R_j P$ are caused to be close to the diagonal matrix or/and the Hermitian transposition $P^H$ thereof, for the spatial covariance matrix $R_j$ (j is an integral number equal to or larger than 1 and equal to or smaller than J) for modeling respective spatial characteristics of J (J is 2 in this modification) source signals that are present in a mixed manner, as a parameter for decorrelating components corresponding to the J source signals for the observation signal vectors based on the observation signals acquired at I (I is an integral number equal to or larger than 2) positions different from each other.

Third Modification of First Embodiment

Next, the following describes a third modification of the first embodiment. The third modification of the first embodiment describes a case in which J source signals are typically present, not limited to the case in which the two source signals are present, based on the method in the second modification of the first embodiment.

In the third modification of the first embodiment, in a situation in which the J source signals are present in a mixed manner, the I observation signals $y_i(k)$ acquired at different positions, the variance parameter $v_j(k)$ (j=1, . . . ; J is an index of the source signal) as a parameter for modeling variance (power) for each sample point of the source signal, and the spatial covariance matrix $R_j$ as a parameter for modeling the spatial characteristic of the source signal are assumed to be input to the signal analysis device 1.

In the third modification of the first embodiment, the signal parameter analysis unit 20 obtains the matrix P in which $\Lambda_1 = P^H R_1 P, \ldots, \Lambda_J = P^H R_J P$ are caused to be closer to certain diagonal matrices $\Sigma_1, \ldots, \Sigma_J$ as much as possible, and $\Lambda_1 = P^H R_1 P, \ldots, \Lambda_J = P^H R_J P$ at this point, based on optimization.

That is, in the third modification of the first embodiment, the signal parameter analysis unit 20 obtains the matrix P represented by the following expression (72) to expression (73), and $\Lambda_1 = P^H R_1 P, \ldots, \Lambda_J = P^H R_J P$ at this point.

$$P^H R_1 P \simeq \Sigma_1 {}^{(diagonal\ matrix)} \tag{72}$$

$$\ldots$$

$$P^H R_J P \simeq \Sigma_J {}^{(diagonal\ matrix)} \tag{73}$$

Specifically, by minimizing a cost function of the following expression (74) for the matrix P and each diagonal matrix $\Sigma_j$ (j is an integral number equal to or larger than 1 and equal to or smaller than J), the matrix P can be obtained.

$$\sum_{j=1}^{J} \underbrace{\left\| P^H R_j P - \sum\nolimits_j \right\|_F^2}_{\text{error between } P^H R_j P \text{ and } \Sigma_j} \tag{74}$$

For example, minimization of the cost function of the above expression can be performed in accordance with the algorithm described in reference document 2. In the third modification of the first embodiment, P that is obtained as described above can be used as the simultaneous decorrelation matrix. Additionally, based on $\Lambda_1 = P^H R_1 P, \ldots, \Lambda_J = P^H R_J P$, the estimation value $\hat{x}'_j(k)$ of the source signal component $x'_j(k)$ subjected to simultaneous decorrelation can be calculated.

Next, the following describes a configuration and processing of the signal analysis device 1 in a case in which the number of source signals is J. The signal analysis device 1 includes the observation signal vector creation unit 10, the signal parameter analysis unit 20, the simultaneous decorrelation unit 30, the single channel Wiener filter unit 40, and the simultaneous decorrelation inverse conversion unit 50. The observation signal vector creation unit 10 acquires the input observation signal $y_i(k)$, and creates the observation signal vector y(k) as an I-dimensional column vector constituted of all the observation signals for each sample point. The observation signal vector y(k) is represented by the following expression (75).

$$y(k) = (y_1(k) \ldots y_I(k))^T \tag{75}$$

The signal parameter analysis unit 20 acquires the input spatial covariance matrix $R_j$.

$$P^H R_1 P = \Lambda_1 \qquad (76)$$

$$\ldots \qquad (77)$$

$$P^H R_J P = \Lambda_J \qquad (78)$$

The signal parameter analysis unit 20 then calculates the simultaneous decorrelation matrix P in which each matrix $\Lambda_j$ (j is an integral number equal to or larger than 1 and equal to or smaller than J) defined by the expressions (76) to (78) described above becomes a diagonal matrix, and $\Lambda_1, \ldots, \Lambda_J$ at this point.

The simultaneous decorrelation unit 30 calculates the observation signal vector y'(k) subjected to simultaneous decorrelation based on the observation signal vector y(k) from the observation signal vector creation unit 10 and the simultaneous decorrelation matrix P from the signal parameter analysis unit 20. Specifically, as represented by expression (79), the simultaneous decorrelation unit 30 multiplies the observation signal vector y(k) by the Hermitian transposition $P^H$ of the simultaneous decorrelation matrix P to calculate the observation signal vector y'(k) subjected to simultaneous decorrelation.

$$y'(k) = P^H y(k) \qquad (79)$$

The simultaneous decorrelation indicates linear transformation for simultaneously decorrelating components (source signal components) corresponding to the J source signals included in the observation signal vector y(k).

The single channel Wiener filter unit 40 acquires the input variance parameter $v_j(k)$, and calculates the estimation value $\hat{x}'_j(k)$ of the source signal component $x'_j(k)$ subjected to simultaneous decorrelation based on the matrix $\Lambda_j$ from the signal parameter analysis unit 20 and the observation signal vector y'(k) subjected to simultaneous decorrelation from the simultaneous decorrelation unit 30. Specifically, the single channel Wiener filter unit 40 calculates the estimation value $\hat{x}'_j(k)$ of the source signal component $x'_j(k)$ subjected to simultaneous decorrelation by the following expression (80).

$$\hat{x}'_j(k) = \left( \frac{v_j(k)[\Lambda_j]_{11}}{\sum_{l=1}^{J} v_l(k)[\Lambda_l]_{11}} [y'(k)]_1 \quad \ldots \quad \frac{v_j(k)[\Lambda_j]_{ll}}{\sum_{l=1}^{J} v_l(k)[\Lambda_l]_{ll}} [y'(k)]_l \right)^T \qquad (80)$$

The simultaneous decorrelation inverse conversion unit 50 calculates and outputs the estimation value $\hat{x}_j(k)$ of the source signal component $x_j(k)$ based on the simultaneous decorrelation matrix P from the signal parameter analysis unit 20 and the estimation value $\hat{x}'_j(k)$ of the source signal component $x'_j(k)$ subjected to simultaneous decorrelation from the single channel Wiener filter unit 40. Specifically, as represented by expression (81), the simultaneous decorrelation inverse conversion unit 50 multiplies the estimation value $\hat{x}'_j(k)$ of the source signal component $x'_j(k)$ subjected to simultaneous decorrelation by the inverse matrix $(P^H)^{-1}$ of the matrix $P^H$ multiplied by the simultaneous decorrelation unit 30 to calculate and output the estimation value $\hat{x}_j(k)$ of the source signal component $x_j(k)$.

$$\hat{x}_j(k) = (P^H)^{-1} \hat{x}'_j(k) \qquad (81)$$

In this way, in the third modification of the first embodiment, the signal parameter analysis unit 20 obtains the simultaneous decorrelation matrix P as a matrix that is obtained so that all $P^H R_j P$ are caused to be close to the diagonal matrix or/and the Hermitian transposition $P^H$ thereof, for the spatial covariance matrix $R_j$ (j is an integral number equal to or larger than 1 and equal to or smaller than J) for modeling the respective spatial characteristics of the J (J is an integral number equal to or larger than 2) source signals that are present in a mixed manner, as a parameter for decorrelating components corresponding to the J source signals for the observation signal vectors based on the observation signals acquired at the I (I is an integral number equal to or larger than 2) positions different from each other.

Effects of First Embodiment and First to Third Modifications of First Embodiment In this way, according to the first embodiment and the first to the third modifications of the first embodiment, the estimation value $\hat{x}_j(k)$ of the source signal component $x_j(k)$ can be calculated with a small calculation amount. Specifically, with the configuration based on eigenvalue analysis in the first embodiment, signal separation can be performed with a smaller calculation amount than that in the related art without deteriorating the signal separation performance as compared with the related art.

In the second and the third modifications of the first embodiment, the matrix $\Lambda_j$ is obtained to be closer to the diagonal matrix $\Sigma_j$. However, actually, the matrix $\Lambda_j$ does not become the diagonal matrix in some cases. In this case, processing of the single channel Wiener filter is performed by using, as $\lambda$, a "diagonal component" of the matrix $\Lambda_j$=matrix $P^H R_j P$ that is close to the diagonal matrix. Thus, in the processing of the single channel Wiener filter according to the second and the third modifications of the first embodiment, only the diagonal component is used without using a nondiagonal component of the matrix $\Lambda_j$, so that the configuration may be such that the nondiagonal component is not specified.

Second Embodiment

Next, the following describes a configuration, a processing procedure, and an effect of the signal analysis device according to a second embodiment.

As described above in the first embodiment, in a case in which the variance parameter $v_j(k)$ and the spatial covariance matrix $R_j$ are known, the estimation value $\hat{x}_j(k)$ of the source signal component $x_j(k)$ can be calculated based on the variance parameter $v_j(k)$ and the spatial covariance matrix $R_j$. On the other hand, in a case in which the variance parameter $v_j(k)$ and the spatial covariance matrix $R_j$ are unknown, the variance parameter $v_j(k)$ and the spatial covariance matrix $R_j$ are requested to be estimated.

Thus, the second embodiment describes a method of estimating the variance parameter $v_j(k)$ and the spatial covariance matrix $R_j$, and the source signal component $x_j(k)$ at the same time using an iterative method in a situation in which the two source signals are present in a mixed manner. In the second embodiment, the I observation signals $y_i(k)$ acquired at different positions are assumed to be input to the signal analysis device.

[Configuration and Processing of Signal Analysis Device]

Figure 3:
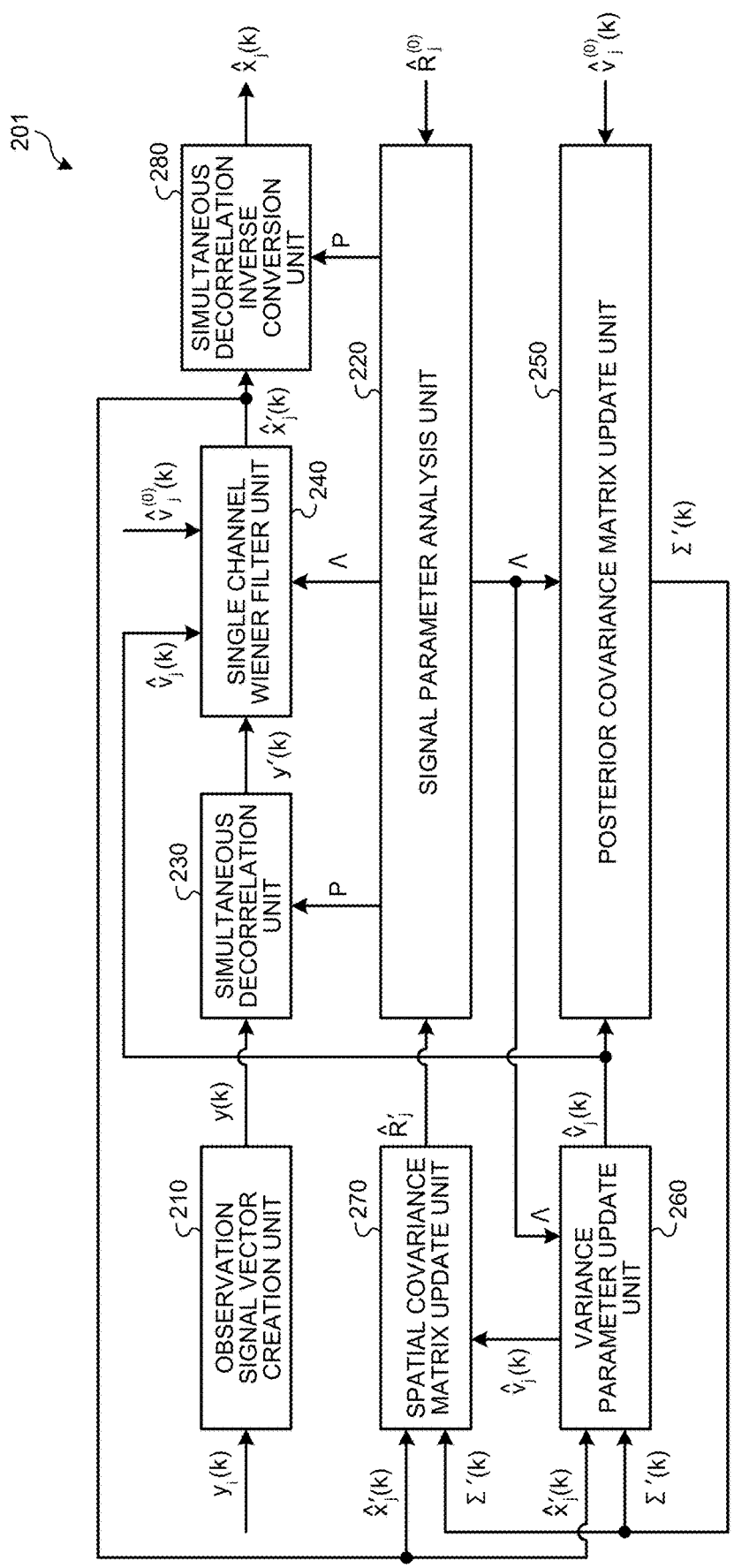
FIG. 3 is a diagram illustrating an example of a configuration of a signal analysis device according to a second embodiment.
Figure 4:
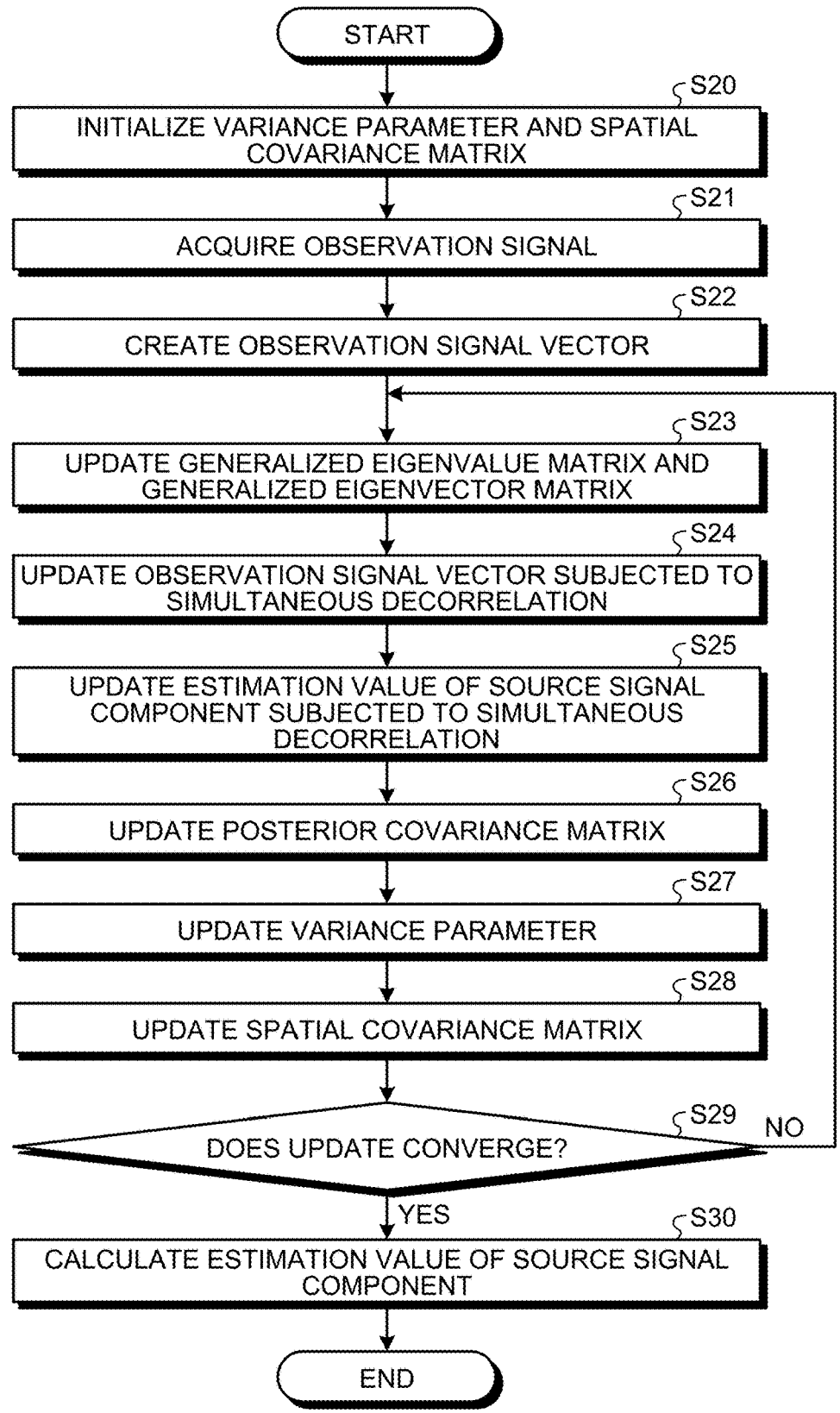
FIG. 4 is a flowchart illustrating an example of a processing procedure of signal analysis processing according to the second embodiment.

With reference to FIG. 3 and FIG. 4, the following describes a configuration of the signal analysis device and a processing procedure of the signal analysis processing according to the second embodiment. FIG. 3 is a diagram illustrating an example of the configuration of the signal analysis device according to the second embodiment. FIG. 4 is a flowchart illustrating an example of the processing procedure of the signal analysis processing according to the second embodiment.

As illustrated in FIG. 3, a signal analysis device 201 includes an initialization unit (not illustrated), an observation signal vector creation unit 210, a signal parameter analysis unit 220, a simultaneous decorrelation unit 230, a single channel Wiener filter unit 240, a posterior covariance matrix update unit 250, a variance parameter update unit 260, a spatial covariance matrix update unit 270, a convergence determination unit (not illustrated), and a simultaneous decorrelation inverse conversion unit 280.

First, the following describes an outline of each unit of the signal analysis device 201. The initialization unit (not illustrated) sets an initial estimation value $\hat{v}_j^{(0)}(k)$ of the variance parameter $v_j(k)$ and an initial estimation value $\hat{R}_j^{(0)}$ of the spatial covariance matrix $R_j$ (Step S20). These values may be set based on a random number, for example.

The observation signal vector creation unit 210 acquires the input observation signal $y_i(k)$ (Step S21), and creates the observation signal vector $y(k)$ as an I-dimensional column vector constituted of all the observation signals for each sample point (Step S22).

The signal parameter analysis unit 220 updates the generalized eigenvalue matrix $\Lambda$ and the generalized eigenvector matrix P by solving the generalized eigenvalue problem based on the estimation value $\hat{R}'_j$ of the spatial covariance matrix $R'_j$ subjected to simultaneous decorrelation from the spatial covariance matrix update unit 270 (as an exception, the initial estimation value $\hat{R}_j^{(0)}$ of the input spatial covariance matrix $R_j$ is used at the time of the first processing performed by the signal parameter analysis unit 220) (Step S23).

The simultaneous decorrelation unit 230 updates the observation signal vector $y'(k)$ subjected to simultaneous decorrelation based on the observation signal vector $y(k)$ from the observation signal vector creation unit 210 and the generalized eigenvector matrix P from the signal parameter analysis unit 220 (Step S24).

The single channel Wiener filter unit 240 updates the estimation value $\hat{x}'_j(k)$ of the source signal component $x'_j(k)$ subjected to simultaneous decorrelation based on the generalized eigenvalue matrix $\Lambda$ from the signal parameter analysis unit 220, the observation signal vector $y'(k)$ subjected to simultaneous decorrelation from the simultaneous decorrelation unit 230, and the estimation value $\hat{v}_j(k)$ of the variance parameter $v_j(k)$ from the variance parameter update unit 260 (as an exception, the initial estimation value $\hat{v}_j^{(0)}(k)$ of the input variance parameter $v_j(k)$ is used at the time of the first processing performed by the single channel Wiener filter unit 240) (Step S25).

The posterior covariance matrix update unit 250 updates a posterior covariance matrix $\Sigma'(k)$ subjected to simultaneous decorrelation based on the generalized eigenvalue matrix $\Lambda$ from the signal parameter analysis unit 220, and the estimation value $\hat{v}_j(k)$ of the variance parameter $v_j(k)$ from the variance parameter update unit 260 (as an exception, the initial estimation value $\hat{v}_j^{(0)}(k)$ of the input variance parameter $v_j(k)$ is used at the time of the first processing performed by the posterior covariance matrix update unit 250) (Step S26).

The variance parameter update unit 260 updates the estimation value $\hat{v}_j(k)$ of the variance parameter $v_j(k)$ based on the generalized eigenvalue matrix $\Lambda$ from the signal parameter analysis unit 220, the estimation value $\hat{x}'_j(k)$ of the source signal component $x'_j(k)$ subjected to simultaneous decorrelation from the single channel Wiener filter unit 240, and the posterior covariance matrix $\Sigma'(k)$ subjected to simultaneous decorrelation from the posterior covariance matrix update unit 250 (Step S27).

The spatial covariance matrix update unit 270 updates the estimation value $\hat{R}'_j$ of the spatial covariance matrix $R'_j$ subjected to simultaneous decorrelation based on the estimation value $\hat{x}'_j(k)$ of the source signal component $x'_j(k)$ subjected to simultaneous decorrelation from the single channel Wiener filter unit 240, the posterior covariance matrix $\Sigma'(k)$ subjected to simultaneous decorrelation from the posterior covariance matrix update unit 250, and the estimation value $\hat{v}_j(k)$ of the variance parameter $v_j(k)$ from the variance parameter update unit 260 (Step S28).

The convergence determination unit (not illustrated) determines whether the update converges (Step S29). If the convergence determination unit determines that the update does not converge (No at Step S29), the process returns to the processing performed by the signal parameter analysis unit 220 at Step S23, and the processing is continued.

On the other hand, if the convergence determination unit determines that the update converges (Yes at Step S29), the following processing is performed by the simultaneous decorrelation inverse conversion unit 280.

Specifically, the simultaneous decorrelation inverse conversion unit 280 calculates and outputs the estimation value $\hat{x}_j(k)$ of the source signal component $x_j(k)$ based on the generalized eigenvector matrix P from the signal parameter analysis unit 220 and the estimation value $\hat{x}'_j(k)$ of the source signal component $x'_j(k)$ subjected to simultaneous decorrelation from the single channel Wiener filter unit 240 (Step S30).

Next, the following describes details about each unit of the signal analysis device 201. The initialization unit is described above.

The observation signal vector creation unit 210 acquires the input observation signal $y_i(k)$, and creates the observation signal vector $y(k)$ as an I-dimensional column vector constituted of all the observation signals by the following expression (82).

$$y(k) = (y_1(k) \ldots y_I(k))^T \tag{82}$$

The signal parameter analysis unit 220 receives the initial estimation value $\hat{R}_j^{(0)}$ of the spatial covariance matrix $R_j$ from the initialization unit at the time of the first processing performed by the signal parameter analysis unit 220. The signal parameter analysis unit 220 calculates the generalized eigenvalues $\lambda_1, \ldots, \lambda_I$, and the generalized eigenvectors $p_1, \ldots, p_I$ respectively corresponding to $\lambda_1, \ldots, \lambda_I$ satisfying expression (83) by solving the generalized eigenvalue problem for $\hat{R}_1^{(0)}$ and $\hat{R}_2^{(0)}$.

$$p_l^H \hat{R}_2^{(0)} p_m = \begin{cases} 1, & l = m \\ 0, & l \neq m \end{cases} \tag{83}$$

Due to this, the signal parameter analysis unit 220 updates the generalized eigenvalue matrix $\Lambda$ and the generalized eigenvector matrix P by the following expression (84) and expression (85).

$$\Lambda \leftarrow \begin{pmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_I \end{pmatrix} \quad (84)$$

$$P \leftarrow (p_1 \ \cdots \ p_I) \quad (85)$$

The signal parameter analysis unit 220 calculates the generalized eigenvalues $\lambda_1, \ldots, \lambda_I$, and the generalized eigenvectors $q_1, \ldots, q_I$ respectively corresponding to $\lambda_1, \ldots, \lambda_I$ satisfying expression (86) by receiving the estimation value $\hat{R}'_j$ of the spatial covariance matrix $R'_j$ subjected to simultaneous decorrelation from the spatial covariance matrix update unit 270 and solving the generalized eigenvalue problem for $\hat{R}'_1$ and $\hat{R}'_2$ at the time of the second and subsequent processing performed by the signal parameter analysis unit 220.

$$q_l^H \hat{R}'_2 q_m = \begin{cases} 1, & l = m \\ 0, & l \neq m \end{cases} \quad (86)$$

The signal parameter analysis unit 220 then updates the generalized eigenvalue matrix $\Lambda$ and the matrix $Q$ by expression (87) and expression (88).

$$\Lambda \leftarrow \begin{pmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_I \end{pmatrix} \quad (87)$$

$$Q \leftarrow (q_1 \ \ldots \ q_I) \quad (88)$$

The signal parameter analysis unit 220 then updates the generalized eigenvector matrix $P$ by the following expression (89).

$$P \leftarrow PQ \quad (89)$$

As represented by expression (90), the simultaneous decorrelation unit 230 updates the observation signal vector $y'(k)$ subjected to simultaneous decorrelation by multiplying the observation signal vector $y(k)$ by the Hermitian transposition $P^H$ of the generalized eigenvector matrix $P$.

$$y'(k) \leftarrow P^H y(k) \quad (90)$$

The single channel Wiener filter unit 240 updates the estimation value $\hat{x}'_j(k)$ of the source signal component $x'_j(k)$ subjected to simultaneous decorrelation by expression (91) and expression (92).

$$\hat{x}'_1(k) \leftarrow \quad (91)$$
$$\left( \frac{\hat{v}_1(k)[\Lambda]_{11}}{\hat{v}_1(k)[\Lambda]_{11} + \hat{v}_2(k)} [y'(k)]_1 \ \cdots \ \frac{\hat{v}_1(k)[\Lambda]_{II}}{\hat{v}_1(k)[\Lambda]_{II} + \hat{v}_2(k)} [y'(k)]_I \right)^T$$

$$\hat{x}'_2(k) \leftarrow \quad (92)$$
$$\left( \frac{\hat{v}_2(k)}{\hat{v}_1(k)[\Lambda]_{11} + \hat{v}_2(k)} [y'(k)]_1 \ \cdots \ \frac{\hat{v}_2(k)}{\hat{v}_1(k)[\Lambda]_{II} + \hat{v}_2(k)} [y'(k)]_I \right)^T$$

As an exception, at the time of the first processing performed by the single channel Wiener filter unit 240, the initial estimation value $\hat{v}_j^{(0)}(k)$ of the variance parameter $v_j(k)$ from the initialization unit is used instead of the estimation value $\hat{v}_j(k)$ of the variance parameter $v_j(k)$ from the variance parameter update unit 260 in the above two expressions.

The posterior covariance matrix update unit 250 updates the posterior covariance matrix $\Sigma'(k)$ subjected to simultaneous decorrelation by the following expression (93).

$$\Sigma'(k) \leftarrow \quad (93)$$
$$\begin{pmatrix} \frac{\hat{v}_1(k)\hat{v}_2(k)[\Lambda]_{11}}{\hat{v}_1(k)[\Lambda]_{11} + \hat{v}_2(k)} & 0 & \cdots & 0 \\ 0 & \frac{\hat{v}_1(k)\hat{v}_2(k)[\Lambda]_{22}}{\hat{v}_1(k)[\Lambda]_{22} + \hat{v}_2(k)} & \cdots & 0 \\ \vdots & \vdots & \ddots & \vdots \\ 0 & 0 & \cdots & \frac{\hat{v}_1(k)\hat{v}_2(k)[\Lambda]_{II}}{\hat{v}_1(k)[\Lambda]_{II} + \hat{v}_2(k)} \end{pmatrix}$$

As an exception, at the time of the first processing performed by the posterior covariance matrix update unit 250, the initial estimation value $\hat{v}_j^{(0)}(k)$ of the variance parameter $v_j(k)$ from the initialization unit is used instead of the estimation value $\hat{v}_j(k)$ of the variance parameter $v_j(k)$ from the variance parameter update unit 260 in the above expression.

The variance parameter update unit 260 updates the estimation value $\hat{v}_j(k)$ of the variance parameter $v_j(k)$ by the following expression (94).

$$\hat{v}_j(k) \leftarrow \begin{cases} \dfrac{1}{I} \sum_{i=1}^{I} \dfrac{|[\hat{x}'_1(k)]_i|^2 + [\Sigma'(k)]_{ii}}{[\Lambda]_{ii}}, & j = 1 \\ \dfrac{1}{I} \sum_{i=1}^{I} \left( |[\hat{x}'_2(k)]_i|^2 + [\Sigma'(k)]_{ii} \right), & j = 2 \end{cases} \quad (94)$$

The spatial covariance matrix update unit 270 updates the estimation value $\hat{R}'_j$ of the spatial covariance matrix $R'_j$ subjected to simultaneous decorrelation by the following expression (95). In expression (95), K represents the number of sample points.

$$\hat{R}'_j \leftarrow \frac{1}{K} \sum_{k=1}^{K} \frac{1}{\hat{v}_j(k)} \left( \hat{x}'_j(k)\hat{x}'_j(k)^H + \Sigma'(k) \right) \quad (95)$$

The simultaneous decorrelation inverse conversion unit 280 calculates and outputs the estimation value $\hat{x}_j(k)$ of the source signal component $x_j(k)$ by the following expression (96).

$$\hat{x}_j(k) = (P^H)^{-1} \hat{x}'_j(k) \quad (96)$$

[Background of Processing Performed by Signal Analysis Device According to Second Embodiment]

[Conventional Signal Analysis Method]

Next, the following describes a background of processing performed by the signal analysis device 201. First, the following describes the related art. Non Patent Document 1 discloses the method of estimating the variance parameter $v_j(k)$ and the spatial covariance matrix $R_j$, and the source signal component $x_j(k)$ at the same time using the iterative method in a situation in which two source signals are present in a mixed manner.

The following describes modeling of the observation signal vector $y(k)$ in the related art. The source signal component $x_j(k)$ in expression (9) is assumed to follow a complex gaussian distribution the mean of which is 0 and the covariance matrix thereof is $v_j(k)R_j$ as represented by the following expression (97).

$$p(x_j(k)) = \mathcal{N}(x_j(k); 0, v_j(k)R_j) \tag{97}$$

In this case, $N(z; \mu, \Sigma)$ represents a complex gaussian distribution (expression (98)) the mean of which is $\mu$ and the covariance matrix thereof is $\Sigma$.

$$\mathcal{N}(z; \mu, \Sigma) = \frac{1}{\det(\pi\Sigma)} \exp\left(-(z-\mu)^H \Sigma^{-1} (z-\mu)\right) \tag{98}$$

It is assumed that the two source signal components $x_1(k)$ and $x_2(k)$ are not correlated with each other. Under a condition to which the observation signal vector $y(k)$ is given, a posterior probability density of the source signal component $x_j(k)$ is given by the following expression (99) (for example, refer to Non Patent Document 1).

$$p(x_j(k)|y(k)) = \mathcal{N}(x_j(k); \hat{x}_j(k), \Sigma_j(k)) \tag{99}$$

In this case, the mean $\hat{x}_j(k)$ and the covariance matrix $\Sigma_j(k)$ are given by the following expression (100) and expression (101).

$$\hat{x}_j(k) = v_j(k)R_j(v_1(k)R_1 + v_2(k)R_2)^{-1} y(k) \tag{100}$$

$$\Sigma_j(k) = (v_1(k)R_1)(v_1(k)R_1 + v_2(k)R_2)^{-1}(v_2(k)R_2) \tag{101}$$

The mean $\hat{x}_j(k)$ in expression (100) is nothing but the estimation value $\hat{x}_j(k)$ of the source signal component $x_j(k)$ based on the multichannel Wiener filter in expression (10) (due to this, the same symbol is used for both). Thus, it is found that the estimation value $\hat{x}_j(k)$ of the source signal component $x_j(k)$ based on the multichannel Wiener filter in expression (10) can be interpreted as a point for maximizing the posterior probability density of the source signal component $x_j(k)$ under a condition to which the observation signal vector $y(k)$ is given. Expression (101) is independent of j, so that it is written as expression (102).

$$\Sigma_1(k) = \Sigma_2(k) = \Sigma(k) \tag{102}$$

In the related art, through the first processing to the fourth processing described below, the variance parameter $v_j(k)$ and the spatial covariance matrix $R_j$, and the source signal component $x_j(k)$ are estimated at the same time.

In the first processing, the estimation value $\hat{v}_j(k)$ of the variance parameter $v_j(k)$ and the estimation value $\hat{R}_j$ of the spatial covariance matrix $R_j$ are initialized. These values may be initialized based on a random number, for example.

In the second processing, the source signal component $x_j(k)$ is estimated based on the estimation value $\hat{v}_j(k)$ of the variance parameter $v_j(k)$ and the estimation value $\hat{R}_j$ of the spatial covariance matrix $R_j$. While one estimation value $\hat{x}_j(k)$ of the source signal component $x_j(k)$ is calculated in the first embodiment, the posterior probability density of the source signal component $x_j(k)$ (refer to expression (99)) is updated herein. Specifically, the mean $\hat{x}_j(k)$ of expression (99) and the covariance matrix $(k)$ (which is equal to $\Sigma_1(k)$ and $\Sigma_2(k)$ as represented by expression (102). Also refer to expression (101)) are updated by the following expression (103) and expression (104).

$$\hat{x}_j(k) \leftarrow \hat{v}_j(k)\hat{R}_j(\hat{v}_1(k)\hat{R}_1 + \hat{v}_2(k)\hat{R}_2)^{-1} y(k) \tag{103}$$

$$\Sigma(k) \leftarrow (\hat{v}_1(k)\hat{R}_1)(\hat{v}_1(k)\hat{R}_1 + \hat{v}_2(k)\hat{R}_2)^{-1}(\hat{v}_2(k)\hat{R}_2) \tag{104}$$

In the third processing, the estimation value $\hat{v}_j(k)$ of the variance parameter $v(k)$ and the estimation value $\hat{R}_j$ of the spatial covariance matrix $R_j$ are updated by the following expression (105) and expression (106) based on the mean $\hat{x}_j(k)$ of the posterior probability density of the source signal component $x_j(k)$ and the covariance matrix $\Sigma(k)$. In this case, tr represents a trace.

$$\hat{v}_j(k) \leftarrow \frac{1}{I} tr[(\hat{R}_j)^{-1}(\hat{x}_j(k)\hat{x}_j(k)^H + \Sigma(k))] \tag{105}$$

$$\hat{R}_j \leftarrow \frac{1}{K} \sum_{k=1}^{K} \frac{1}{\hat{v}_j(k)} (\hat{x}_j(k)\hat{x}_j(k)^H + \Sigma(k)) \tag{106}$$

In the fourth processing, the second and the third processing are alternately iterated until the update converges, and in a case in which it converges, the estimation value $\hat{x}_j(k)$ of the source signal component $x_j(k)$ is output.

As a problem of the related art, the related art is difficult to be applied to processing of a large-scale data set in which the number of sample points k is extensive, real-time processing requested to be performed in a short time, an appliance having a low calculation capacity, or the like because a huge amount of calculation is requested.

Actually, in the related art, at the time of calculating the estimation value $\hat{x}_j(k)$ of the source signal component $x_j(k)$ and the posterior covariance matrix $\Sigma(k)$, inverse matrix calculation (specifically, calculation of $(v_1(k)R_1 + v_2(k)R_2)^{-1}$) and matrix multiplication (specifically, calculation of $(v_1(k)R_1)(v_1(k)R_1 + v_2(k)R_2)^{-1}(v_2(k)R_2)$) are requested to be performed for each sample point (that is, multiple times). Both of the inverse matrix calculation and the matrix multiplication are arithmetic operations requesting a large calculation amount of $O(I^3)$ for the I-th order matrix. The number of sample points typically ranges from several hundreds to tens of millions.

Due to this, in the conventional signal analysis method, a huge amount of calculation is requested to calculate the estimation value $\hat{x}_j(k)$ of the source signal component $x_j(k)$ and the posterior covariance matrix $\Sigma(k)$. Additionally, in the related art, the entire signal analysis device is requested to perform iteration in the fourth processing described above (the number of iterations typically reaches several tens of times), so that the calculation amount becomes much more extensive.

[Signal Analysis Method According to Second Embodiment]

On the other hand, the second embodiment provides a method of calculating the estimation value $\hat{x}_j(k)$ of the source signal component $x_j(k)$, the posterior covariance matrix $\Sigma(k)$, the spatial covariance matrix R, and the variance parameter v with a small calculation amount based on simultaneous decorrelation of the two source signal components $x_1(k)$ and $x_2(k)$. As a result, signal analysis can be implemented with a small calculation amount by the signal analysis device 201 as a whole. The following describes a concept of the second embodiment.

By clearly indicating the number of times in sequence of iteration in expression (103) to expression (106) as update rules in the related art (refer to Non Patent Document 1), the following expression (107) to expression (110) are obtained. In this case, n=1, ..., N is an index representing the number of times in sequence of iteration and N is the number of times of iteration.

$$\hat{x}_j^{(n)}(k) = \hat{v}_j^{(n-1)}(k)\hat{R}_j^{(n-1)}(\hat{v}_1^{(n-1)}(k)\hat{R}_1^{(n-1)} + \hat{v}_2^{(n-1)}(k)\hat{R}_2^{(n-1)})^{-1} y(k) \quad (107)$$

$$\sum^{(n)}(k) = \qquad (108)$$
$$(\hat{v}_1^{(n-1)}(k)\hat{R}_1^{(n-1)})(\hat{v}_1^{(n-1)}(k)\hat{R}_1^{(n-1)} + \hat{v}_2^{(n-1)}(k)\hat{R}_2^{(n-1)})^{-1}(\hat{v}_2^{(n-1)}(k)\hat{R}_2^{(n-1)})$$

$$\hat{v}_j^{(n)}(k) = \frac{1}{I}tr[(\hat{R}_j^{(n-1)})^{-1}(\hat{x}_j^{(n)}(k)\hat{x}_j^{(n)}(k)^H + \sum^{(n)}(k))] \quad (109)$$

$$\hat{R}_j^{(n)} = \frac{1}{K}\sum_{k=1}^{K}\frac{1}{\hat{v}_j^{(n)}(k)}(\hat{x}_j^{(n)}(k)\hat{x}_j^{(n)}(k)^H + \sum^{(n)}(k)) \quad (110)$$

The generalized eigenvalue matrix and the generalized eigenvector matrix that are defined similarly to the first embodiment for the generalized eigenvalue problem of estimation values $\hat{R}_1^{(n-1)}$ and $\hat{R}_2^{(n-1)}$ of the spatial covariance matrices $R_1$ and $R_2$ are represented by $\Lambda^{(n-1)}$ and $P^{(n-1)}$. These satisfy expression (111) and expression (112).

$$P^{(n-1)H}\hat{R}_1^{(n-1)}P^{(n-1)} = \Lambda^{(n-1)} \quad (111)$$

$$P^{(n-1)H}\hat{R}_2^{(n-2)}P^{(n-1)} = I \quad (112)$$

That is, $\Lambda^{(n-1)}$ and $P^{(n-1)}$ satisfy expression (113) and expression (114). $P^{(n-1)}$ is a matrix for implementing simultaneous decorrelation (simultaneous diagonalization), so that $P^{(n-1)}$ is also referred to as a simultaneous decorrelation matrix from that point of view.

$$\hat{R}_1^{(n-1)} = (P^{(n-1)H})^{-1}\Lambda^{(n-1)}(P^{(n-1)})^{-1} \quad (113)$$

$$\hat{R}_2^{(n-1)} = (P^{(n-1)H})^{-1}(P^{(n-1)})^{-1} \quad (114)$$

By substituting expression (113) and expression (114) for expression (107) to be organized to eliminate the inverse matrix operation for each sample point from expression (107), the following expression (115) and expression (116) are obtained similarly to the first embodiment.

$$\hat{x}_1^{(n)}(k) = \qquad (115)$$

$$(P^{(n-1)H})^{-1}\begin{pmatrix} \frac{\hat{v}_1^{(n-1)}(k)[\Lambda^{(n-1)}]_{11}}{\hat{v}_1^{(n-1)}(k)[\Lambda^{(n-1)}]_{11} + \hat{v}_2^{(n-1)}(k)} & \cdots & 0 \\ \vdots & \ddots & \vdots \\ 0 & \cdots & \frac{\hat{v}_1^{(n-1)}(k)[\Lambda^{(n-1)}]_{II}}{\hat{v}_1^{(n-1)}(k)[\Lambda^{(n-1)}]_{II} + \hat{v}_2^{(n-1)}(k)} \end{pmatrix} y'^{(n-1)}(k)$$

$$\quad (116)$$

$$\hat{x}_2^{(n)}(k) =$$

$$(P^{(n-1)H})^{-1}\begin{pmatrix} \frac{\hat{v}_2^{(n-1)}(k)}{\hat{v}_1^{(n-1)}(k)[\Lambda^{(n-1)}]_{11} + \hat{v}_2^{(n-1)}(k)} & \cdots & 0 \\ \vdots & \ddots & \vdots \\ 0 & \cdots & \frac{\hat{v}_2^{(n-1)}(k)}{\hat{v}_1^{(n-1)}(k)[\Lambda^{(n-1)}]_{II} + \hat{v}_2^{(n-1)}(k)} \end{pmatrix} y'^{(n-1)}(k)$$

where, $y'^{(n-1)}(k) = P^{(n-1)H} y(k)$ \quad (117)

is the observation signal vector subjected to simultaneous decorrelation.

Similarly, by substituting expression (113) and expression (114) for expression (108) to eliminate the inverse matrix operation for each sample point from expression (108), the following expression (118) to expression (121) are obtained.

$$\sum^{(n)}(k) = \hat{v}_1^{(n-1)}(k)(P^{(n-1)H})^{-1}\Lambda^{(n-1)}(P^{(n-1)})^{-1} \times \qquad (118)$$

$$(\hat{v}_1^{(n-1)}(k)(P^{(n-1)H})^{-1}\Lambda^{(n-1)}(P^{(n-1)})^{-1} + \hat{v}_2^{(n-1)}(k)(P^{(n-1)H})^{-1}(P^{(n-1)})^{-1})^{-1} \times (\hat{v}_2^{(n-1)}(k)(P^{(n-1)H})^{-1}(P^{(n-1)})^{-1})$$

$$= \hat{v}_1^{(n-1)}(k)(P^{(n-1)H})^{-1}\Lambda^{(n-1)}(P^{(n-1)})^{-1} \times P^{(n-1)}(\hat{v}_1^{(n-1)}(k)\Lambda^{(n-1)} + \hat{v}_2^{(n-1)}(k)I)^{-1} P^{(n-1)H} \times (\hat{v}_2^{(n-1)}(k)(P^{(n-1)H})^{-1}(P^{(n-1)})^{-1}) \quad (119)$$

$$= (P^{(n-1)H})^{-1}(\hat{v}_1^{(n-1)}(k)\hat{v}_2^{(n-1)}(k)\Lambda^{(n-1)})(\hat{v}_1^{(n-1)}(k)\Lambda^{(n-1)} + \hat{v}_2^{(n-1)}(k)I)^{-1}(P^{(n-1)})^{-1} \quad (120)$$

-continued $$= \left(P^{(n-1)H}\right)^{-1} \begin{pmatrix} \frac{\hat{v}_1^{(n-1)}(k)\hat{v}_2^{(n-1)}(k)\left[\Lambda^{(n-1)}\right]_{11}}{\hat{v}_1^{(n-1)}(k)\left[\Lambda^{(n-1)}\right]_{11}+\hat{v}_2^{(n-1)}(k)} & \cdots & 0 \\ \vdots & \ddots & \vdots \\ 0 & \cdots & \frac{\hat{v}_1^{(n-1)}(k)\hat{v}_2^{(n-1)}(k)\left[\Lambda^{(n-1)}\right]_{II}}{\hat{v}_1^{(n-1)}(k)\left[\Lambda^{(n-1)}\right]_{II}+\hat{v}_2^{(n-1)}(k)} \end{pmatrix} \left(P^{(n-1)}\right)^{-1}$$

(121)

In this way, the inverse matrix operation for each sample point can be eliminated. However, expression (121) still includes matrix multiplication for each sample point. Thus, it is considered that $\Sigma'^{(n)}(k)$ defined by expression (122) is updated instead of $\Sigma^{(n)}(k)$.

$$\Sigma'^{(n)}(k) = P^{(n-1)H}\Sigma^{(n)}(k)P^{(n-1)} \quad (122)$$

Based on expression (121), $\Sigma'^{(n)}(k)$ can be represented by expression (123).

$$\Sigma'^{(n)}(k) = \begin{pmatrix} \frac{\hat{v}_1^{(n-1)}(k)\hat{v}_2^{(n-1)}(k)\left[\Lambda^{(n-1)}\right]_{11}}{\hat{v}_1^{(n-1)}(k)\left[\Lambda^{(n-1)}\right]_{11}+\hat{v}_2^{(n-1)}(k)} & \cdots & 0 \\ \vdots & \ddots & \vdots \\ 0 & \cdots & \frac{\hat{v}_1^{(n-1)}(k)\hat{v}_2^{(n-1)}(k)\left[\Lambda^{(n-1)}\right]_{II}}{\hat{v}_1^{(n-1)}(k)\left[\Lambda^{(n-1)}\right]_{II}+\hat{v}_2^{(n-1)}(k)} \end{pmatrix}$$

(123)

Expression (123) does not include matrix multiplication for each sample point. $\Sigma'^{(n)}(k)$ can be regarded as a posterior covariance matrix subjected to linear transformation of simultaneous decorrelation, so that $\Sigma'^{(n)}(k)$ is referred to as the posterior covariance matrix subjected to simultaneous decorrelation hereinafter.

In expression (115) and expression (116), it is considered that $\hat{x}'_j{}^{(n)}(k)$ defined by expression (124) is updated instead of $\hat{x}_j{}^{(n)}(k)$.

$$\hat{x}'_j{}^{(n)}(k) = P^{(n-1)H}\hat{x}_j{}^{(n)}(k) \quad (124)$$

Based on expression (115) and expression (116), expression (125) and expression (126) are obtained.

$$\hat{x}'_1{}^{(n)}(k) = \begin{pmatrix} \frac{\hat{v}_1^{(n-1)}(k)\left[\Lambda^{(n-1)}\right]_{11}}{\hat{v}_1^{(n-1)}(k)\left[\Lambda^{(n-1)}\right]_{11}+\hat{v}_2^{(n-1)}(k)} & \cdots & 0 \\ \vdots & \ddots & \vdots \\ 0 & \cdots & \frac{\hat{v}_1^{(n-1)}(k)\left[\Lambda^{(n-1)}\right]_{II}}{\hat{v}_1^{(n-1)}(k)\left[\Lambda^{(n-1)}\right]_{II}+\hat{v}_2^{(n-1)}(k)} \end{pmatrix} y'^{(n-1)}(k)$$

(125)

$$\hat{x}'_2{}^{(n)}(k) = \begin{pmatrix} \frac{\hat{v}_2^{(n-1)}(k)}{\hat{v}_1^{(n-1)}(k)\left[\Lambda^{(n-1)}\right]_{11}+\hat{v}_2^{(n-1)}(k)} & \cdots & 0 \\ \vdots & \ddots & \vdots \\ 0 & \cdots & \frac{\hat{v}_2^{(n-1)}(k)}{\hat{v}_1^{(n-1)}(k)\left[\Lambda^{(n-1)}\right]_{II}+\hat{v}_2^{(n-1)}(k)} \end{pmatrix} y'^{(n-1)}(k)$$

(126)

$\hat{x}'^{(n)}_j(k)$ is a source signal component subjected to simultaneous decorrelation.

Next, focusing on expression (109), expression (109) depends on $\hat{x}^{(n)}_j(k)$ and $\Sigma^{(n)}(k)$. As described above, in the second embodiment, $\hat{x}'^{(n)}_j(k)$ and $\Sigma'^{(n)}(k)$ are updated instead of $\hat{x}^{(n)}_j(k)$ and $\Sigma^{(n)}(k)$. Thus, expression (109) is requested to be rewritten into a form that can be calculated by using $\hat{x}'^{(n)}_j(k)$ and $\Sigma'^{(n)}(k)$. Based on expression (124) and expression (122), $\hat{x}^{(n)}_j(k)$ and $\Sigma^{(n)}(k)$ can be represented as expression (127) and expression (128).

$$\hat{x}^{(n)}_j(k) = (P^{(n-1)H})^{-1} \hat{x}'^{(n)}_j(k) \tag{127}$$

$$\Sigma^{(n)}(k) = (P^{(n-1)H})^{-1} \Sigma'^{(n)}(k) (P^{(n-1)})^{-1} \tag{128}$$

By substituting these for expression (109), expression (134) is obtained through expression (129) to expression (133).

$$\hat{v}^{(n)}_j(k) = \frac{1}{I} tr \left[ (\hat{R}^{(n-1)}_j)^{-1} \left( (P^{(n-1)H})^{-1} \hat{x}'^{(n)}_j(k) \hat{x}'^{(n)}_j(k)^H (P^{(n-1)})^{-1} + (P^{(n-1)H})^{-1} \sum\nolimits^{'(n)}(k) (P^{(n-1)})^{-1} \right) \right] \tag{129}$$

$$= \frac{1}{I} tr \left[ (\hat{R}^{(n-1)}_j)^{-1} (P^{(n-1)H})^{-1} \left( \hat{x}'^{(n)}_j(k) \hat{x}'^{(n)}_j(k)^H + \sum\nolimits^{'(n)}(k) \right) (P^{(n-1)})^{-1} \right] \tag{130}$$

$$= \frac{1}{I} tr \left[ (P^{(n-1)})^{-1} (\hat{R}^{(n-1)}_j)^{-1} (P^{(n-1)H})^{-1} \left( \hat{x}'^{(n)}_j(k) \hat{x}'^{(n)}_j(k)^H + \sum\nolimits^{'(n)}(k) \right) \right] \tag{131}$$

$$= \frac{1}{I} tr \left[ \left( P^{(n-1)H} \hat{R}^{(n-1)}_j P^{(n-1)} \right)^{-1} \left( \hat{x}'^{(n)}_j(k) \hat{x}'^{(n)}_j(k)^H + \sum\nolimits^{'(n)}(k) \right) \right] \tag{132}$$

$$= \begin{cases} \frac{1}{I} tr \left[ (\Lambda^{(n-1)})^{-1} \left( \hat{x}'^{(n)}_1(k) \hat{x}'^{(n)}_1(k)^H + \sum\nolimits^{'(n)}(k) \right) \right], & j = 1 \\ \frac{1}{I} tr \left( \hat{x}'^{(n)}_2(k) \hat{x}'^{(n)}_2(k)^H + \sum\nolimits^{'(n)}(k) \right), & j = 2 \end{cases} \tag{133}$$

$$= \begin{cases} \frac{1}{I} \sum_{i=1}^{I} \frac{\left| [\hat{x}'^{(n)}_1(k)]_i \right|^2 + \left[ \sum\nolimits^{'(n)}(k) \right]_{ii}}{[\Lambda^{(n-1)}]_{ii}}, & j = 1 \\ \frac{1}{I} \sum_{i=1}^{I} \left( \left| [\hat{x}'^{(n)}_2(k)]_i \right|^2 + \left[ \sum\nolimits^{'(n)}(k) \right]_{ii} \right), & j = 2 \end{cases} \tag{134}$$

Similarly, by substituting expression (127) and expression (128) for expression (110) to be rewritten into a form that can be calculated by using $\hat{x}'^{(n)}_j(k)$ and $\Sigma'^{(n)}(k)$, the following expression (135) and expression (136) are obtained.

$$\hat{R}^{(n)}_j = \frac{1}{K} \sum_{k=1}^{K} \frac{1}{\hat{v}^{(n)}_j(k)} \left( (P^{(n-1)H})^{-1} \hat{x}'^{(n)}_j(k) \hat{x}'^{(n)}_j(k)^H (P^{(n-1)})^{-1} + (P^{(n-1)H})^{-1} \sum\nolimits^{'(n)}(k) (P^{(n-1)})^{-1} \right) \tag{135}$$

$$= (P^{(n-1)H})^{-1} \left[ \frac{1}{K} \sum_{k=1}^{K} \frac{1}{\hat{v}^{(n)}_j(k)} \left( \hat{x}'^{(n)}_j(k) \hat{x}'^{(n)}_j(k)^H + \sum\nolimits^{'(n)}(k) \right) \right] (P^{(n-1)})^{-1} \tag{136}$$

Also in this case, $\hat{R}'_j{}^{(n)}$ defined by expression (137) is updated instead of $\hat{R}_j{}^{(n)}$.

$$\hat{R}'_j{}^{(n)} = P^{(n-1)H} \hat{R}_j{}^{(n)} P^{(n-1)} \tag{137}$$

Due to this, the inverse matrix operation and the matrix multiplication can be reduced in some degree, so that the calculation amount can be reduced. $\hat{R}'_j{}^{(n)}$ can be represented by expression (138) based on expression (136).

$$\hat{R}'_j{}^{(n)} = \frac{1}{K} \sum_{k=1}^{K} \frac{1}{\hat{v}_j^{(n)}(k)} \left( \hat{x}'_j{}^{(n)}(k) \hat{x}'_j{}^{(n)}(k)^H + \sum{}^{\prime(n)}(k) \right) \tag{138}$$

$\hat{R}'_j{}^{(n)}$ can be regarded as a spatial covariance matrix subjected to linear transformation of simultaneous decorrelation, so that $\hat{R}'_j{}^{(n)}$ is referred to as a spatial covariance matrix subjected to simultaneous decorrelation hereinafter.

Lastly, the following describes update of the generalized eigenvalue matrix $\Lambda$ and the generalized eigenvector matrix P. At the first iteration, $\Lambda^{(0)}$ and $P^{(0)}$ may be obtained by solving the generalized eigenvalue problem for the initial estimation values $\hat{R}_1^{(0)}$ and $\hat{R}_2^{(0)}$ of the spatial covariance matrices $R_1$ and $R_2$.

In the second and subsequent iteration, estimation values $\hat{R}'_1{}^{(n)}$ and $\hat{R}'_2{}^{(n)}$ of the spatial covariance matrix subjected to simultaneous decorrelation are obtained. It is possible to apply the generalized eigenvalue problem thereto after returning the estimation values $\hat{R}'_1{}^{(n)}$ and $\hat{R}'_2{}^{(n)}$ to $\hat{R}_1^{(n)}$ and $\hat{R}_2^{(n)}$ by inverse conversion of simultaneous decorrelation, but a slightly waste calculation is generated.

Thus, calculation can be performed more efficiently as described below. First, the generalized eigenvalue problem for $\hat{R}'_1{}^{(n)}$ and $\hat{R}'_2{}^{(n)}$ is solved to obtain a diagonal matrix $\Lambda^{(n)}$ including the generalized eigenvalue as the diagonal component and a matrix $Q^{(n)}$ including the generalized eigenvectors as column vectors. These are assumed to satisfy $(Q^{(n)})^H (\hat{R}'_1{}^{(n)}) Q^{(n)} = \Lambda^{(n)}$ and $(Q^{(n)})^H (\hat{R}'_2{}^{(n)}) Q^{(n)} = I$.

Next, $P^{(n)}$ is updated by expression (139).

$$P^{(n)} = P^{(n-1)} Q^{(n)} \tag{139}$$

In this case, $\Lambda^{(n)}$ and $P^{(n)}$ become the generalized eigenvalue matrix and the generalized eigenvector matrix for $\hat{R}_1^{(n)}$ and $\hat{R}_2^{(n)}$. This fact can be confirmed by the following expression (140) to expression (147).

[Expression 114]

$$\hat{R}_1^{(n)} P^{(n-1)} Q^{(n)} = \left(P^{(n-1)H}\right)^{-1} P^{(n-1)H} \hat{R}_1^{(n)} P^{(n-1)} Q^{(n)} \tag{140}$$

$$= \left(P^{(n-1)H}\right)^{-1} \hat{R}'_1{}^{(n)} Q^{(n)} \tag{141}$$

$$= \left(P^{(n-1)H}\right)^{-1} \hat{R}'_2{}^{(n)} Q^{(n)} \Lambda^{(n)} \tag{142}$$

$$= \left(P^{(n-1)H}\right)^{-1} P^{(n-1)H} \hat{R}_2^{(n)} P^{(n-1)} Q^{(n)} \Lambda^{(n)} \tag{143}$$

$$= \hat{R}_2^{(n)} P^{(n-1)} Q^{(n)} \Lambda^{(n)} \tag{144}$$

$$\left(P^{(n-1)} Q^{(n)}\right)^H \hat{R}_2^{(n)} \left(P^{(n-1)} Q^{(n)}\right) = Q^{(n)H} P^{(n-1)H} \hat{R}_2^{(n)} P^{(n-1)} Q^{(n)} \tag{145}$$

$$= Q^{(n)H} \hat{R}'_2{}^{(n)} Q^{(n)} \tag{146}$$

$$= I \tag{147}$$

Effect of Second Embodiment

In this way, according to the second embodiment, the estimation value of the source signal component (subjected to simultaneous decorrelation) and the posterior covariance matrix (subjected to simultaneous decorrelation), and the spatial covariance matrix and the variance parameter can be calculated with a smaller calculation amount as compared with the related art, so that signal separation can be implemented with a smaller calculation amount as compared with the related art.

The reason for that is as follows. First, similarly to the first embodiment, the inverse matrix operation for each sample point is not requested based on simultaneous decorrelation. Second, by updating the posterior covariance matrix $\Sigma'^{(n)}(k)$ subjected to simultaneous decorrelation instead of the posterior covariance matrix $\Sigma^{(n)}(k)$ itself, matrix multiplication for each sample point is not requested.

As described above, the processing of the conventional signal analysis method is equivalent to the processing in the second embodiment in theory, so that signal analysis results of the conventional signal analysis method and the second embodiment are identical to each other in theory (however, as a matter of course, a calculation error may be caused by a computer in some cases). Thus, according to the second embodiment, signal analysis can be implemented with a smaller calculation amount as compared with the conventional signal analysis method without deteriorating the signal analysis performance.

Unlike the first embodiment, according to the second embodiment, the variance parameter $v_j(k)$ and the spatial covariance matrix $R_j$, and the source signal component $x_j(k)$ can be estimated at the same time even in a case in which the variance parameter $v_j(k)$ and the spatial covariance matrix $R_j$ are unknown.

Third Embodiment

Next, the following describes a configuration, a processing procedure, and an effect of the signal analysis device according to a third embodiment.

In the third embodiment, I (I is an integral number equal to or larger than 2) observation signals $y_i(t)$ acquired by a microphone at different positions are assumed to be input to the signal analysis device in a situation in which two sound source signals are present in a mixed manner. The observation signal $y_i(t)$ is subjected to frequency resolution, subjected to signal separation using the method described in the second embodiment for each frequency, and converted into a time domain at last.

[Configuration and Processing of Signal Analysis Device]

Figure 5:
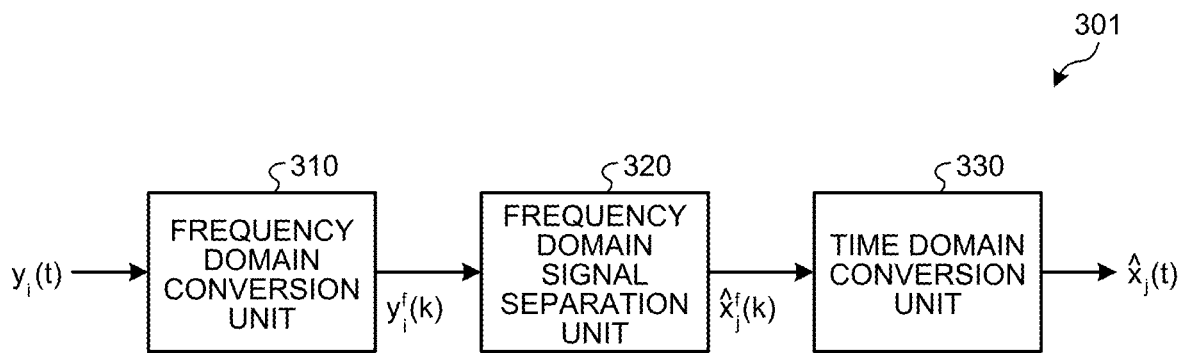
FIG. 5 is a diagram illustrating an example of a configuration of a signal analysis device according to a third embodiment and a seventh embodiment.
Figure 6:
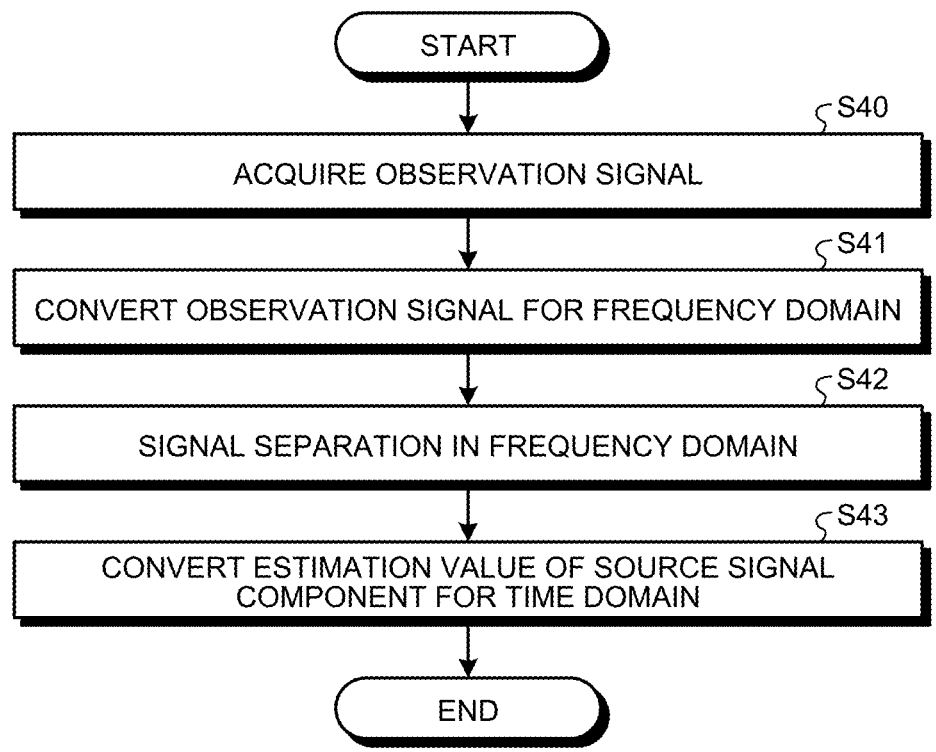
FIG. 6 is a flowchart illustrating an example of a processing procedure of signal analysis processing according to the third embodiment and the seventh embodiment.

With reference to FIG. 5 and FIG. 6, the following describes a configuration of the signal analysis device according to the third embodiment and a processing procedure of signal analysis processing. FIG. 5 is a diagram illustrating an example of the configuration of the signal analysis device according to the third embodiment. FIG. 6 is a flowchart illustrating an example of the processing procedure of the signal analysis processing according to the third embodiment.

As illustrated in FIG. 5, a signal analysis device 301 includes a frequency domain conversion unit 310, a frequency domain signal separation unit 320, and a time domain conversion unit 330.

First, the following describes an outline of each unit of the signal analysis device 301. The frequency domain conversion unit 310 receives the input observation signal $y_i(t)$ (Step S40), and calculates an observation signal $y_i(k, f)$ of a time-frequency domain by short-time Fourier transformation and the like (Step S41). In this case, k represents an index of a time frame, and f represents an index of a frequency bin. Hereinafter, $y_i(k, f)$ is represented as $y_i^f(k)$.

The frequency domain signal separation unit 320 performs signal separation in a frequency domain by applying the method of the second embodiment to each f (Step S42). That is, by using $y_i^1(k)$ as an input for f=1, estimation values $\hat{x}_1^1(k)$ and $\hat{x}_2^1(k)$ of the source signal components are obtained by using the method in the second embodiment.

By using $y_i^2(k)$ as an input for f=2, estimation values $\hat{x}_1^2(k)$ and $\hat{x}_2^2(k)$ of the source signal components are obtained by using the method in the second embodiment. This processing is repeated for each f.

By using $y_i^F(k)$ as an input for f=F, estimation values $\hat{x}_1^F(k)$ and $\hat{x}_2^F(k)$ of the source signal components are obtained by using the method in the second embodiment. Hereinafter, $\hat{x}_j^f(k)$ is represented as $\hat{x}_j(k, f)$.

The time domain conversion unit 330 calculates and outputs an estimation value $\hat{x}_j(t)$ of the source signal component of the time domain by inverse short-time Fourier transformation and the like based on the estimation value $\hat{x}_j(k, f)$ of the source signal component of the time-frequency domain (Step S43).

In this way, in the third embodiment, the method according to the second embodiment is applied to each frequency bin f in the time-frequency domain. On the other hand, Non Patent Document 1 discloses a method of applying the related art described in the second embodiment to each frequency bin f in the time-frequency domain.

There has been the problem that this related art is difficult to be applied to processing of a large-scale data set, real-time processing (short-time processing is requested), an appliance having a low calculation capacity, and the like because a huge amount of calculation is requested. Actually, in the related art, inverse matrix calculation and matrix multiplication are requested to be performed for each frequency bin, for each frame, and for each iteration (that is, multiple times). Due to this, in the conventional signal analysis method, a huge amount of calculation is requested.

For example, in an experiment described later, the number of frequency bins was 256, the number of frames was 249, the number of iterations was 10, and it took 750 seconds for the processing, for the observation signal of 8 seconds. Assuming a data set of 80000 seconds (about 22 hours), it will take 7500000 seconds (about 87 days) for the processing according to calculations.

Effect of Third Embodiment

To confirm the effect of the present invention, the following describes a sound source separation experiment using the conventional method and the third embodiment.

Figure 7:
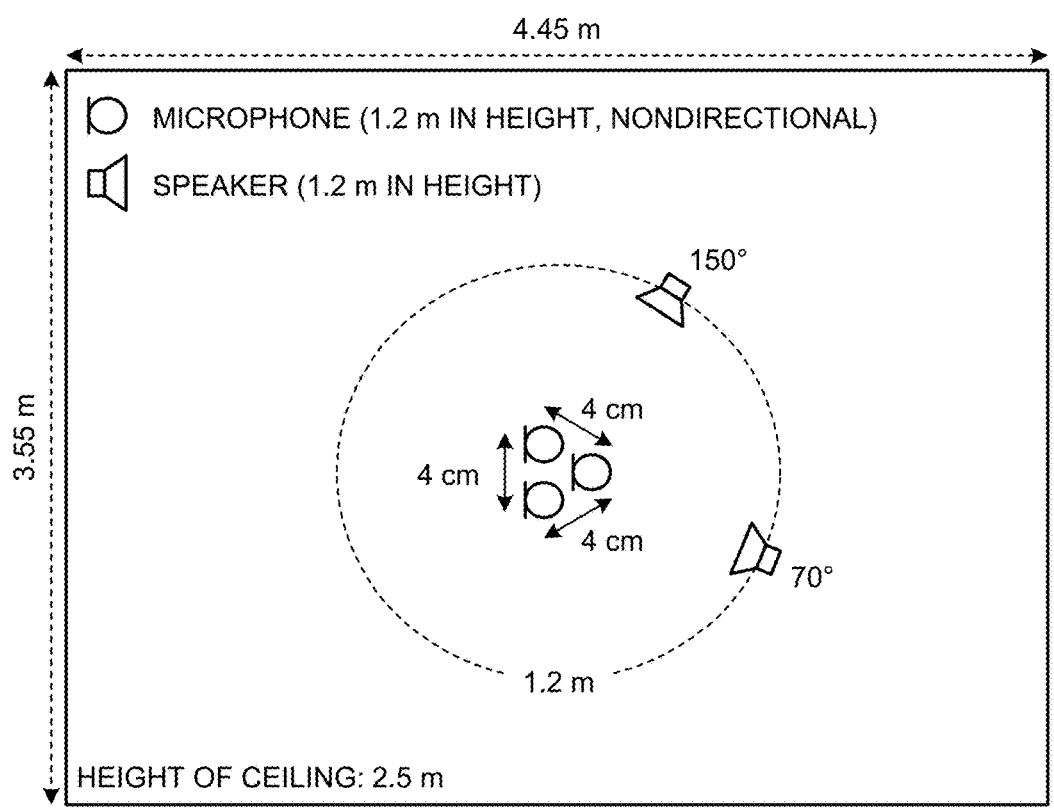
FIG. 7 is a diagram illustrating an experiment condition for a sound source separation experiment using a conventional method and a method according to the third embodiment.
Figure 8:
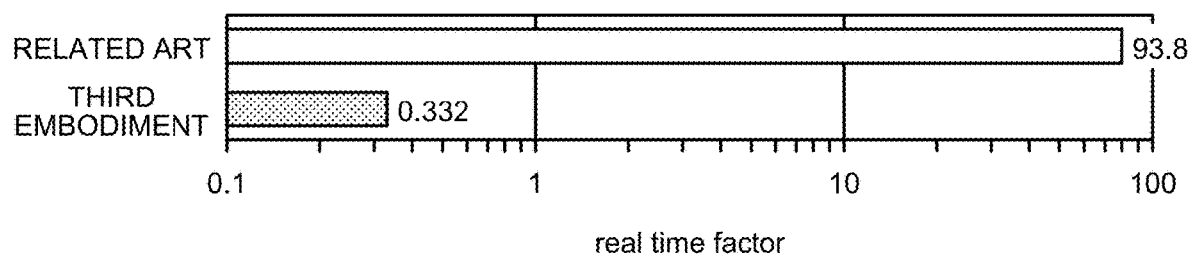
FIG. 8 is a diagram illustrating a result of the sound source separation experiment (real time factor) using the conventional method and the method according to the third embodiment.
Figure 9:
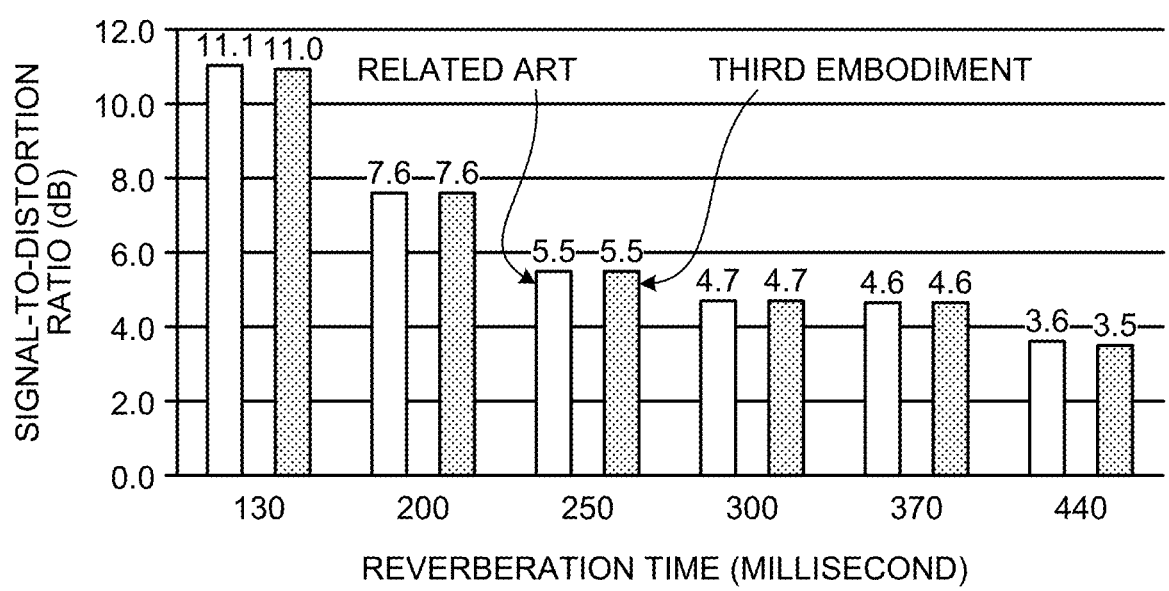
FIG. 9 is a diagram illustrating a result of the sound source separation experiment (sound source separation performance) using the conventional method and the method according to the third embodiment.

FIG. 7 is a diagram illustrating an experiment condition for the sound source separation experiment using the conventional method and the method according to the third embodiment. FIG. 8 is a diagram illustrating a result of the sound source separation experiment (real time factor) using the conventional method and the third embodiment. FIG. 9 is a diagram illustrating a result of the sound source separation experiment (sound source separation performance) using the conventional method and the third embodiment.

A reverberation voice was generated by convoluting a reverberation impulse response that was measured in a laboratory illustrated in FIG. 7 into an English voice of 8 seconds, and reverberation voices of a plurality of persons were added to generate the observation signal. FIG. 8 and FIG. 9 illustrate performances in a case of performing sound source separation on the observation signal using the respective methods. FIG. 8 illustrates the real time factor (time requested for processing when an observation signal length is 1). FIG. 9 illustrates a signal-to-distortion ratio as sound source separation performance (as a value becomes larger, the sound source separation performance is higher).

As illustrated in FIG. 8 and FIG. 9, with the method according to the third embodiment, it is found that calculation time can be reduced by 250 times or more as compared with the conventional method without deteriorating the sound source separation performance. In a case in which a reverberation time is 130 milliseconds and 440 milliseconds, the signal-to-distortion ratio obtained by the method according to the third embodiment is slightly reduced as compared with the conventional method, but this is due to a calculation error caused by a computer. In this way, the method according to the third embodiment is equivalent to the conventional method in theory, but a difference in performance may be actually caused due to a calculation error. However, the difference is very small as illustrated in FIG. 8.

In this way, according to the third embodiment, the calculation time can be greatly reduced as compared with the conventional method without deteriorating the sound source separation performance.

Fourth Embodiment

Next, the following describes a configuration, a processing procedure, and an effect of the signal analysis device according to a fourth embodiment.

The fourth embodiment is obtained by changing the second embodiment to have a configuration of estimating the variance parameter $v_j(k)$ and the spatial covariance matrix $R_j$ using an auxiliary function method.

[Configuration and Processing of Signal Analysis Device]

Figure 10:
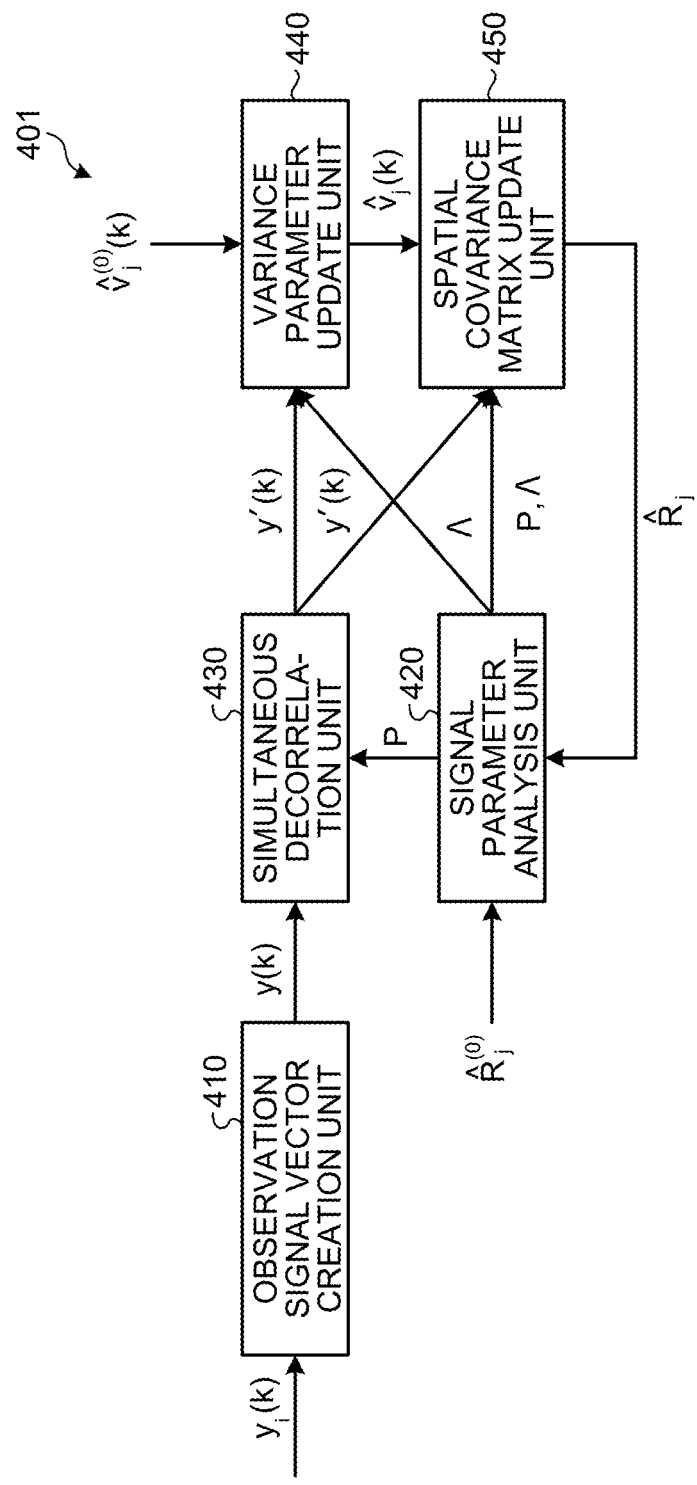
FIG. 10 is a diagram illustrating an example of a configuration of a signal analysis device according to a fourth embodiment.
Figure 11:
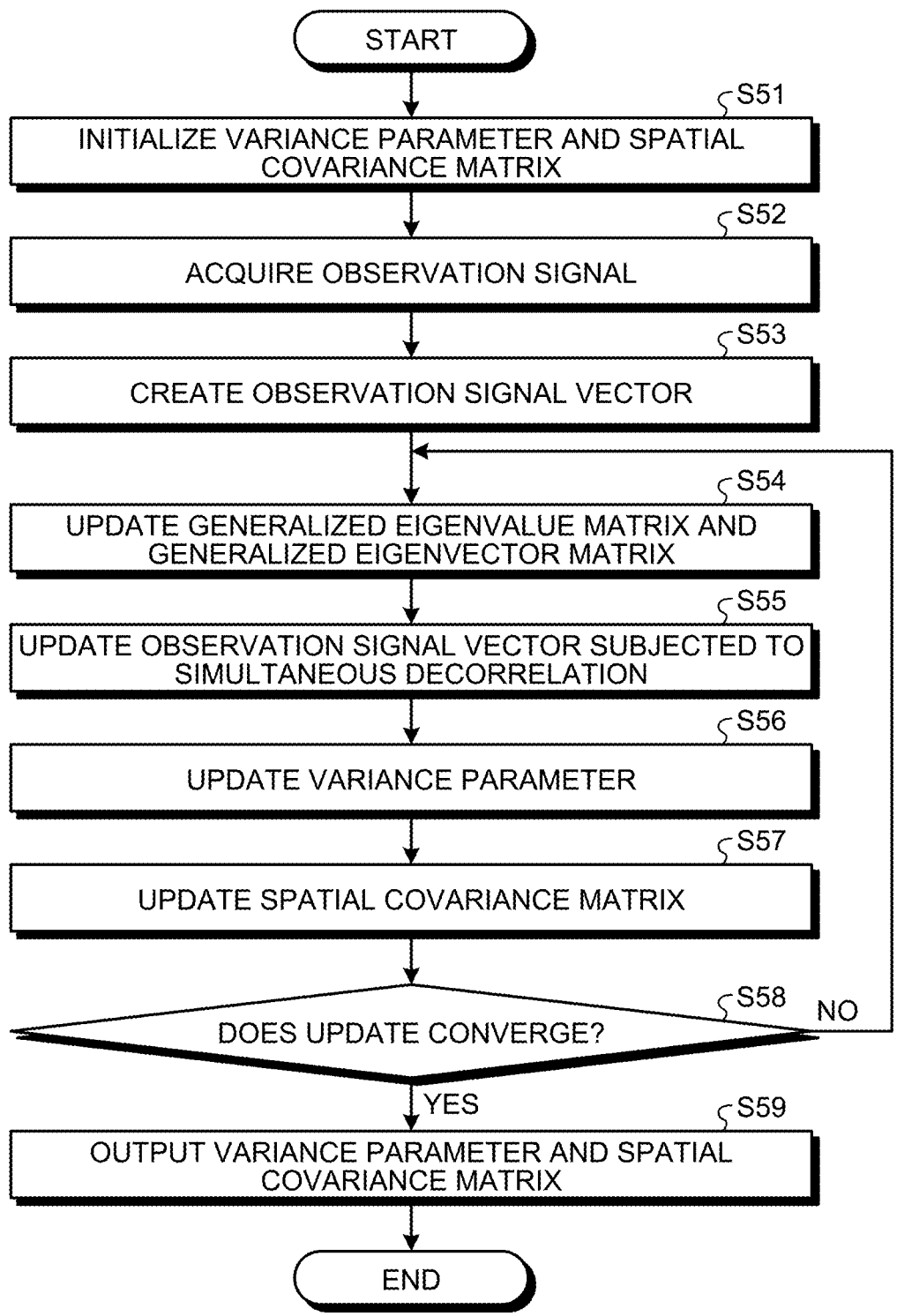
FIG. 11 is a flowchart illustrating an example of a processing procedure of signal analysis processing according to the fourth embodiment.

With reference to FIG. 10 and FIG. 11, the following describes a configuration of the signal analysis device according to the fourth embodiment and a processing procedure of the signal analysis processing. FIG. 10 is a diagram illustrating an example of the configuration of the signal analysis device according to the fourth embodiment. FIG. 11 is a flowchart illustrating an example of the processing procedure of the signal analysis processing according to the fourth embodiment.

As illustrated in FIG. 10, a signal analysis device 401 includes an initialization unit (not illustrated), an observation signal vector creation unit 410, a signal parameter analysis unit 420, a simultaneous decorrelation unit 430, a variance parameter update unit 440, a spatial covariance matrix update unit 450, and a convergence determination unit (not illustrated).

First, the following describes an outline of each unit of the signal analysis device 401. The initialization unit (not illustrated) sets the initial estimation value $\hat{v}_j^{(0)}(k)$ of the variance parameter $v_j(k)$ and the initial estimation value $\hat{R}_j^{(0)}$ of the spatial covariance matrix $R_j$ (Step S51). These values may be set based on a random number, for example.

The observation signal vector creation unit 410 acquires the input observation signal $y_i(k)$ (Step S52), and creates the observation signal vector $y(k)$ as an I-dimensional column vector constituted of all the observation signals for each sample point (Step S53).

The signal parameter analysis unit 420 updates the generalized eigenvalue matrix $\Lambda$ and the generalized eigenvector matrix P by solving the generalized eigenvalue problem based on the estimation value $\hat{R}_j$ of the spatial covariance matrix $R_j$ from the spatial covariance matrix update unit 450 (Step S54). Specifically, the signal parameter analysis unit 420 obtains the generalized eigenvalue matrix $\Lambda$ and the generalized eigenvector matrix P that are defined similarly to the first embodiment for the generalized eigenvalue problem of the estimation values $\hat{R}_1$ and $\hat{R}_2$ of the spatial covariance matrices $R_1$ and $R_2$. These are assumed to satisfy expression (148) and expression (149).

$$P^H \hat{R}_1 P = \Lambda \quad (148)$$

$$P^H \hat{R}_2 P = I \quad (149)$$

As an exception, at the time of the first processing performed by the signal parameter analysis unit 420, the initial estimation value $\hat{R}_j^{(0)}$ of the input spatial covariance matrix $R_j$ is used instead of the estimation value $\hat{R}_j$ of the spatial covariance matrix $R_j$ from the spatial covariance matrix update unit 450 in the processing described above performed by the signal parameter analysis unit 420.

The simultaneous decorrelation unit 430 updates the observation signal vector y'(k) subjected to simultaneous decorrelation by expression (90) based on the observation signal vector y(k) from the observation signal vector creation unit 410 and the generalized eigenvector matrix P from the signal parameter analysis unit 420 (Step S55).

The variance parameter update unit 440 updates the estimation value $\hat{v}_j(k)$ of the variance parameter $v_j(k)$ by the following expression (150) and expression (151) based on the observation signal vector y'(k) subjected to simultaneous decorrelation from the simultaneous decorrelation unit 430 and the generalized eigenvalue matrix $\Lambda$ from the signal parameter analysis unit 420 (Step S56).

$$\hat{v}_1(k) \leftarrow \hat{v}_1(k) \sqrt{\frac{\sum_{i=1}^{I} \frac{[\Lambda]_{ii}}{(\hat{v}_1(k)[\Lambda]_{ii} + \hat{v}_2(k))^2} |[y'(k)]_i|^2}{\sum_{i=1}^{I} \frac{[\Lambda]_{ii}}{\hat{v}_1(k)[\Lambda]_{ii} + \hat{v}_2(k)}}} \quad (150)$$

$$\hat{v}_2(k) \leftarrow \hat{v}_2(k) \sqrt{\frac{\sum_{i=1}^{I} \frac{1}{(\hat{v}_2(k)[\Lambda]_{ii} + \hat{v}_2(k))^2} |[y'(k)]_i|^2}{\sum_{i=1}^{I} \frac{1}{\hat{v}_1(k)[\Lambda]_{ii} + \hat{v}_2(k)}}} \quad (151)$$

In this case, $\hat{v}_1(k)$ and $\hat{v}_2(k)$ on the right side represent estimation values of the variance parameter obtained in the previous processing performed by the variance parameter update unit 440 (as an exception, the initial estimation value of the variance parameter from the initialization unit at the time of the first processing performed by the variance parameter update unit 440).

The spatial covariance matrix update unit 450 updates the estimation value $\hat{R}_j$ of the spatial covariance matrix $R_j$ based on the observation signal vector y'(k) subjected to simultaneous decorrelation from the simultaneous decorrelation unit 430, the generalized eigenvector matrix P and the generalized eigenvalue matrix $\Lambda$ from the signal parameter analysis unit 420, and the estimation value $\hat{v}_j(k)$ of the variance parameter $v_j(k)$ from the variance parameter update unit 440 (Step S57). Specifically, the spatial covariance matrix update unit 450 firstly updates a matrix $C_j$ by the following expression (152).

$$C_j \leftarrow P \begin{pmatrix} \sum_{k=1}^{K} \frac{\hat{v}_j(k)}{\hat{v}_1(k)[\Lambda]_{11} + \hat{v}_2(k)} & 0 & \cdots & 0 \\ 0 & \sum_{k=1}^{K} \frac{\hat{v}_j(k)}{\hat{v}_1(k)[\Lambda]_{22} + \hat{v}_2(k)} & \cdots & 0 \\ \vdots & \vdots & \ddots & \vdots \\ 0 & 0 & \cdots & \sum_{k=1}^{K} \frac{\hat{v}_j(k)}{\hat{v}_1(k)[\Lambda]_{II} + \hat{v}_2(k)} \end{pmatrix} P^H \quad (152)$$

Next, the spatial covariance matrix update unit 450 updates a vector z(k) by the following expression (153).

$$z(k) \leftarrow \left( \frac{1}{\hat{v}_1(k)[\Lambda]_{11} + \hat{v}_2(k)} [y'(k)]^1 \; \cdots \; \frac{1}{\hat{v}_1(k)[\Lambda]_{II} + \hat{v}_2(k)} [y'(k)]^I \right)^T \quad (153)$$

Next, the spatial covariance matrix update unit 450 updates a matrix $D_j$ by the following expression (154).

$$D_j \leftarrow (P^{-1})^H \Lambda_j \left[ \sum_{k=1}^{K} \hat{v}_j(k) z(k) z(k)^H \right] \Lambda_j P^{-1} \quad (154)$$

Next, the spatial covariance matrix update unit 450 updates the estimation value $\hat{R}_j$ of the spatial covariance matrix $R_j$ by the following expression (155).

$$\hat{R}_j \leftarrow D_j^{\frac{1}{2}} \left( \left( D_j^{\frac{1}{2}} C_j D_j^{\frac{1}{2}} \right)^{\frac{1}{2}} \right)^{-1} D_j^{\frac{1}{2}} \quad (155)$$

The convergence determination unit (not illustrated) determines whether the update converges (Step S58). If the convergence determination unit determines that the update does not converge (No at Step S58), the process returns to the processing performed by the signal parameter analysis unit 420 (Step S54), and the processing is continued.

On the other hand, if the convergence determination unit determines that the update converges (Yes at Step S58), the variance parameter update unit 440 outputs the estimation value $\hat{v}_j(k)$ of the variance parameter $v_j(k)$, and the spatial covariance matrix update unit 450 outputs the estimation value $\hat{R}_j$ of the spatial covariance matrix $R_j$ (Step S59).

Background of Fourth Embodiment

The following describes a background of the fourth embodiment. On the basis of the auxiliary function method, the variance parameter $v_j(k)$ and the spatial covariance matrix $R_j$ can be estimated as follows. The estimation values of the variance parameter $v_j(k)$ and the spatial covariance matrix $R_j$ are initialized in advance, and updated by the iteration processing described below. The estimation value $\hat{v}_j(k)$ of the variance parameter $v_j(k)$ is updated by the following expression (156).

$$\hat{v}_j(k) \leftarrow \hat{v}_j(k) \sqrt{\frac{y(k)^H\left(\sum_{l=1}^{2}\hat{v}_l(k)\hat{R}_l\right)^{-1}\hat{R}_j\left(\sum_{l=1}^{2}\hat{v}_l(k)\hat{R}_l\right)^{-1}y(k)}{tr\left[\left(\sum_{l=1}^{2}\hat{v}_l(k)\hat{R}_l\right)^{-1}\hat{R}_j\right]}} \quad (156)$$

In update of the spatial covariance matrix $R_j$, the matrix $C_j$ and the matrix $D_j$ are firstly updated by expression (157) and expression (158), and the estimation value $\hat{R}_j$ of the spatial covariance matrix $R_j$ is secondly updated by expression (159).

$$C_j \leftarrow \sum_{k=1}^{K}\hat{v}_j(k)\left(\sum_{l=1}^{2}\hat{v}_l(k)\hat{R}_l\right)^{-1} \quad (157)$$

$$D_j \leftarrow \hat{R}_j\left[\sum_{k=1}^{K}\hat{v}_j(k)\left(\sum_{l=1}^{2}\hat{v}_l(k)\hat{R}_l\right)^{-1}y(k)y(k)^H\left(\sum_{l=1}^{2}\hat{v}_l(k)\hat{R}_l\right)^{-1}\right]\hat{R}_j \quad (158)$$

$$\hat{R}_j \leftarrow D_j^{\frac{1}{2}}\left(\left(D_j^{\frac{1}{2}}C_j D_j^{\frac{1}{2}}\right)^{\frac{1}{2}}\right)^{-1}D_j^{\frac{1}{2}} \quad (159)$$

In this case, a square root $A^{1/2}$ of a positive semidefinite Hermitian matrix A is defined by expression (161) assuming that expression (160) is eigenvalue decomposition of A. In this case, U represents a unitary matrix constituted of eigenvectors of A, $\Lambda$ represents a diagonal matrix constituted of eigenvalues of A, and $\Sigma^{1/2}$ represents a diagonal matrix obtained by replacing each diagonal element $[\Sigma]_{ii}$ of $\Sigma$ with a square root $([\Sigma]_{ii})^{1/2}$ thereof.

$$A = U\Sigma U^H \quad (160)$$

$$A^{\frac{1}{2}} = U\Sigma^{\frac{1}{2}}U^H \quad (161)$$

The update of the estimation value $\hat{v}_j(k)$ of the variance parameter $v_j(k)$ and the estimation value $\hat{R}_j$ of the spatial covariance matrix $R_j$ described above is iterated until the update converges.

Update rules for the estimation value $\hat{v}_j(k)$ of the variance parameter $v_j(k)$ and the estimation value $\hat{R}_j$ of the spatial covariance matrix $R_j$ described above are derived by using a method similar to the methods disclosed in reference document 3 "Kazuyoshi Yoshii, Ryota Tomioka, Daichi Mochihashi, and Masataka Goto, "Infinite Positive Semi-definite Tensor Factorization for Source Separation of Mixture Signals", Proceedings of the 30th International Conference on Machine Learning, 2013." and reference document 4 "Hiroshi Sawada, Hirokazu Kameoka, Shoko Araki, and Naonori Ueda, "Multichannel Extensions of Non-Negative Matrix Factorization With Complex-Valued Data", IEEE TRANSACTIONS ON AUDIO, SPEECH, AND LANGUAGE PROCESSING, VOL. 21, No. 5, May 2013.".

There has been such a problem in the methods described above that a huge amount of calculation is requested because an inverse matrix operation is requested to be performed for each sample point in each piece of the processing of expression (156) to expression (158).

On the other hand, in the fourth embodiment, the calculation amount can be reduced by avoiding the inverse matrix operation for each sample point based on simultaneous decorrelation (simultaneous diagonalization). Actually, by substituting expression (148) and expression (149) that are solved for $\hat{R}_1$ and $\hat{R}_2$, for expression (156) to expression (158), the update rules for the estimation values of the variance parameter $v_j(k)$ and the spatial covariance matrix $R_j$ are obtained as follows.

The update rule for the estimation value $\hat{v}_j(k)$ of the variance parameter $v_j(k)$ is represented by the following expression (162) and expression (163).

$$\hat{v}_j(k) \leftarrow \hat{v}_j(k)\sqrt{\frac{y'(k)^H\left(\sum_{l=1}^{2}\hat{v}_l(k)\Lambda_l\right)^{-1}\Lambda_j\left(\sum_{l=1}^{2}\hat{v}_l(k)\Lambda_l\right)^{-1}y'(k)}{tr\left[\left(\sum_{l=1}^{2}\hat{v}_l(k)\Lambda_l\right)^{-1}\Lambda_j\right]}} \quad (162)$$

$$= \hat{v}_j(k)\sqrt{\frac{\sum_{i=1}^{I}\frac{[\Lambda_j]_{ii}}{(\hat{v}_1(k)[\Lambda]_{ii}+\hat{v}_2(k))^2}|[y'(k)]_i|^2}{\sum_{i=1}^{I}\frac{[\Lambda_j]_{ii}}{\hat{v}_1(k)[\Lambda]_{ii}+\hat{v}_2(k)}}} \quad (163)$$

In this case, y'(k) represents a simultaneously decorrelated observation signal vector of expression (164), $\Lambda_1$ represents the generalized eigenvalue matrix $\Lambda$, and $\Lambda_2$ represents a unit matrix I.

$$y'(k) = P^H y(k) \quad (164)$$

The update rule for the estimation value $\hat{R}_j$ of the spatial covariance matrix $R_j$ is represented by the following expression (165) and expression (166). First, the matrix $C_j$ is represented by the following expression.

$$C_j \leftarrow P\left[\sum_{k=1}^{K}\hat{v}_j(k)\left(\sum_{l=1}^{2}\hat{v}_l(k)\Lambda_l\right)^{-1}\right]P^H \quad (165)$$

$$= P \begin{pmatrix} \sum_{k=1}^{K} \frac{\hat{v}_j(k)}{\hat{v}_1(k)[\Lambda]_{11} + \hat{v}_2(k)} & 0 & \cdots & 0 \\ 0 & \sum_{k=1}^{K} \frac{\hat{v}_j(k)}{\hat{v}_1(k)[\Lambda]_{22} + \hat{v}_2(k)} & \cdots & 0 \\ \vdots & \vdots & \ddots & \vdots \\ 0 & 0 & \cdots & \sum_{k=1}^{K} \frac{\hat{v}_j(k)}{\hat{v}_1(k)[\Lambda]_{II} + \hat{v}_2(k)} \end{pmatrix} P^H \quad (166)$$

The matrix $D_j$ is represented by the following expression (167) and expression (168).

$$D_j \leftarrow (P^{-1})^H \Lambda_j \left[ \sum_{k=1}^{K} \hat{v}_j(k) \left( \sum_{l=1}^{2} \hat{v}_l(k) \Lambda_l \right)^{-1} y'(k) \right. \quad (167)$$

$$\left. y'(k)^H \left( \sum_{l=1}^{2} \hat{v}_l(k) \Lambda_l \right)^{-1} \right] \Lambda_j P^{-1}$$

$$= (P^{-1})^H \Lambda_j \left[ \sum_{k=1}^{K} \hat{v}_j(k) z(k) z(k)^H \right] \Lambda_j P^{-1} \quad (168)$$

In this case, vector $z(k)$ is defined by the following expression (169) to expression (171).

$$z(k) = \left( \sum_{l=1}^{2} \hat{v}_l(k) \Lambda_l \right)^{-1} y'(k) \quad (169)$$

$$= \begin{pmatrix} \frac{1}{\hat{v}_1(k)[\Lambda]_{11} + \hat{v}_2(k)} & 0 & \cdots & 0 \\ 0 & \frac{1}{\hat{v}_1(k)[\Lambda]_{22} + \hat{v}_2(k)} & \cdots & 0 \\ \vdots & \vdots & \ddots & \vdots \\ 0 & 0 & \cdots & \frac{1}{\hat{v}_1(k)[\Lambda]_{II} + \hat{v}_2(k)} \end{pmatrix} y'(k) \quad (170)$$

$$= \left( \frac{1}{\hat{v}_1(k)[\Lambda]_{11} + \hat{v}_2(k)} [y'(k)]_1 \cdots \frac{1}{\hat{v}_1(k)[\Lambda]_{II} + \hat{v}_2(k)} [y'(k)]_I \right)^T \quad (171)$$

Effect of Fourth Embodiment

In this way, necessity for the inverse matrix operation for each sample point is removed by simultaneous decorrelation (simultaneous diagonalization), and the calculation amount can be reduced. Specifically, an update expression for the estimation value $\hat{v}_j(k)$ of the variance parameter $v_j(k)$ can be represented by using the diagonal matrix $\Lambda_j = P^H R_j P$ as in expression (162) based on simultaneous decorrelation (simultaneous diagonalization), and as a result, the inverse matrix operation can be made unnecessary as in expression (163). The same applies to the update rule for the estimation value $\hat{R}_j$ of the spatial covariance matrix $R_j$.

Similarly to the processing of expression (159), the inverse matrix operation is requested to be performed in the processing of expression (155), but the inverse matrix operation is not requested to be performed for each sample point but may be performed only once for each iteration, so that the calculation amount thereof is relatively small. Similarly, eigenvalue decomposition is requested to be performed for calculating a square root of the matrix in the processing of expression (155) similarly to the processing of expression (159), but the eigenvalue decomposition is not requested to be performed for each sample point but may be performed only twice for each iteration, so that the calculation amount thereof is relatively small. The processing of expression (166), expression (168), and expression (155) includes matrix multiplication as an arithmetic operation with a large calculation amount similarly to the inverse matrix operation, but the matrix multiplication is also not requested to be performed for each sample point, so that the calculation amount thereof is relatively small.

Modification of Fourth Embodiment

The present embodiment describes the case in which the two source signals are present, but can also be applied to a case in which J source signals are typically present, not limited to the case in which the two source signals are present, based on a concept similar to that of the third modification of the first embodiment.

As described above, in the first to the fourth embodiments, the signal parameter analysis unit obtains the simultaneous decorrelation matrix P as a matrix in which $P^H R_j P$ all becomes the diagonal matrix or/and the Hermitian transposition $P^H$ thereof, for the spatial covariance matrix $R_j$ (j is an integral number equal to or larger than 1 and equal to or smaller than J) for modeling respective spatial characteristics of J (J is an integral number equal to or larger than 2) source signals that are present in a mixed manner, as a parameter for decorrelating components corresponding to the J source signals for observation signal vectors based on the observation signals acquired at I (I is an integral number equal to or larger than 2) positions different from each other. It is sufficient that the signal analysis devices 1, 201, 301, and 401 perform multiplication for each element with a small calculation amount in filtering by performing simultaneous decorrelation using this parameter for performing decorrelation, and the calculation amount for the estimation value of the source signal component can be reduced.

Fifth Embodiment

Next, the following describes a configuration, a processing procedure, and an effect of the signal analysis device according to a fifth embodiment. The fifth embodiment is a variation of the third modification of the first embodiment. The third modification of the first embodiment has the precondition that the variance parameter $v_j(k)$ and the spatial covariance matrix $R_j$ are input to the signal analysis device. On the other hand, in the fifth embodiment, the variance parameter $v_j(k)$ and the spatial covariance matrix $R_j$ are not requested to be input to the signal analysis device, and the variance parameter $v_j(k)$, the simultaneous decorrelation matrix P and the spatial covariance matrix $\Lambda_j$ subjected to simultaneous decorrelation as parameters for modeling the spatial covariance matrix $R_j$, and the source signal component $x_j(k)$ are estimated at the same time.

The fifth embodiment describes a method of implementing signal separation by estimating the variance parameter $v_j(k)$, the simultaneous decorrelation matrix P and the spatial covariance matrix $\Lambda_j$ subjected to simultaneous decorrelation as parameters for modeling the spatial covariance matrix $R_j$, and the source signal component $x_j(k)$ at the same time in a situation in which J source signals are typically present in a mixed manner and the variance parameter $v_j(k)$ and the spatial covariance matrix $R_j$ are unknown. In the fifth embodiment, I observation signals $y_i(k)$ acquired at different positions are assumed to be input to the signal analysis device.

[Configuration and Processing of Signal Analysis Device]

Figure 12:
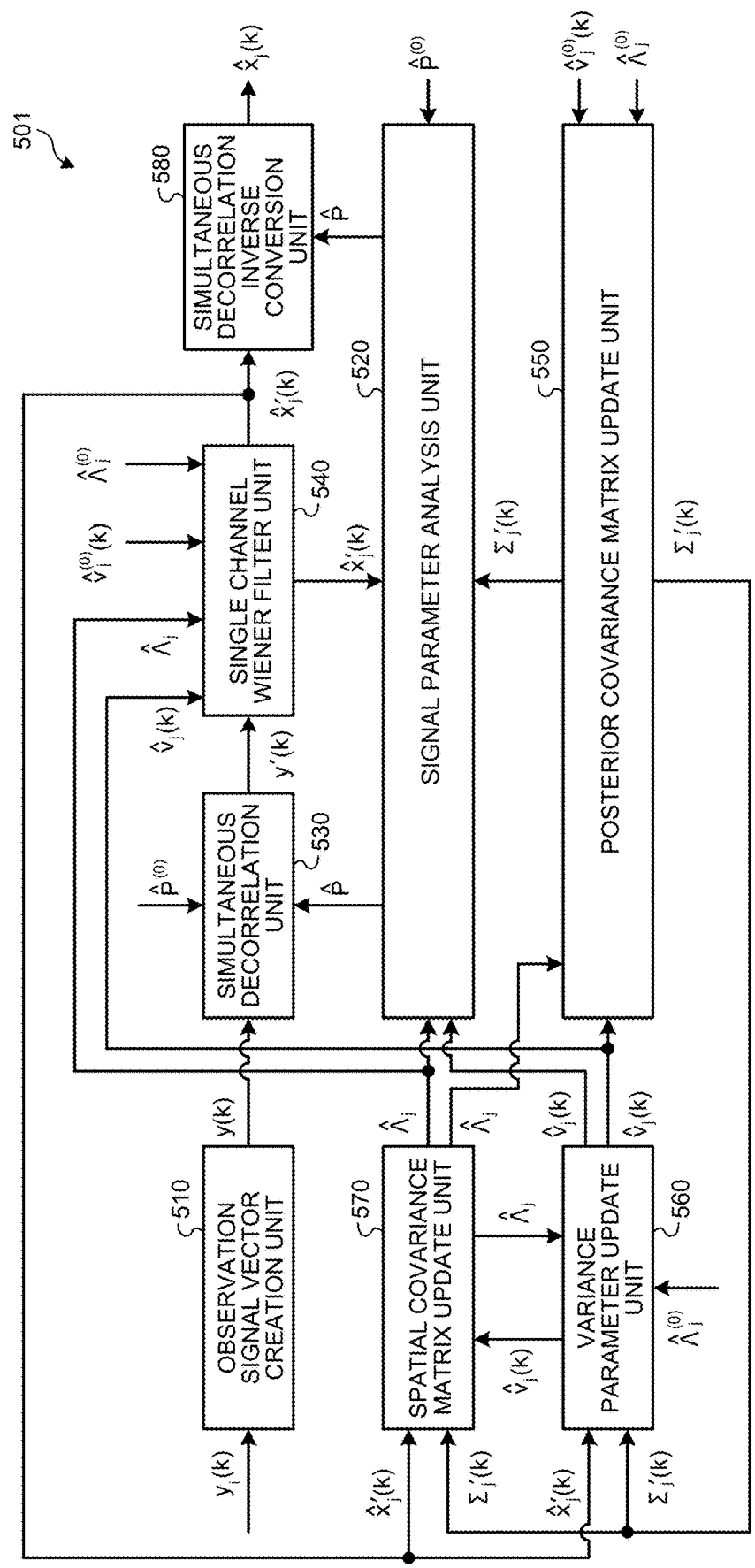
FIG. 12 is a diagram illustrating an example of a configuration of a signal analysis device according to a fifth embodiment.
Figure 13:
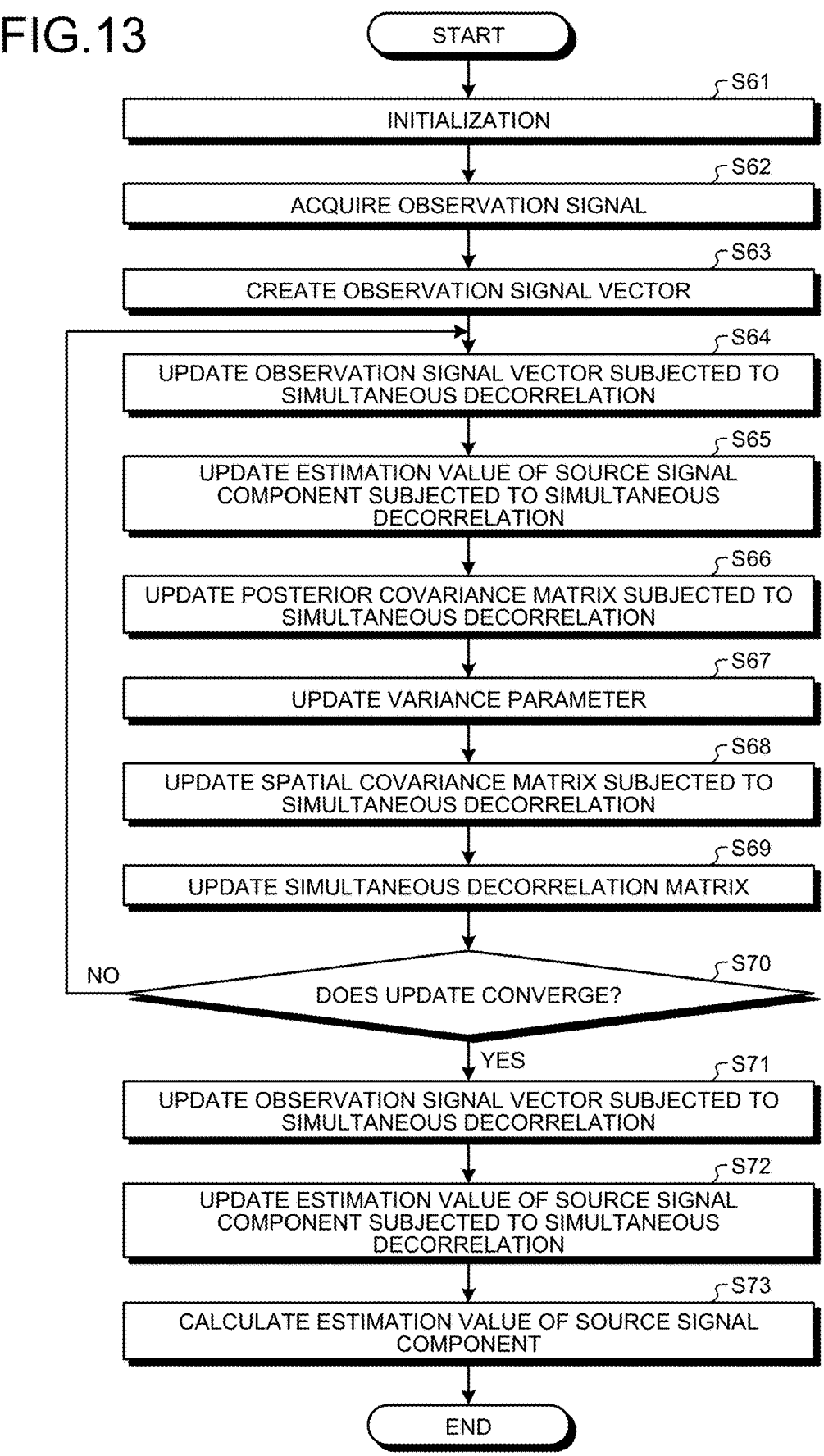
FIG. 13 is a flowchart illustrating an example of a processing procedure of signal analysis processing according to the fifth embodiment.

With reference to FIG. 12 and FIG. 13, the following describes a configuration of the signal analysis device and a processing procedure of the signal analysis processing according to the fifth embodiment. FIG. 12 is a diagram illustrating an example of the configuration of the signal analysis device according to the fifth embodiment. FIG. 13 is a flowchart illustrating an example of the processing procedure of the signal analysis processing according to the fifth embodiment.

As illustrated in FIG. 12, a signal analysis device 501 includes an initialization unit (not illustrated), an observation signal vector creation unit 510, a simultaneous decorrelation unit 530, a single channel Wiener filter unit 540, a posterior covariance matrix update unit 550, a variance parameter update unit 560, a spatial covariance matrix update unit 570, a signal parameter analysis unit 520, a convergence determination unit (not illustrated), and a simultaneous decorrelation inverse conversion unit 580.

First, the following describes an outline of each unit of the signal analysis device 501. The initialization unit (not illustrated) sets the initial estimation value $\hat{v}_j^{(0)}(k)$ of the variance parameter $v_j(k)$, the initial estimation value $\hat{P}^{(0)}$ of the simultaneous decorrelation matrix P, and the initial estimation value $\hat{\Lambda}_j^{(0)}$ of the spatial covariance matrix $\Lambda_j$ subjected to simultaneous decorrelation (Step S61). These values may be set based on a random number, for example.

The observation signal vector creation unit 510 acquires I observation signals $y_i(k)$ input and acquired at different positions (Step S62), and creates the observation signal vector y(k) as an I-dimensional column vector for each sample point by expression (82) (Step S63).

The simultaneous decorrelation unit 530 updates the observation signal vector y'(k) subjected to simultaneous decorrelation by the following expression (172) based on the observation signal vector y(k) from the observation signal vector creation unit 510 and the estimation value $\hat{P}$ of the simultaneous decorrelation matrix P from the signal parameter analysis unit 520 (as an exception, the initial estimation value $\hat{P}^{(0)}$ of the simultaneous decorrelation matrix P from the initialization unit is used at the time of the first processing performed by the simultaneous decorrelation unit 530) (Step S64).

$$y'(k) \leftarrow \hat{P}^H y(k) \qquad (172)$$

However, at the time of the first processing performed by the simultaneous decorrelation unit 530, $\hat{P}$ is replaced with $\hat{P}^{(0)}$ on the right side of expression (172).

The single channel Wiener filter unit 540 updates an estimation value $\hat{x}_j'(k)$ of a source signal component $x_j'(k)$ subjected to simultaneous decorrelation by the following expression (173) based on the observation signal vector y'(k) subjected to simultaneous decorrelation from the simultaneous decorrelation unit 530, the estimation value $\hat{v}_j(k)$ of the variance parameter $v_j(k)$ from the variance parameter update unit 560 (as an exception, the initial estimation value $\hat{v}_j^{(0)}(k)$ of the variance parameter $v_j(k)$ from the initialization unit is used at the time of the first processing performed by the single channel Wiener filter unit 540), and the estimation value $\hat{\Lambda}_j$ of the spatial covariance matrix $\Lambda_j$ subjected to simultaneous decorrelation from the spatial covariance matrix update unit 570 (as an exception, the initial estimation value $\hat{\Lambda}_j^{(0)}$ of the spatial covariance matrix $\Lambda_j$ subjected to simultaneous decorrelation from the initialization unit is used at the time of the first processing performed by the single channel Wiener filter unit 540) (Step S65).

$$[\hat{x}_j'(k)]_i \leftarrow \frac{\hat{v}_j(k)[\hat{\Lambda}_j]_{ii}}{\sum_{l=1}^{J} \hat{v}_l(k)[\hat{\Lambda}_l]_{ii}} [y'(k)]_i \qquad (173)$$

However, at the time of the first processing performed by the single channel Wiener filter unit 540, $\hat{\Lambda}_j$ (j=1, ..., J) is replaced with $\hat{\Lambda}_j^{(0)}$ (j=1, ..., J), and $\hat{v}_j(k)$ (j=1, ..., J; k=1, ..., K) is replaced with $\hat{v}_j^{(0)}(k)$ (j=1, ..., J; k=1, ..., K) on the right side of expression (173).

The posterior covariance matrix update unit 550 updates a posterior covariance matrix $\Sigma_j'(k)$ subjected to simultaneous decorrelation by the following expression (174) based on the estimation value $\hat{v}_j(k)$ of the variance parameter $v_j(k)$ from the variance parameter update unit 560 (as an exception, the initial estimation value $\hat{v}_j^{(0)}(k)$ of the variance parameter $v_j(k)$ from the initialization unit is used at the time of the first processing performed by the posterior covariance matrix update unit 550), and the estimation value $\hat{\Lambda}_j$ of the spatial covariance matrix $\Lambda_j$ subjected to simultaneous decorrelation from the spatial covariance matrix update unit 570 (as an exception, the initial estimation value $\hat{\Lambda}_j^{(0)}$ of the spatial covariance matrix $\Lambda_j$ subjected to simultaneous decorrelation from the initialization unit is used at the time of the first processing performed by the posterior covariance matrix update unit 550) (Step S66).

$$[\Sigma'_j(k)]_{im} = \begin{cases} \hat{v}_j(k)[\hat{\Lambda}_j]_{ii} - \dfrac{\hat{v}_j(k)^2 ([\hat{\Lambda}_j]_{ii})^2}{\sum_{l=1}^{J} \hat{v}_l(k)[\hat{\Lambda}_l]_{ii}}, & i = m \\ 0, & i \neq m \end{cases} \quad (174)$$

However, at the time of the first processing performed by the posterior covariance matrix update unit 550, $\hat{\Lambda}_j$ is replaced with $\hat{\Lambda}_j^{(0)}$, and $\hat{v}_j(k)$ is replaced with $\hat{v}_j^{(0)}(k)$ on the right side of expression (174).

The variance parameter update unit 560 updates the estimation value $\hat{v}_j(k)$ of the variance parameter $v_j(k)$ by the following expression (175) based on the estimation value $\hat{x}_j'(k)$ of the source signal component $x_j'(k)$ subjected to simultaneous decorrelation from the single channel Wiener filter unit 540, the posterior covariance matrix $\Sigma'_j(k)$ subjected to simultaneous decorrelation from the posterior covariance matrix update unit 550, and the estimation value $\hat{\Lambda}_j$ of the spatial covariance matrix $\Lambda_j$ subjected to simultaneous decorrelation from the spatial covariance matrix update unit 570 (as an exception, the initial estimation value $\hat{\Lambda}_j^{(0)}$ of the spatial covariance matrix $\Lambda_j$ subjected to simultaneous decorrelation from the initialization unit is used at the time of the first processing performed by the variance parameter update unit 560) (Step S67).

$$\hat{v}_j(k) \leftarrow \dfrac{1}{I} \sum_{i=1}^{I} \dfrac{|[\hat{x}'_j(k)]_i|^2 + [\Sigma'_j(k)]_{ii}}{[\hat{\Lambda}_j]_{ii}} \quad (175)$$

However, at the time of the first processing performed by the variance parameter update unit 560, $\hat{\Lambda}_j$ is replaced with $\hat{\Lambda}_j^{(0)}$ on the right side of expression (175).

The spatial covariance matrix update unit 570 updates the estimation value $\hat{\Lambda}_j$ of the spatial covariance matrix $\Lambda_j$ subjected to simultaneous decorrelation by the following expression (176) based on the estimation value $\hat{x}_j'(k)$ of the source signal component $x_j'(k)$ subjected to simultaneous decorrelation from the single channel Wiener filter unit 540, the posterior covariance matrix $\Sigma'_j(k)$ subjected to simultaneous decorrelation from the posterior covariance matrix update unit 550, and the estimation value $\hat{v}_j(k)$ of the variance parameter $v_j(k)$ from the variance parameter update unit 560 (Step S68).

$$[\hat{\Lambda}_j]_{im} \leftarrow \begin{cases} \dfrac{1}{K} \sum_{k=1}^{K} \dfrac{|[\hat{x}'_j(k)]_i|^2 + [\Sigma'_j(k)]_{ii}}{\hat{v}_j(k)}, & i = m \\ 0, & i \neq m \end{cases} \quad (176)$$

The signal parameter analysis unit 520 receives the estimation value $\hat{x}_j'(k)$ of the source signal component $x_j'(k)$ subjected to simultaneous decorrelation from the single channel Wiener filter unit 540, the posterior covariance matrix $\Sigma_j'(k)$ subjected to simultaneous decorrelation from the posterior covariance matrix update unit 550, the estimation value $\hat{v}_j(k)$ of the variance parameter $v_j(k)$ from the variance parameter update unit 560, and the estimation value $\hat{\Lambda}_j$ of the spatial covariance matrix $\Lambda_j$ subjected to simultaneous decorrelation from the spatial covariance matrix update unit 570 (and the initial estimation value $\hat{P}^{(0)}$ of the simultaneous decorrelation matrix P from the initialization unit at the time of the first update of the estimation value $\hat{P}$ of the simultaneous decorrelation matrix P performed by the signal parameter analysis unit 520), and updates the estimation value $\hat{P}$ of the simultaneous decorrelation matrix P by the following expression (177) (Step S69). In this case, $e_i$ represents the i-th column of the unit matrix, and $[A]_i$ represents the i-th column of the matrix A.

$$[\hat{P}]_i = \hat{P} \left( \dfrac{1}{JK} \sum_{j=1}^{J} \dfrac{1}{[\hat{\Lambda}_j]_{ii}} \sum_{k=1}^{K} \dfrac{1}{\hat{v}_j(k)} \left( \hat{x}'_j(k)\hat{x}'_j(k)^H + \Sigma'_j(k) \right) \right)^{-1} e_i \quad (177)$$

However, at the time of the first update of the estimation value $\hat{P}$ of the simultaneous decorrelation matrix P performed by the signal parameter analysis unit 520, $\hat{P}$ is replaced with $\hat{P}^{(0)}$ on the right side of expression (177). Alternatively, the signal parameter analysis unit 520 may update the estimation value $\hat{P}$ of the simultaneous decorrelation matrix P by successively applying expression (177) multiple times.

The convergence determination unit (not illustrated) determines whether the update converges (Step S70). If the convergence determination unit determines that the update does not converge (No at Step S70), the process returns to the processing at Step S64 performed by the simultaneous decorrelation unit 530, and the processing is continued.

On the other hand, if the convergence determination unit determines that the update converges (Yes at Step S70), processing by the simultaneous decorrelation unit 530 (Step S71), processing by the single channel Wiener filter unit 540 (Step S72), and processing by the simultaneous decorrelation inverse conversion unit 580 (Step S73) are performed. The processing performed by the simultaneous decorrelation unit 530 and the single channel Wiener filter unit 540 is described above, so that the following describes the processing performed by the simultaneous decorrelation inverse conversion unit 580. The simultaneous decorrelation inverse conversion unit 580 calculates and outputs the estimation value $\hat{x}_j(k)$ of the source signal component $x_j(k)$ by the following expression (178) based on the estimation value $\hat{P}$ of the simultaneous decorrelation matrix P from the signal parameter analysis unit 520, and the estimation value $\hat{x}_j'(k)$ of the source signal component $x_j'(k)$ subjected to simultaneous decorrelation from the single channel Wiener filter unit 540 (Step S73).

$$\hat{x}_j(k) \leftarrow (\hat{P}^H)^{-1} \hat{x}'_j(k) \quad (178)$$

[Background of Processing Performed by Signal Analysis Device]

Next, the following describes a background of the processing performed by the signal analysis device 501 according to the fifth embodiment. In the fifth embodiment, the observation signal vector y(k) is modeled as a sum of J source signal components $x_1(k), \ldots, x_J(k)$ by the following expression (179).

$$y(k) = \sum_{j=1}^{J} x_j(k) \tag{179}$$

The source signal component $x_j(k)$ is assumed to follow a complex gaussian distribution the mean of which is 0 and the covariance matrix thereof is $S_j(k)=v_j(k)R_j$ as represented by expression (97). In this case, $v_j(k)$ is a variance parameter for modeling a variance of the j-th source signal for each sample point, and $R_j$ is a spatial covariance matrix as a parameter for modeling a spatial characteristic of the j-th source signal. It is assumed that the variance parameter $v_j(k)$ is positive, and the spatial covariance matrix $R_j$ is a positive-definite Hermitian matrix. It is assumed that the J source signal components $x_1(k), \ldots, x_J(k)$ are not correlated with each other.

As a method of estimating the source signal component $x_j(k)$ from the observation signal vector y(k), there is known a method based on the multichannel Wiener filter. In this method, the estimation value $\hat{x}_j(k)$ of the source signal component $x_j(k)$ is calculated by the following expression (180).

$$\hat{x}_j(k) = v_j(k)R_j \left( \sum_{l=1}^{J} v_l(k)R_l \right)^{-1} y(k) \tag{180}$$

As in the fifth embodiment, to calculate the estimation value $\hat{x}_j(k)$ of the source signal component $x_j(k)$ (that is, to implement signal separation) by expression (180) in a situation in which the variance parameter $v_j(k)$ and the spatial covariance matrix $R_j$ are unknown, these parameters are requested to be estimated.

[Conventional Signal Analysis Method]

Non Patent Document 1 discloses a method of implementing signal separation by estimating the variance parameter $v_j(k)$, the spatial covariance matrix $R_j$, and the source signal component $x_j(k)$ at the same time in a situation in which the variance parameter $v_j(k)$ and the spatial covariance matrix $R_j$ are unknown.

In the related art, maximum likelihood estimation of the variance parameter $v_j(k)$ and the spatial covariance matrix $R_j$ is performed. This maximum likelihood estimation is formulated as an optimization problem of the following expression (181).

$$\max_{\Psi} L_1(\Psi) \text{ s.t. } v_j(k) > 0 \ (j=1, \ldots, J; k=1, \ldots, K), \tag{181}$$
$$R_j \succ 0 \ (j=1, \ldots, J)$$

In this case, $\Psi$ represents parameters as a whole, and constituted of the variance parameter $v_j(k)$ (j=1, ..., J; k=1, ..., K) and the spatial covariance matrix $R_j$ (j=1, ..., J). $L_1(\Psi)$ represents a log-likelihood function of the following expression (182).

$$L_1(\Psi) = \sum_{k=1}^{K} \ln \mathcal{N}\left( y(k); 0, \sum_{j=1}^{J} v_j(k) R_j \right) \tag{182}$$

The following expression (183) represents that the matrix A is a positive-definite Hermitian matrix.

$$A \succ 0 \tag{183}$$

In the related art, maximum likelihood estimation is performed based on an EM algorithm. In the EM algorithm, an E-step and an M-step are alternately iterated.

At the E-step, a posterior probability $p(x_j(k)|y(k), \hat{\Psi})$ of the source signal component $x_j(k)$ based on a present estimation value $\hat{\Psi}$ of the parameter $\Psi$. It is indicated that this posterior probability is a complex gaussian distribution as represented by the following expression (184).

$$p(x_j(k)|y(k),\hat{\Psi}) = \mathcal{N}(x_j(k); \hat{x}_j(k), \Sigma_j(k)) \tag{184}$$

In this case, the mean $\hat{x}_j(k)$ and the covariance matrix $\Sigma_j(k)$ are represented by the following expression (185) and expression (186) using the present estimation value $\hat{\Psi}$ of the parameter ($\hat{v}_j(k)$ is a present estimation value of the variance parameter $v_j(k)$, and $\hat{R}_j$ is a present estimation value of the spatial covariance matrix $R_j$).

$$\hat{x}_j(k) = \hat{v}_j(k)\hat{R}_j \left( \sum_{l=1}^{J} \hat{v}_l(k)\hat{R}_l \right)^{-1} y(k) \tag{185}$$

$$\Sigma_j(k) = \hat{v}_j(k)\hat{R}_j - (\hat{v}_j(k)\hat{R}_j) \left( \sum_{l=1}^{J} \hat{v}_l(k)\hat{R}_l \right)^{-1} (\hat{v}_j(k)\hat{R}_j) \tag{186}$$

Thus, at the E-step, the mean $\hat{x}_j(k)$ and the covariance matrix $\Sigma_j(k)$ are updated by expression (185) and expression (186). Expression (185) is nothing but an estimation value of the source signal component $x_j(k)$ based on the multichannel Wiener filter in expression (180). Hereinafter, $\hat{x}_j(k)$ is referred to as an estimation value of the source signal component $x_j(k)$, and $\Sigma_j(k)$ is referred to as a posterior covariance matrix.

At the M-step, the estimation value $\hat{v}_j(k)$ of the variance parameter $v_j(k)$ and the estimation value $\hat{R}_j$ of the spatial covariance matrix $R_j$ are updated based on the estimation value $\hat{x}_j(k)$ of the source signal component $x_j(k)$ and the posterior covariance matrix $\Sigma_j(k)$ that are updated at the E-step. These values are updated based on update rules described below (expression (187) and expression (188)).

$$\hat{v}_j(k) \leftarrow \frac{1}{I} tr\left[ (\hat{R}_j)^{-1} (\hat{x}_j(k)\hat{x}_j(k)^H + \Sigma_j(k)) \right] \tag{187}$$

$$\hat{R}_j \leftarrow \frac{1}{K} \sum_{k=1}^{K} \frac{1}{\hat{v}_j(k)} (\hat{x}_j(k)\hat{x}_j(k)^H + \Sigma_j(k)) \tag{188}$$

However, in the related art, in the update of the estimation value $\hat{x}_j(k)$ of the source signal component $x_j(k)$ represented by expression (185) and the update of the posterior covariance matrix $\Sigma_j(k)$ represented by expression (186), the inverse matrix calculation and the matrix multiplication are requested to be performed for each sample point. Specifically, the inverse matrix calculation represented by expression (189) (once for each iteration and each sample point) and the matrix multiplication represented by expression (190) (2J times for each iteration and each sample point) are requested to be performed.

$$\left(\sum_{l=1}^{J} \hat{v}_l(k)\hat{R}_l\right)^{-1} \quad (189)$$

$$(\hat{v}_j(k)\hat{R}_j)\left(\sum_{l=1}^{J} \hat{v}_l(k)\hat{R}_l\right)^{-1}(\hat{v}_j(k)\hat{R}_j) \quad (190)$$

Thus, a huge amount of calculation is requested in the related art, so that the related art is difficult to be applied to a case in which the number of the sample points K is large (the observation signal length is long) or a situation in which calculation resources are limited, such as signal separation in real time, variance processing in a sensor network, and the like.

[Signal Analysis Method According to Fifth Embodiment]

On the other hand, in the fifth embodiment, signal separation is enabled to be performed with a small calculation amount by implementing update of the estimation value $\hat{x}_j(k)$ of the source signal component $x_j(k)$ and the posterior covariance matrix $\Sigma_j(k)$ at the E-step with a small calculation amount based on simultaneous decorrelation of the J source signal components $x_1(k), \ldots, x_J(k)$. The following describes a concept of the fifth embodiment.

Assuming that the covariance matrix $v_j(k)R_j$ of the source signal component $x_j(k)$ is a diagonal matrix in both of expression (185) and expression (186), the inverse matrix operation and the matrix multiplication in expression (185) and expression (186) result in a simple reciprocal operation and multiplication for each diagonal element, so that calculation can be performed with a small calculation amount. However, normally, elements having different vectors $x_j(k)$ (that is, the j-th source signals observed at different positions) are correlated with each other, so that a nondiagonal element of the covariance matrix $v_j(k)R_j$ is not 0, that is, the covariance matrix $v_j(k)R_j$ is not a diagonal matrix.

Thus, in the fifth embodiment, it is considered that the J source signal components $x_1(k), \ldots, x_J(k)$ are subjected to simultaneous decorrelation by conversion of the following expression (191) using the Hermitian transposition $P^H$ of the regular matrix P.

$$x'_j(k) = P^H x_j(k) \quad (191)$$

The covariance matrix of $x_j'(k)$ after conversion is given by the following expression (192) and expression (193).

$$E(x'_j(k)x'_j(k)^H) = P^H E(x_j(k)x_j(k)^H)P \quad (192)$$

$$= v_j(k)P^H R_j P \quad (193)$$

A condition under which $x_j'(k)$ (j=1, ..., J) after conversion are all decorrelated, that is, a condition under which all covariance matrices given by expression (193) become diagonal matrices is represented by the following expression (194) to expression (196).

[Expression 156]

$$P^H R_1 P = \Lambda_1 \text{ (diagonal)} \quad (194)$$

$$\cdots \quad (195)$$

$$P^H R_J P = \Lambda_J \text{ (diagonal)} \quad (196)$$

As already described above, in a case in which the number of signals is J=2, the regular matrix P and the diagonal matrices $\Lambda_1, \ldots, \Lambda_J$ satisfying expression (194) to expression (196) can be obtained by solving the generalized eigenvalue problem. On the other hand, in the fifth embodiment, as an approach that can be applied not only to the case in which J=2 but also to a case in which the typical number of signals is J, maximum likelihood estimation of the regular matrix P and the diagonal matrices $\Lambda_1, \ldots, \Lambda_J$ is performed under the constraint condition that J unknown spatial covariance matrices $R_1, \ldots, R_J$ are subjected to simultaneous diagonalization based on a certain regular matrix P, that is, the constraint condition that expression (194) to expression (196) are established for the certain regular matrix P and the certain J diagonal matrices $\Lambda_1, \ldots, \Lambda_J$. The constraint condition described above is equivalent to the fact that the following expressions (expression (197) to expression (199)) are established for the certain regular matrix P and the certain J diagonal matrices $\Lambda_1, \ldots, \Lambda_J$.

$$R_1 = (P^{-1})^H \Lambda_1 P^{-1} \quad (197)$$

$$\cdots \quad (198)$$

$$R_J = (P^{-1})^H \Lambda_J P^{-1} \quad (199)$$

In the fifth embodiment, it is assumed that the spatial covariance matrices $R_1, \ldots, R_J$ are represented (modeled) as expression (197) to expression (199) using the regular matrix P as a parameter and the diagonal matrices $\Lambda_1, \ldots, \Lambda_J$ as parameters. In this case, estimation of the spatial covariance matrices $R_1, \ldots, R_J$ results in estimation of the matrix P (which is a matrix for implementing simultaneous decorrelation, so that it is referred to as a simultaneous decorrelation matrix hereinafter) and the diagonal matrices $\Lambda_1, \ldots, \Lambda_J$ (which are matrices obtained by converting the spatial covariance matrices $R_1, \ldots, R_J$ as represented by expression (194) to expression (196) using the simultaneous decorrelation matrix P, so that they are referred to as spatial covariance matrices subjected to simultaneous decorrelation hereinafter).

Thus, in the fifth embodiment, the simultaneous decorrelation matrix P, the spatial covariance matrix $\Lambda_j$ subjected to simultaneous decorrelation, and the variance parameter $v_j(k)$ are estimated at the same time using a maximum likelihood method. Due to this, simultaneous decorrelation of the source signal component (simultaneous diagonalization of the covariance matrix of the source signal component) is implemented for the typical number of signals J, so that signal separation is enabled to be performed with a small calculation amount.

The maximum likelihood estimation described above is formulated as the following optimization problem (expression (200)).

$$\max_{\Theta} L_2(\Theta) \quad (200)$$

$$\text{s.t.} \begin{cases} v_j(k) > 0 \ (j=1,\ldots,J; k=1,\ldots,K), \\ P \in GL(I, \mathbb{C}), \Lambda_j \succ 0: \text{diagonal matrix}(j=1,\ldots,J) \end{cases}$$

In this case, $\Theta$ represents all parameters as a whole, and is constituted of the variance parameter $v_j(k)$ ($j=1,\ldots,J$; $k=1,\ldots,K$), the simultaneous decorrelation matrix P, and the spatial covariance matrix $\Lambda_j$ ($j=1,\ldots,J$) subjected to simultaneous decorrelation. $L_2(\Theta)$ is a log-likelihood function in the following expression (201), and can be obtained by substituting expression (197) to expression (199) for expression (182). $GL(I, \mathbb{C})$ is a set constituted of all regular I-th order complex matrices.

$$L_2(\Theta) = \sum_{k=1}^{K} \ln \mathcal{N}\left(y(k); 0, \sum_{j=1}^{J} v_j(k)(P^{-1})^H \Lambda_j P^{-1}\right) \quad (201)$$

In the fifth embodiment, the maximum likelihood estimation described above is implemented by using the EM algorithm. The EM algorithm is constituted of the E-step and the M-step.

At the E-step, the posterior probability of the source signal component is updated based on a present estimation value $\hat{\Theta}$ of the parameter $\Theta$. Similarly to the case of the related art, a posterior probability $p(x_j(k)|y(k), \hat{\Theta})$ of $x_j(k)$ is a complex gaussian distribution on the right side of expression (184), the mean thereof can be given by expression (185), and the covariance matrix thereof can be given by expression (186). However, unlike the case of the related art, the estimation value $\hat{R}_j$ of the spatial covariance matrix $R_j$ in expression (185) and expression (186) is represented by the following expression (202) to expression (204) using the estimation value $\hat{P}$ of the simultaneous decorrelation matrix P and the estimation value $\hat{\Lambda}_j$ of the spatial covariance matrix $\Lambda_j$ subjected to simultaneous decorrelation.

$$\hat{R}_1 = (\hat{P}^{-1})^H \hat{\Lambda}_1 \hat{P}^{-1} \quad (202)$$

$$\cdots \quad (203)$$

$$\hat{R}_J = (\hat{P}^{-1})^H \hat{\Lambda}_J \hat{P}^{-1} \quad (204)$$

By substituting expression (202) to expression (204) for expression (185) and expression (186), the following expression (205) to expression (208) are obtained.

$$\underbrace{\hat{P}^H \hat{x}_j(k)}_{\hat{x}'_j(k)} = \hat{v}_j(k)\hat{\Lambda}_j \left(\sum_{l=1}^{J} \hat{v}_l(k)\hat{\Lambda}_l\right)^{-1} \underbrace{\hat{P}^H y(k)}_{y'(k)} \quad (205)$$

$$= \left(\frac{\hat{v}_j(k)[\hat{\Lambda}_j]_{11}}{\sum_{l=1}^{J}\hat{v}_l(k)[\hat{\Lambda}_l]_{11}}[y'(k)]_1 \ \cdots \ \frac{\hat{v}_j(k)[\hat{\Lambda}_j]_{II}}{\sum_{l=1}^{J}\hat{v}_l(k)[\hat{\Lambda}_l]_{II}}[y'(k)]_I\right)^T \quad (206)$$

$$\underbrace{\hat{P}^H \Sigma_j(k)\hat{P}}_{\Sigma'_j(k)} = \hat{v}_j(k)\hat{\Lambda}_j - \hat{v}_j(k)\hat{\Lambda}_j\left(\sum_{l=1}^{J}\hat{v}_l(k)\hat{\Lambda}_l\right)^{-1}(\hat{v}_j(k)\hat{\Lambda}_j) \quad (207)$$

$$= \begin{pmatrix} \hat{v}_j(k)[\hat{\Lambda}_j]_{11} - \dfrac{\hat{v}_j(k)^2([\hat{\Lambda}_j]_{11})^2}{\sum_{l=1}^{J}\hat{v}_l(k)[\hat{\Lambda}_l]_{11}} & & O \\ & \ddots & \\ O & & \hat{v}_j(k)[\hat{\Lambda}_j]_{II} - \dfrac{\hat{v}_j(k)^2([\hat{\Lambda}_j]_{II})^2}{\sum_{l=1}^{J}\hat{v}_l(k)[\hat{\Lambda}_l]_{II}} \end{pmatrix} \quad (208)$$

Thus, $\hat{x}_j'(k)$ that is obtained by base-converting the estimation value $\hat{x}_j(k)$ of the source signal component $x_j(k)$ by the estimation value $\hat{P}$ of the simultaneous decorrelation matrix P (hereinafter, referred to as an estimation value of the source signal component subjected to simultaneous decorrelation) can be updated by expression (173), and $\Sigma_j'(k)$ that is obtained by base-converting the posterior covariance matrix $\Sigma_j(k)$ by the estimation value $\hat{P}$ of the simultaneous decorrelation matrix P (hereinafter, referred to as a posterior covariance matrix subjected to simultaneous decorrelation) can be updated by expression (174). At this point, the inverse matrix operation and the matrix multiplication become an inverse matrix operation and matrix multiplication for a diagonal matrix due to simultaneous diagonalization, so that the calculation amount thereof is not $O(I^3)$ but $O(I)$, and calculation can be performed with a small calculation amount.

At the M-step, the estimation value $\hat{v}_j(k)$ of the variance parameter $v_j(k)$, the estimation value $\hat{\Lambda}_j$ of the spatial covariance matrix $\Lambda_j$ subjected to simultaneous decorrelation, and the estimation value $\hat{P}$ of the simultaneous decorrelation matrix P are updated based on maximization of a Q-function described below (refer to expression (209) and expression (210)). However, a constant term independent of $\Theta$ is ignored in expression (209) and expression (210), so that an equal sign represents that both sides thereof are equal to each other except a difference between constants independent of $\Theta$.

$$Q(\Theta) = -\sum_{k=1}^{K}\sum_{j=1}^{J}[\ln\det(v_j(k)(P^{-1})^H\Lambda_j P^{-1}) + \quad (209)$$
$$tr\{(v_j(k)(P^{-1})^H\Lambda_j P^{-1})^{-1}(\hat{x}_j(k)\hat{x}_j(k)^H + \Sigma_j(k))\}]$$

$$= -\sum_{k=1}^{K}\sum_{j=1}^{J}[\ln\det(v_j(k)(P^{-1})^H\Lambda_j P^{-1}) + \quad (210)$$
$$tr\{(v_j(k)\Lambda_j)^{-1}(\hat{x}'_j(k)\hat{x}'_j(k)^H + \Sigma'_j(k))\}]$$

By partially differentiating the Q-function in expression (210) with respect to the variance parameter $v_j(k)$ to be 0, the following expression (211) and expression (212) are obtained.

$$v_j(k) = \frac{1}{I}tr[(\Lambda_j)^{-1}(\hat{x}'_j(k)\hat{x}'_j(k)^H + \Sigma'_j(k))] \quad (211)$$

-continued $$= \frac{1}{I}\sum_{i=1}^{I}\frac{|[\hat{x}'_j(k)]_i|^2 + [\Sigma'_j(k)]_{ii}}{[\Lambda_j]_{ii}} \qquad (212)$$

In this way, an update expression of the estimation value $\hat{v}_j(k)$ of the variance parameter $v_j(k)$ in expression (175) is derived.

Assuming that the Q-function in expression (210) that is partially differentiated with respect to the spatial covariance matrix $\Lambda_j$ subjected to simultaneous decorrelation is equal to the zero matrix, the following expression (213) and expression (214) are obtained.

$$\Lambda_j = \frac{1}{K}\sum_{k=1}^{K}\frac{1}{v_j(k)}\left(\text{diag}(|\hat{x}'_j(k)|^2) + \Sigma'_j(k)\right) \qquad (213)$$

$$= \begin{pmatrix} \frac{1}{K}\sum_{k=1}^{K}\frac{1}{v_j(k)}(|[\hat{x}'_j(k)]_1|^2 + & & O \\ [\Sigma'_j(k)]_{11}) & & \\ & \ddots & \\ O & & \frac{1}{K}\sum_{k=1}^{K}\frac{1}{v_j(k)}(|[\hat{x}'_j(k)]_I|^2 + \\ & & [\Sigma'_j(k)]_{II}) \end{pmatrix} \qquad (214)$$

In this way, an update rule for the estimation value $\hat{\Lambda}_j$ of the spatial covariance matrix $\Lambda_j$ subjected to simultaneous decorrelation in expression (176) is derived. In expression (213), an absolute value square $|\bullet|^2$ is assumed to be calculated for each element of a vector, and $\text{diag}(\alpha)$ with respect to the vector $\alpha$ represents a diagonal matrix including an element of $\alpha$ as a diagonal element.

By partially differentiating the Q-function in expression (209) with respect to a complex conjugate $P^*$ of the simultaneous decorrelation matrix P, the following expression (215) is obtained.

$$\frac{\partial Q}{\partial P^*} = KJ(P^H)^{-1} - \sum_{j=1}^{J}\left(\sum_{k=1}^{K}\frac{1}{v_j(k)}\left(\hat{x}_j(k)\hat{x}_j(k)^H + \Sigma_j(k)\right)\right)P\Lambda_j^{-1} \qquad (215)$$

Assuming that this expression is equal to the zero matrix and taking vec of both sides thereof, the following expression (216) is obtained.

$$\text{vec}(P) = \qquad (216)$$

$$\left[\frac{1}{JK}\sum_{j=1}^{J}\Lambda_j^{-1}\otimes\left(\sum_{k=1}^{K}\frac{1}{v_j(k)}(\hat{x}_j(k)\hat{x}_j(k)^H + \Sigma_j(k))\right)\right]^{-1}\text{vec}((P^H)^{-1})$$

In this case, vec(A) with respect to the matrix A represents a column vector obtained by longitudinally arranging a column vector of the matrix A. Regarding this fact, a formula of the following expression (217) is established.

$$\text{vec}(AXB) = (B^T \otimes A)\text{vec}(X) \qquad (217)$$

A symbol circling "x" represents a Kronecker product. Based on a property of a block diagonal matrix, expression (216) is equivalent to the following expression (218) to expression (220).

$$[P]_i = \left(\frac{1}{JK}\sum_{j=1}^{J}\frac{1}{[\Lambda_j]_{ii}}\sum_{k=1}^{K}\frac{1}{v_j(k)}(\hat{x}_j(k)\hat{x}_j(k)^H + \Sigma_j(k))\right)^{-1}[(P^H)^{-1}]_i \qquad (218)$$

$$= P\left(\frac{1}{JK}\sum_{j=1}^{J}\frac{1}{[\Lambda_j]_{ii}}\sum_{k=1}^{K}\frac{1}{v_j(k)}(\hat{x}'_j(k)\hat{x}'_j(k)^H + \Sigma'_j(k))\right)^{-1} \qquad (219)$$

$$P^H[(P^H)^{-1}]_i$$

$$= P\left(\frac{1}{JK}\sum_{j=1}^{J}\frac{1}{[\Lambda_j]_{ii}}\sum_{k=1}^{K}\frac{1}{v_j(k)}(\hat{x}'_j(k)\hat{x}'_j(k)^H + \Sigma'_j(k))\right)^{-1}e_i \qquad (220)$$

Thus, based on a fixed point method, the estimation value $\hat{P}$ of the simultaneous decorrelation matrix P may be updated by expression (177). In this way, on the basis of the fixed point method, a learning rate is not requested to be adjusted unlike a gradient method or a natural gradient method, so that optimization can be stably performed.

The following describes derivation of the posterior probability in detail. Logarithm posterior probabilities of hidden variables $x_1(k), \ldots, x_{J-1}(k)$ can be written down as represented by the following expression (221) to expression (223).

$$\ln p(x_1(k), \ldots, x_{J-1}(k) \mid y(k), \Theta) \stackrel{c}{=} \qquad (221)$$

$$\ln p(y(k) \mid x_1(k), \ldots, x_{J-1}(k), \Theta) +$$

$$\ln p(x_1(k), \ldots, x_{J-1}(k) \mid \Theta) \stackrel{c}{=} -$$

$$\left(y(k) - \sum_{j=1}^{J-1}x_j(k)\right)^H(v_J(k)R_J)^{-1}\left(y(k) - \sum_{j=1}^{J-1}x_j(k)\right) - \qquad (222)$$

$$\sum_{j=1}^{J-1}x_j(k)^H(v_j(k)R_j)^{-1}x_j(k) = -$$

$$(y(k) - A\tilde{x}(k))^H(v_J(k)R_J)^{-1}(y(k) - A\tilde{x}(k)) - \qquad (223)$$

$$\tilde{x}(k)^H\begin{pmatrix} v_1(k)R_1 & O & \ldots & O \\ O & v_2(k)R_2 & \ldots & O \\ \vdots & \vdots & \ddots & \vdots \\ O & O & \ldots & v_{J-1}(k)R_{J-1} \end{pmatrix}^{-1}\tilde{x}(k)$$

In this case, a symbol with "c" added above the equal sign "=" represents that both sides are equal to each other except a difference between constants independent of $x_1(k), \ldots, x_{J-1}(k)$. The matrix A represents a matrix of the following expression (224) in which J−1 I-th order unit matrices I are horizontally arranged. The spatial covariance matrix $R_j$ (j=1, . . . , J) is given by expression (197) to expression (199). In the present specification, I is used for representing two kinds of meaning, that is, the number of observation signals (scalar) and the unit matrix (matrix), but confusion will not be caused because whether I is a scalar or a matrix is clear from the context.

$$A \stackrel{\triangle}{=} (I \ldots I) \qquad (224)$$

$\tilde{x}(k)$ represents a vector of the following expression (225) in which $x_1(k), \ldots, x_{J-1}(k)$ are longitudinally arranged.

$$\tilde{x}(k) = (x_1(k)^T \ldots x_{J-1}(k)^T)^T \qquad (225)$$

Based on expression (223), it is derived that the posterior probabilities of the hidden variables $x_1(k), \ldots, x_{J-1}(k)$ are a complex gaussian distribution of the following expression (226).

$$p(x_1(k), \ldots, x_{J-1}(k)|y(k),\Theta) = \mathcal{N}_{\mathbb{C}^I}(\tilde{x}(k); \hat{\tilde{x}}(k), \tilde{\Sigma}(k)) \quad (226)$$

In this case, a covariance matrix $\tilde{\Sigma}(k)$ and a mean $\hat{\tilde{x}}(k)$ are given by the following expression (227) to expression (230) and expression (231) to expression (233). An inverse matrix lemma is used at the time of transforming expression (227) into expression (228).

$$\tilde{\Sigma}(k) = \left(A^H (v_J(k)R_J)^{-1} A + \begin{pmatrix} v_1(k)R_1 & O & \cdots & O \\ O & v_2(k)R_2 & \cdots & O \\ \vdots & \vdots & \ddots & \vdots \\ O & O & \cdots & v_{J-1}(k)R_{J-1} \end{pmatrix}^{-1}\right)^{-1} \quad (227)$$

$$= \begin{pmatrix} v_1(k)R_1 & O & \cdots & O \\ O & v_2(k)R_2 & \cdots & O \\ \vdots & \vdots & \ddots & \vdots \\ O & O & \cdots & v_{J-1}(k)R_{J-1} \end{pmatrix} - \begin{pmatrix} v_1(k)R_1 & O & \cdots & O \\ O & v_2(k)R_2 & \cdots & O \\ \vdots & \vdots & \ddots & \vdots \\ O & O & \cdots & v_{J-1}(k)R_{J-1} \end{pmatrix} \times A^H$$

$$\left(v_J(k)R_J + A \begin{pmatrix} v_1(k)R_1 & O & \cdots & O \\ O & v_2(k)R_2 & \cdots & O \\ \vdots & \vdots & \ddots & \vdots \\ O & O & \cdots & v_{J-1}(k)R_{J-1} \end{pmatrix}\right)$$

$$A^H) A \times \begin{pmatrix} v_1(k)R_1 & O & \cdots & O \\ O & v_2(k)R_2 & \cdots & O \\ \vdots & \vdots & \ddots & \vdots \\ O & O & \cdots & v_{J-1}(k)R_{J-1} \end{pmatrix} \quad (228)$$

$$= \begin{pmatrix} v_1(k)R_1 & O & \cdots & O \\ O & v_2(k)R_2 & \cdots & O \\ \vdots & \vdots & \ddots & \vdots \\ O & O & \cdots & v_{J-1}(k)R_{J-1} \end{pmatrix} - \quad (229)$$

$$\begin{pmatrix} v_1(k)R_1 \\ \vdots \\ v_{J-1}(k)R_{J-1} \end{pmatrix} \left(\sum_{j=1}^{J} v_j(k)R_j\right)^{-1} \quad (230)$$

$$(v_1(k)R_1 \ \cdots \ v_{J-1}(k)R_{J-1})$$

$$\hat{\tilde{x}}(k) = \tilde{\Sigma}(k) A^H (v_J(k)R_J)^{-1} y(k) \quad (231)$$

$$= \left(\begin{pmatrix} v_1(k)R_1 \\ \vdots \\ v_{J-1}(k)R_{J-1} \end{pmatrix} - \begin{pmatrix} v_1(k)R_1 \\ \vdots \\ v_{J-1}(k)R_{J-1} \end{pmatrix} \left(\sum_{j=1}^{J} v_j(k)R_j\right)^{-1}\right)$$

$$\left(\sum_{j=1}^{J-1} v_j(k)R_j\right)\right) (v_J(k)R_J)^{-1} y(k) \quad (232)$$

$$= \begin{pmatrix} v_1(k)R_1 \\ \vdots \\ v_{J-1}(k)R_{J-1} \end{pmatrix} \left(\sum_{j=1}^{J} v_j(k)R_j\right) y(k) \quad (233)$$

As it can be found later, at the E-step, the entire matrix $\tilde{\Sigma}$ is not requested to be calculated, and only a diagonal block may be calculated, the diagonal block at the time when the matrix $\tilde{\Sigma}$ is regarded as the (J−1)-th order square block matrix including the I-th order square matrix as an element. Where the j-th diagonal block is assumed to be written as $\Sigma_j(k)$, this can be calculated as the following expression (234). Clearly, in a case of J=2, expression (234) is equivalent to expression (101).

$$\Sigma_j(k) = v_j(k)R_j - v_j(k)R_j \left(\sum_{l=1}^{J} v_l(k)R_l\right)^{-1} (v_j(k)R_j) \quad (234)$$

When $\hat{x}_j(k)$ is defined as (j, 1) block at the time when $\hat{\tilde{x}}(k)$ is regarded as a block matrix having a size of (J−1)×1 and including an I-dimensional column vector as an element, this is represented by the following expression (235).

$$\hat{x}_j(k) = v_j(k)R_j \left(\sum_{l=1}^{J} v_l(k)R_l\right)^{-1} y(k) \quad (235)$$

It is noted that $\hat{x}_j(k)$ and $\Sigma_j(k)$ are also represented by the following expression (236) and expression (237).

$$\hat{x}_j(k) = \varepsilon(x_j(k)|y(k)) \quad (236)$$

$$\Sigma_j(k) = \varepsilon((x_j(k) - \hat{x}_j(k))(x_j(k) - \hat{x}_j(k))^H | y(k)) \quad (237)$$

In the above expression, j=1, ..., J−1. E(•|y(k)) is an expected value (expression (238)) related to a posterior probability $p(x_1(k), \ldots, x_{J-1}(k)|y(k), \Theta)$ of the hidden variable.

$$\varepsilon(\bullet|y(k)) \triangleq \int_{\mathbb{C}^I} \cdots \int_{\mathbb{C}^I} (\bullet) p(x_1(k), \ldots, x_{J-1}(k)|y(k), \hat{\Theta})$$

$$dx_1(k) \ldots dx_{J-1}(k) \quad (238)$$

Similarly to this operation, with respect to j=J, $\hat{x}_J(k)$ and $\Sigma_J(k)$ are defined as represented by the following expression (239) to expression (243) and expression (244) to expression (251).

$$\hat{x}_J(k) \triangleq \varepsilon\left(y(k) - \sum_{j=1}^{J-1} x_j(k) \middle| y(k)\right) \quad (239)$$

$$= \varepsilon(y(k) - A\tilde{x}(k) | y(k)) \quad (240)$$

$$= y(k) - A\hat{\tilde{x}}(k) \quad (241)$$

$$= y(k) - \sum_{j=1}^{J-1} \hat{x}_j(k) \quad (242)$$

$$= v_J(k)R_J \left(\sum_{l=1}^{J} v_l(k)R_l\right)^{-1} y(k) \quad (243)$$

$$\Sigma_J(k) = \varepsilon\left(\left(y(k) - \sum_{j=1}^{J-1} x_j(k) - y(k) + \sum_{j=1}^{J-1} \hat{x}_j(k)\right) \times \quad (244)\right.$$

$$\left.\left(y(k) - \sum_{j=1}^{J-1} x_j(k) - y(k) + \sum_{j=1}^{J-1} \hat{x}_j(k)\right)^H \middle| y(k)\right)$$

$$= \varepsilon\left(\left(\sum_{j=1}^{J-1} x_j(k) - \sum_{j=1}^{J-1} \hat{x}_j(k)\right) \quad (245)\right.$$

$$\left.\left(\sum_{j=1}^{J-1} x_j(k) - \sum_{j=1}^{J-1} \hat{x}_j(k)\right)^H \middle| y(k)\right)$$

$$= \varepsilon\left(A(\tilde{x}(k) - \hat{\tilde{x}}(k))(\tilde{x}(k) - \hat{\tilde{x}}(k))^H A^H \middle| y(k)\right) \quad (246)$$

$$= A\varepsilon\Big(\big(\tilde{x}(k) - \hat{\tilde{x}}(k)\big)\big(\tilde{x}(k) - \hat{\tilde{x}}(k)\big)^H \mid y(k)\Big)A^H \quad (247)$$

$$= A\sum(k)A^H \quad (248)$$

$$= \sum_{j=1}^{J-1} v_j(k)R_j - \left(\sum_{j=1}^{J-1} v_j(k)R_j\right)\left(\sum_{j=1}^{J} v_j(k)R_j\right)^{-1} \quad (249)$$

$$\left(\sum_{j=1}^{J-1} v_j(k)R_j\right)$$

$$= \left(\sum_{j=1}^{J-1} v_j(k)R_j\right)\left(\sum_{j=1}^{J} v_j(k)R_j\right)^{-1}(v_J(k)R_J) \quad (250)$$

$$= v_J(k)R_J - (v_J(k)R_J)\left(\sum_{j=1}^{J} v_j(k)R_j\right)^{-1}(v_J(k)R_J) \quad (251)$$

Accordingly, the following expression (252) and expression (253) are established with respect to j=1, ..., J.

$$\hat{x}_j(k) = v_j(k)R_j\left(\sum_{l=1}^{J} v_l(k)R_l\right)^{-1} y(k) \quad (252)$$

$$\sum_j(k) = v_j(k)R_j - v_j(k)R_j\left(\sum_{l=1}^{J} v_l(k)R_l\right)^{-1}(v_j(k)R_j) \quad (253)$$

The following describes derivation of the Q-function in detail. Logarithms of joint distribution of the observation signal vector y(k) and the hidden variables $x_1(k), \ldots, x_{J-1}(k)$ are written down as represented by the following expression (254) to expression (256). However, a constant term is ignored in expression (254) to expression (256), so that the equal sign represents that both sides thereof are equal to each other except a difference between constants.

$$\ln p(x_1(k), \ldots, x_{J-1}(k) \mid \Theta) = \ln p(y(k) \mid x_1(k), \ldots, x_{J-1}(k), \Theta) + \quad (254)$$
$$\ln p(x_1(k), \ldots, x_{J-1}(k) \mid \Theta) = -$$

$$\sum_{j=1}^{J-1} \ln \det(v_j(k)R_j) - \quad (255)$$

$$\left(y(k) - \sum_{j=1}^{J-1} x_j(k)\right)^H (v_J(k)R_J)^{-1}\left(y(k) - \sum_{j=1}^{J-1} x_j(k)\right) -$$

$$\sum_{j=1}^{J-1} x_j(k)^H (v_j(k)R_j)^{-1} x_j(k) \quad (256)$$

In this case, it is noted that the following expressions (expression (257) to expression (262)) are established.

$$\varepsilon(x_j(k)x_j(k)^H \mid y(k)) = \quad (257)$$
$$\varepsilon\big((x_j(k) - \hat{x}_j(k) + \hat{x}_j(k))(x_j(k) - \hat{x}_j(k) + \hat{x}_j(k))^H \mid y(k)\big) =$$

$$\sum_j(k) + \hat{x}_j(k)\hat{x}_j(k)^H \quad (j = 1, \ldots, J-1) \quad (258)$$

$$\varepsilon\left(\left(y(k) - \sum_{j=1}^{J-1} x_j(k)\right)\left(y(k) - \sum_{j=1}^{J-1} x_j(k)\right)^H \mid y(k)\right) = \quad (259)$$

$$\varepsilon\left(\left(y(k) - \sum_{j=1}^{J-1} \hat{x}_j(k) + \sum_{j=1}^{J-1} \hat{x}_j(k) - \sum_{j=1}^{J-1} x_j(k)\right)\cdot\right. \quad (260)$$
$$\left.\left(y(k) - \sum_{j=1}^{J-1} \hat{x}_j(k) + \sum_{j=1}^{J-1} \hat{x}_j(k) - \sum_{j=1}^{J-1} x_j(k)\right)^H \mid y(k)\right) =$$

$$\left(y(k) - \sum_{j=1}^{J-1} \hat{x}_j(k)\right)\left(y(k) - \sum_{j=1}^{J-1} \hat{x}_j(k)\right)^H + \sum_j(k) = \quad (261)$$

$$\sum_j(k) + \hat{x}_j(k)\hat{x}_j(k)^H \quad (262)$$

Thus, the Q-function is given by the following expressions (expression (263) to expression (266)). Expression (264) is nothing but expression (209).

$$Q \stackrel{c}{=} \sum_{k=1}^{K}\sum_{j=1}^{J}\Big[-\ln\det(v_j(k)R_j) - tr\big((v_j(k)R_j)^{-1} \quad (263)$$
$$\left(\sum_j(k) + \hat{x}_j(k)\hat{x}_j(k)^H\right)\Big)\Big]$$

$$= \sum_{k=1}^{K}\sum_{j=1}^{J}\Big[-\ln\det\big(v_j(k)(P^{-1})^H \Lambda_j P^{-1}\big) - \quad (264)$$
$$tr\left\{\big(v_j(k)(P^{-1})^H \Lambda_j P^{-1}\big)^{-1}\left(\sum_j(k) + \hat{x}_j(k)\hat{x}_j(k)^H\right)\right\}\Big]$$

$$= \sum_{k=1}^{K}\sum_{j=1}^{J}\Big[-\ln\det\big(v_j(k)(P^{-1})^H \Lambda_j P^{-1}\big) - \quad (265)$$
$$tr\left\{(v_j(k)\Lambda_j)^{-1}\left(\sum_j'(k) + \hat{x}_j'(k)\hat{x}_j'(k)^H\right)\right\}\Big]$$

$$= \sum_{k=1}^{K}\sum_{j=1}^{J}\Big[-\ln\det\big(v_j(k)(P^{-1})^H \Lambda_j P^{-1}\big) - \quad (266)$$
$$tr\left\{(v_j(k)\Lambda_j)^{-1}\left(\sum_j'(k) + \mathrm{diag}(|\hat{x}_j'(k)|^2)\right)\right\}\Big]$$

In this case, a square of an absolute value $|\cdot|^2$ in expression (266) is assumed to be taken for each element. The symbol with "c" added above the equal sign "=" represents that both sides are equal to each other except a difference between constants independent of $\Theta$ (it is noted that the symbol is used for representing meaning different from the meaning previously described).

First Modification of Fifth Embodiment

Next, the following describes a first modification of the fifth embodiment. The first modification of the fifth embodiment describes a modification of the processing performed by the signal parameter analysis unit. In the fifth embodiment, the signal parameter analysis unit updates the estimation value ^P of the simultaneous decorrelation matrix P based on the fixed point method. On the other hand, the signal parameter analysis unit according to the first modification of the fifth embodiment updates the estimation value ^P of the simultaneous decorrelation matrix P based on any optimization method (for example, a gradient method, a natural gradient method, and a Newton's method) other than the fixed point method.

For example, in a case of the gradient method, the signal parameter analysis unit according to the first modification of the fifth embodiment updates the estimation value ^P of the simultaneous decorrelation matrix P by the following expression (267) (this is directly derived from expression (215)).

$$\hat{P} \leftarrow \hat{P} + \mu \left[ (\hat{P}^H)^{-1} - \frac{1}{KJ} (\hat{P}^H)^{-1} \sum_{j=1}^{J} \left( \sum_{k=1}^{K} \frac{1}{\hat{v}_j(k)} \left( \hat{x}'_j(k)\hat{x}'_j(k)^H + \sum'_j(k) \right) \right) \hat{\Lambda}_j^{-1} \right] \quad (267)$$

However, at the time of the first update of the estimation value ^P of the simultaneous decorrelation matrix P performed by the signal parameter analysis unit, ^P is replaced with ^P$^{(0)}$ on the right side of expression (267). μ is a positive number that is called a learning rate, and may be determined to be μ=0.05, for example.

In a case of the natural gradient method, the signal parameter analysis unit according to the first modification of the fifth embodiment updates the estimation value of the simultaneous decorrelation matrix P by the following expression (268) (this is also directly derived from expression (215)).

$$\hat{P} \leftarrow (1+\mu)\hat{P} - \frac{\mu}{KJ} (\hat{P}^H)^{-1} \sum_{j=1}^{J} \left( \sum_{k=1}^{K} \frac{1}{\hat{v}_j(k)} \left( \hat{x}'_j(k)\hat{x}'_j(k)^H + \sum'_j(k) \right) \right) \hat{\Lambda}_j^{-1} \hat{P}^H \hat{P} \quad (268)$$

However, at the time of the first update of the estimation value ^P of the simultaneous decorrelation matrix P performed by the signal parameter analysis unit, ^P is replaced with ^P$^{(0)}$ on the right side of expression (268). μ is a positive number that is called a learning rate, and may be determined to be μ=0.05, for example. According to the natural gradient method, measurement of a space is appropriately considered, so that it is typically known that update can be performed more stably than the gradient method.

Second Modification of Fifth Embodiment

Next, the following describes a second modification of the fifth embodiment. The second modification of the fifth embodiment describes a modification of the processing performed by the signal parameter analysis unit. In the fifth embodiment and the first modification of the fifth embodiment, the signal parameter analysis unit updates the estimation value ^P of the simultaneous decorrelation matrix P based on the Q-function. On the other hand, the signal parameter analysis unit according to the second modification of the fifth embodiment directly updates the estimation value ^P of the simultaneous decorrelation matrix P based on a log-likelihood function $L_2(\Theta)$.

The signal parameter analysis unit according to the second modification of the fifth embodiment updates the estimation value ^P of the simultaneous decorrelation matrix P by the following expression (expression (269)) (it is assumed that E represents a unit matrix) based on the observation signal vector y'(k) subjected to simultaneous decorrelation from the simultaneous decorrelation unit, the estimation value $\hat{\Lambda}_j$ of the spatial covariance matrix $\Lambda_j$ subjected to simultaneous decorrelation from the spatial covariance matrix update unit, and the estimation value $\hat{v}_j(k)$ of the variance parameter $v_j(k)$ from the variance parameter update unit (and the initial estimation value ^P$^{(0)}$ of the simultaneous decorrelation matrix P from the initialization unit at the time of the first update of the estimation value ^P of the simultaneous decorrelation matrix P performed by the signal parameter analysis unit).

$$[\hat{P}]_i \leftarrow \hat{P} \left( \frac{1}{K} \sum_{k=1}^{K} \frac{1}{\sum_{j=1}^{J} \hat{v}_j(k)[\hat{\Lambda}_j]_{ii}} y'(k)y'(k)^H \right)^{-1} [E]_i \quad (269)$$

However, at the time of the first update of ^P performed by the signal parameter analysis unit, ^P is replaced with ^P$^{(0)}$ on the right side of expression (269). Alternatively, the signal parameter analysis unit may update the estimation value ^P of the simultaneous decorrelation matrix P by successively applying expression (269) multiple times.

The following describes derivation of the update rule for the estimation value ^P of the simultaneous decorrelation matrix P based on the log-likelihood function $L_2(\Theta)$ in expression (269). By partially differentiating the log-likelihood function in expression (201) with respect to the complex conjugate P* of the simultaneous decorrelation matrix P, the following expression (270) is obtained.

$$\frac{\partial L_2(\Theta)}{\partial P^*} = K(P^H)^{-1} - \sum_{k=1}^{K} y(k)y(k)^H P \left( \sum_{j=1}^{J} v_j(k)\Lambda_j \right)^{-1} \quad (270)$$

Assuming that expression (270) is equal to a zero matrix, and taking vec of both sides thereof, the following expression (expression (271)) is obtained.

$$vec((P^H)^{-1}) = \left[ \frac{1}{K} \sum_{k=1}^{K} \left( \sum_{j=1}^{J} v_j(k)\Lambda_j \right)^{-1} \otimes (y(k)y(k)^H) \right] vec(P) \quad (271)$$

The matrix on the right side of expression (271) can be transformed as represented by the following expression (272) and expression (273).

$$\frac{1}{K}\sum_{k=1}^{K}\left(\sum_{j=1}^{J}v_j(k)\Lambda_j\right)^{-1}\otimes(y(k)y(k)^H)= \qquad (272)$$

$$\frac{1}{K}\sum_{k=1}^{K}\begin{pmatrix} \frac{1}{\sum_{j=1}^{J}v_j(k)}y(k)y(k)^H & & O \\ [\Lambda_j]_{11} & & \\ & \ddots & \\ O & & \frac{1}{\sum_{j=1}^{J}v_j(k)}y(k)y(k)^H \\ & & [\Lambda_j]_{II} \end{pmatrix}=$$

$$\begin{pmatrix} \frac{1}{K}\sum_{k=1}^{K}\frac{1}{\sum_{j=1}^{J}v_j(k)}y(k)y(k)^H & & O \\ [\Lambda_j]_{11} & & \\ & \ddots & \\ O & & \frac{1}{K}\sum_{k=1}^{K}\frac{1}{\sum_{j=1}^{J}v_j(k)}y(k)y(k)^H \\ & & [\Lambda_j]_{II} \end{pmatrix} \qquad (273)$$

Accordingly, the following expressions (expression (274) and expression (275)) are obtained.

$$[(P^H)^{-1}]_i = \left(\frac{1}{K}\sum_{k=1}^{K}\frac{1}{\sum_{j=1}^{J}v_j(k)[\Lambda_j]_{ii}}y(k)y(k)^H\right)[P]_i \qquad (274)$$

$$\therefore [P]_i = \left(\frac{1}{K}\sum_{k=1}^{K}\frac{1}{\sum_{j=1}^{J}v_j(k)[\Lambda_j]_{ii}}y(k)y(k)^H\right)^{-1}[(P^H)^{-1}]_i \qquad (275)$$

By substituting expression (276) for expression (275), it is possible to obtain the update rule for the estimation value ^P of the simultaneous decorrelation matrix P based on the fixed point method of expression (269).

$$y(k)=(P^H)^{-1}y'(k) \qquad (276)$$

In this way, on the basis of the fixed point method, the learning rate is not requested to be adjusted unlike the gradient method and the natural gradient method, so that optimization can be stably performed.

Similarly to the first modification of the fifth embodiment, in the second modification of the fifth embodiment, the estimation value ^P of the simultaneous decorrelation matrix P may be updated by using not only the fixed point method but also any optimization method (a gradient method, a natural gradient method, a Newton's method, and the like). The following describes such an example.

In a case of the gradient method, the signal parameter analysis unit according to the second modification of the fifth embodiment updates the estimation value ^P of the simultaneous decorrelation matrix P by the following expression (277) (this is directly derived from expression (270)) based on the observation signal vector y(k) from the observation signal vector creation unit, the estimation value ^Λ_j of the spatial covariance matrix Λ_j subjected to simul-taneous decorrelation from the spatial covariance matrix update unit, and the estimation value ^v_j(k) of the variance parameter v_j(k) from the variance parameter update unit (and the initial estimation value ^P^(O) of the simultaneous decorrelation matrix P from the initialization unit at the time of the first update of the estimation value ^P of the simultaneous decorrelation matrix P performed by the signal parameter analysis unit).

$$\hat{P} \leftarrow \hat{P} + \mu\left[(\hat{P}^H)^{-1} - \frac{1}{K}\sum_{k=1}^{K}y(k)y(k)^H \hat{P}\left(\sum_{j=1}^{J}\hat{v}_j(k)\hat{\Lambda}_j\right)^{-1}\right] \qquad (277)$$

However, at the time of the first update of the estimation value ^P of the simultaneous decorrelation matrix P performed by the signal parameter analysis unit, ^P is replaced with ^P^(O) on the right side of expression (277). Alternatively, the signal parameter analysis unit may update the estimation value ^P of the simultaneous decorrelation matrix P by successively applying expression (277) multiple times. The signal parameter analysis unit may also use, instead of expression (277), an expression represented by using the observation signal vector y'(k) subjected to simultaneous decorrelation that is obtained by substituting expression (276) for expression (277). μ is a predetermined positive number that is called a learning rate, and may be determined to be μ=0.05 and the like, for example. In this case of the gradient method, the inverse matrix calculation is performed only once per one time of application of expression (277) and the matrix multiplication is not requested (the inverse matrix calculation for the diagonal matrix is not counted), so that the estimation value ^P of the simultaneous decorrelation matrix P can be updated with a smaller calculation amount as compared with the case of the fixed point method.

In a case of the natural gradient method, the signal parameter analysis unit according to the second modification of the fifth embodiment updates the estimation value ^P of the simultaneous decorrelation matrix P by the following expression (278) (this is also directly derived from expression (270)) based on the observation signal vector y(k) from the observation signal vector creation unit, the estimation value ^Λ_j of the spatial covariance matrix Λ_j subjected to simultaneous decorrelation from the spatial covariance matrix update unit, and the estimation value ^v_j(k) of the variance parameter v_j(k) from the variance parameter update unit (and the initial estimation value ^P^(O) of the simultaneous decorrelation matrix P from the initialization unit at the time of the first update of the estimation value ^P of the simultaneous decorrelation matrix P performed by the signal parameter analysis unit).

$$\hat{P} \leftarrow (1+\mu)\hat{P} - \frac{\mu}{K}\sum_{k=1}^{K}y(k)y(k)^H \hat{P}\left(\sum_{j=1}^{J}\hat{v}_j(k)\hat{\Lambda}_j\right)^{-1} \hat{P}^H \hat{P} \qquad (278)$$

However, at the time of the first update of the estimation value ^P of the simultaneous decorrelation matrix P performed by the signal parameter analysis unit, ^P is replaced with ^P^(O) on the right side of expression (278). Alternatively, the signal parameter analysis unit may update the estimation value ^P of the simultaneous decorrelation matrix P by successively applying expression (278) multiple times. The signal parameter analysis unit may also use, instead of expression (278), an expression represented by using the observation signal vector y'(k) subjected to simultaneous decorrelation that is obtained by substituting expression (276) for expression (278). μ is a predetermined positive number that is called a learning rate, and may be determined to be μ=0.05 and the like, for example. According to the natural gradient method, measurement of a space is appropriately considered, so that it is typically known that update can be performed more stably than the gradient method.

Third Modification of Fifth Embodiment

Next, the following describes a third modification of the fifth embodiment. In the third modification of the fifth embodiment, the fifth embodiment is applied for each frequency similarly to the third embodiment.

In the third modification of the fifth embodiment, it is assumed that I (I is an integral number equal to or larger than 2) observation signals $y_i(t)$ acquired by a microphone at different positions are input to the signal analysis device in a situation in which J sound source signals are present in a mixed manner. The observation signal $y_i(t)$ is subjected to frequency resolution, subjected to signal separation using the method described in the fifth embodiment for each frequency, and converted into a time domain at last.

With reference to FIG. 5 and FIG. 6, the following describes a configuration of the signal analysis device according to the third modification of the fifth embodiment, and a processing procedure of the signal analysis processing.

Pieces of processing performed by the frequency domain conversion unit 310 (Step S40, Step S41) and the time domain conversion unit 330 (Step S43) are the same as those in the third embodiment. The following describes processing performed by the frequency domain signal separation unit 320 (Step S42) as a difference.

The frequency domain signal separation unit 320 receives the observation signal of the time frequency domain represented by expression (279) from the frequency domain conversion unit 310, calculates the estimation value of the source signal component of the time-frequency domain represented by expression (280) by performing signal separation in the frequency domain using the method of the fifth embodiment for each f, and passes the estimation value to the time domain conversion unit 330 (Step S42).

$$y_i^f(k) \tag{279}$$

$$\hat{x}_j^f(k) \tag{280}$$

That is, by using the observation signal represented by expression (281) as an input for f=1, the estimation value of the source signal component of expression (282) is obtained by using the method in the fifth embodiment.

$$y_i^1(k) \tag{281}$$

$$\hat{x}_1^1(k), \ldots, \hat{x}_J^1(k) \tag{282}$$

By using the observation signal represented by expression (283) as an input for f=2, the estimation value of the source signal component of expression (284) is obtained by using the method in the fifth embodiment.

$$y_i^2(k) \tag{283}$$

$$\hat{x}_1^2(k), \ldots, \hat{x}_J^2(k) \tag{284}$$

The same processing is repeatedly performed for each f, and finally, by using the observation signal represented by expression (285) as an input for f=F, the estimation value of the source signal component of expression (286) is obtained by using the method in the fifth embodiment.

$$y_i^F(k) \tag{285}$$

$$\hat{x}_1^F(k), \ldots, \hat{x}_J^F(k) \tag{286}$$

The estimation value of the source signal component of the time-frequency domain that is obtained in this way (refer to expression (287)) is passed to the time domain conversion unit 330.

$$\hat{x}_j^f(k) \tag{287}$$

Effect of Fifth Embodiment

To confirm the effect of the present invention, the following describes a sound source separation experiment using the conventional method and the fifth embodiment.

Figure 14:
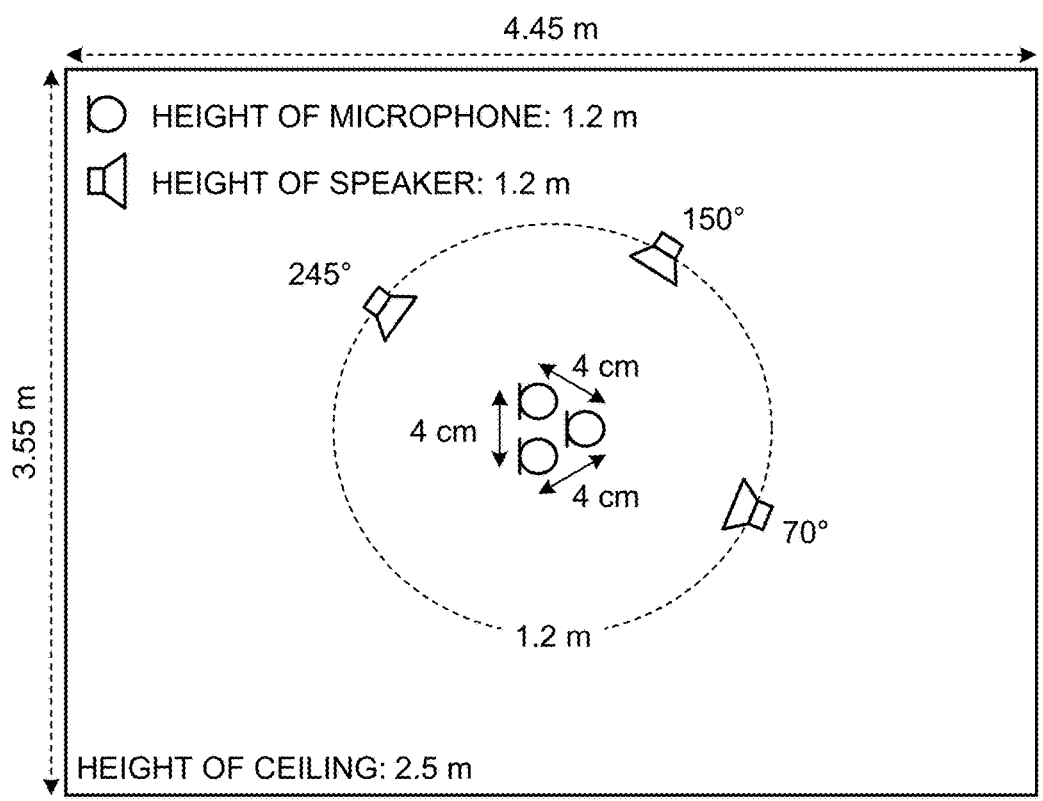
FIG. 14 is a diagram illustrating an experiment condition for a sound source separation experiment using the conventional method and a method according to the fifth embodiment.
Figure 15:
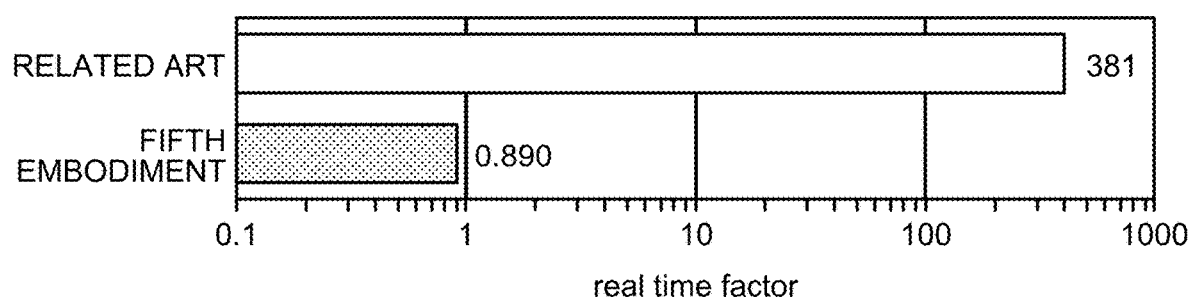
FIG. 15 is a diagram illustrating a result of the sound source separation experiment (real time factor) using the conventional method and the method according to the fifth embodiment.
Figure 16:
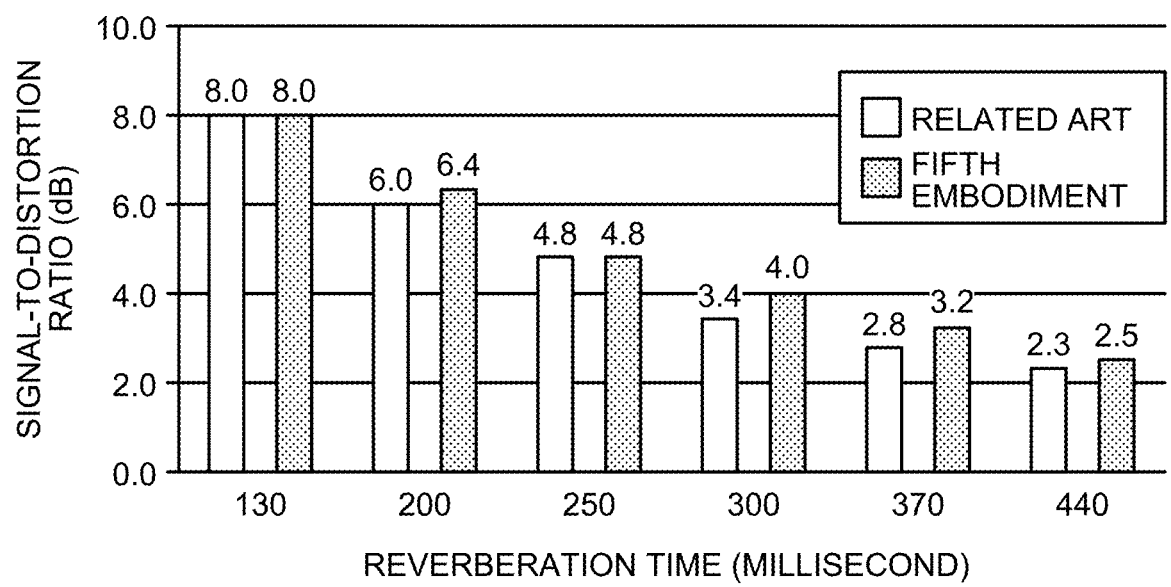
FIG. 16 is a diagram illustrating a result of the sound source separation experiment (sound source separation performance) using the conventional method and the method according to the fifth embodiment.

FIG. 14 is a diagram illustrating an experiment condition for the sound source separation experiment using the conventional method and the fifth embodiment. FIG. 15 is a diagram illustrating a result of the sound source separation experiment (real time factor) using the conventional method and the fifth embodiment. FIG. 16 is a diagram illustrating a result of the sound source separation experiment (sound source separation performance) using the conventional method and the fifth embodiment.

A reverberation voice was generated by convoluting a reverberation impulse response illustrated in FIG. 14 that was measured in a laboratory into an English voice of 8 seconds, and reverberation voices of a plurality of persons were added to generate the observation signal. FIG. 15 and FIG. 16 illustrate performances in a case of performing signal separation on the observation signal using respective methods. FIG. 15 illustrates the real time factor (time requested for processing when the observation signal length is 1). FIG. 16 illustrates a signal-to-distortion ratio as sound source separation performance (as a value becomes larger, the sound source separation performance is higher).

As illustrated in FIG. 15 and FIG. 16, with the method according to the fifth embodiment, the calculation time was able to be reduced by 420 times or more even in a case in which the number of sound sources was equal to or larger than 3, and sound source separation performance higher than that in the conventional method was able to be obtained.

In this way, with the fifth embodiment, the calculation time can be greatly reduced as compared with the conventional method, and signal separation performance higher than that in the conventional method can be implemented. The fifth embodiment can also be applied to a case in which the number of signals is not 2, and can be applied to a case in which the number of signals is equal to or larger than 3.

Sixth Embodiment

Next, the following describes a configuration, a processing procedure, and an effect of the signal analysis device according to a sixth embodiment. The sixth embodiment describes a specific method for implementing the modification of the fourth embodiment.

Similarly to the fifth embodiment, the sixth embodiment describes a method of implementing signal separation by estimating the variance parameter $v_j(k)$, the spatial covariance matrix $\Lambda_j$ subjected to simultaneous decorrelation and the simultaneous decorrelation matrix P as parameters for modeling the spatial covariance matrix $R_j$, and the source signal component $x_j(k)$ at the same time in a situation in which J source signals are typically present in a mixed manner and the variance parameter $v_j(k)$ and the spatial covariance matrix $R_j$ are unknown.

While the fifth embodiment is based on the EM algorithm, the sixth embodiment is based on the auxiliary function method. In the sixth embodiment, it is assumed that I observation signals $y_i(k)$ acquired at different positions are input to the signal analysis device.

[Configuration and Processing of Signal Analysis Device]

Figure 17:
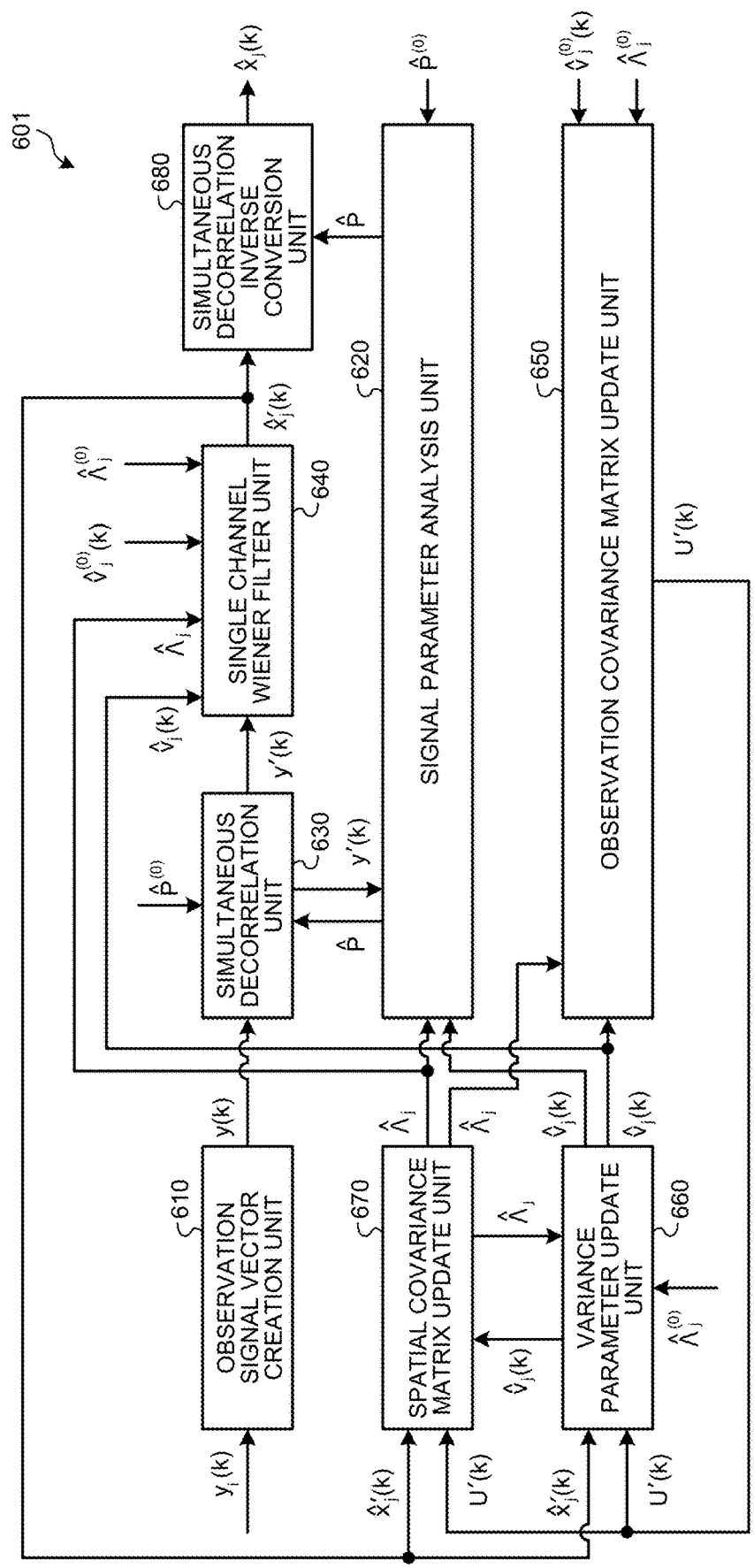
FIG. 17 is a diagram illustrating an example of a configuration of a signal analysis device according to a sixth embodiment.
Figure 18:
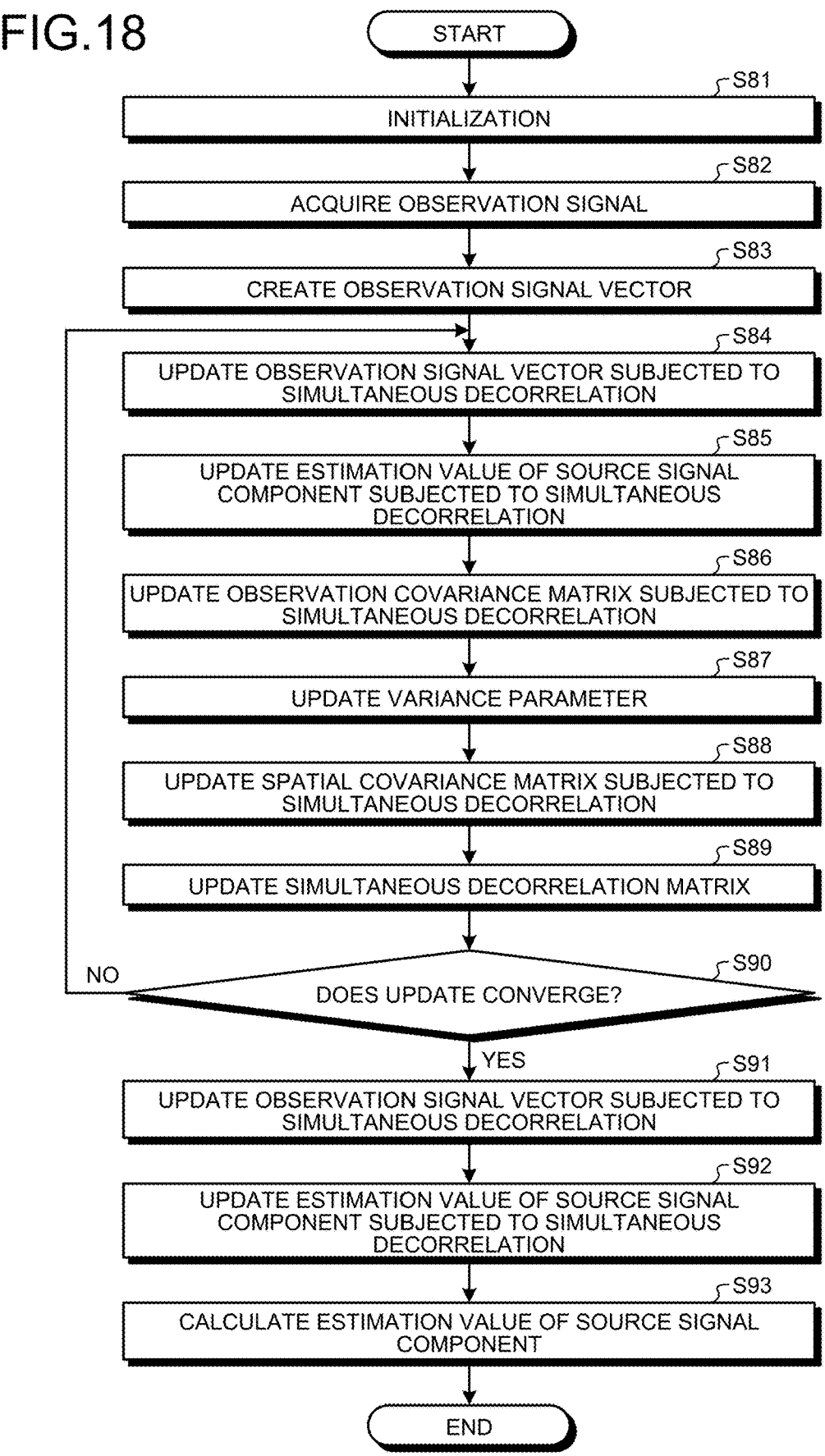
FIG. 18 is a flowchart illustrating an example of a processing procedure of signal analysis processing according to the sixth embodiment.

With reference to FIG. 17 and FIG. 18, the following describes the configuration of the signal analysis device and the processing procedure of the signal analysis processing according to the sixth embodiment. FIG. 17 is a diagram illustrating an example of the configuration of the signal analysis device according to the sixth embodiment. FIG. 18 is a flowchart illustrating an example of the processing procedure of the signal analysis processing according to the sixth embodiment.

As illustrated in FIG. 17, a signal analysis device 601 includes an initialization unit (not illustrated), an observation signal vector creation unit 610, a simultaneous decorrelation unit 630, a single channel Wiener filter unit 640, an observation covariance matrix update unit 650, a variance parameter update unit 660, a spatial covariance matrix update unit 670, a signal parameter analysis unit 620, a convergence determination unit (not illustrated), and a simultaneous decorrelation inverse conversion unit 680.

First, the following describes an outline of each unit of the signal analysis device. The processing performed by the initialization unit (not illustrated) (Step S81), the processing performed by the observation signal vector creation unit 610 (Steps S82 and S83), the processing performed by the simultaneous decorrelation unit 630 (Step S84), and the processing performed by the single channel Wiener filter unit 640 (Step S85) are the same as those in the fifth embodiment, so that the description thereof will not be repeated herein.

The observation covariance matrix update unit 650 receives the estimation value $\hat{v}_j(k)$ of the variance parameter $v_j(k)$ from the variance parameter update unit 660 (as an exception, the initial estimation value $\hat{v}_j^{(0)}(k)$ of the variance parameter $v_j(k)$ from the initialization unit is used at the time of the first processing performed by the observation covariance matrix update unit 650) and the estimation value $\hat{\Lambda}_j$ of the spatial covariance matrix $\Lambda_j$ subjected to simultaneous decorrelation from the spatial covariance matrix update unit 670 (as an exception, the initial estimation value $\hat{\Lambda}_j^{(0)}$ of the spatial covariance matrix $\Lambda_j$ subjected to simultaneous decorrelation from the initialization unit at the time of the first processing performed by the observation covariance matrix update unit 650), and updates an observation covariance matrix $U'(k)$ subjected to simultaneous decorrelation by the following expression (288) (Step S86).

$$U'(k) \leftarrow \sum_{j=1}^{J} \hat{v}_j(k) \hat{\Lambda}_j \tag{288}$$

However, at the time of the first processing performed by the observation covariance matrix update unit 650, $\hat{v}_j(k)$ is replaced with $\hat{v}_j^{(0)}(k)$, and $\hat{\Lambda}_j$ is replaced with $\hat{\Lambda}_j^{(0)}$ in the above expression.

The variance parameter update unit 660 receives the estimation value $\hat{x}_j'(k)$ of the source signal component $x_j'(k)$ subjected to simultaneous decorrelation from the single channel Wiener filter unit 640, the observation covariance matrix $U'(k)$ subjected to simultaneous decorrelation from the observation covariance matrix update unit 650, and the estimation value $\hat{\Lambda}_j$ of the spatial covariance matrix $\Lambda_j$ subjected to simultaneous decorrelation from the spatial covariance matrix update unit 670 (as an exception, the initial estimation value $\hat{\Lambda}_j^{(0)}$ of the spatial covariance matrix $\Lambda_j$ subjected to simultaneous decorrelation from the initialization unit is used at the time of the first processing performed by the variance parameter update unit 660), and updates the estimation value $\hat{v}_j(k)$ of the variance parameter $v_j(k)$ by the following expression (expression (289)) (Step S87).

$$\hat{v}_j(k) \leftarrow \sqrt{\frac{\sum_{i=1}^{I} \frac{|[\hat{x}_j'(k)]_i|^2}{[\hat{\Lambda}_j]_{ii}}}{\sum_{i=1}^{I} \frac{[\hat{\Lambda}_j]_{ii}}{[U'(k)]_{ii}}}} \tag{289}$$

However, at the time of the first processing performed by the variance parameter update unit 660, $\hat{\Lambda}_j$ is replaced with $\hat{\Lambda}_j^{(0)}$ in the above expression.

The spatial covariance matrix update unit 670 receives the estimation value $\hat{x}_j'(k)$ of the source signal component $x_j'(k)$ subjected to simultaneous decorrelation from the single channel Wiener filter unit 640, the observation covariance matrix $U'(k)$ subjected to simultaneous decorrelation from the observation covariance matrix update unit 650, and the estimation value $\hat{v}_j(k)$ of the variance parameter $v_j(k)$ from the variance parameter update unit 660, and updates the estimation value $\hat{\Lambda}_j$ of the spatial covariance matrix $\Lambda_j$ subjected to simultaneous decorrelation by the following expression (290) (Step S88).

$$[\hat{\Lambda}_j]_{im} \leftarrow \begin{cases} \sqrt{\dfrac{\sum_{k=1}^{K} \dfrac{|[\hat{x}_j'(k)]_{ii}|^2}{\hat{v}_j(k)}}{\sum_{k=1}^{K} \dfrac{\hat{v}_j(k)}{[U'(k)]_{ii}}}}, & i = m \\ 0, & i \neq m \end{cases} \tag{290}$$

The signal parameter analysis unit 620 performs processing similar to that in the second modification of the fifth embodiment to update the estimation value $\hat{P}$ of the simultaneous decorrelation matrix P (Step S89).

The convergence determination unit (not illustrated) determines whether the update converges (Step S90). If the convergence determination unit determines that the update does not converge (No at Step S90), the process returns to the processing performed by the simultaneous decorrelation unit 630 (Step S84), and the processing is continued.

On the other hand, if the convergence determination unit determines that the update converges (Yes at Step S90), the processing performed by the simultaneous decorrelation unit 630 (Step S91), the processing performed by the single channel Wiener filter unit 640 (Step S92), and the processing performed by the simultaneous decorrelation inverse conversion unit 680 (Step S93) are performed similarly to the fifth embodiment, and the estimation value $\hat{x}_j(k)$ of the source signal component $x_j(k)$ is calculated to be output, accordingly.

[Background of Processing Performed by Signal Analysis Device]

Next, the following describes a background of the signal analysis device according to the sixth embodiment. As described above in the fifth embodiment, to calculate the estimation value ^$x_j(k)$ of the source signal component $x_j(k)$ (that is, to implement signal separation) by expression (180) in a situation in which the variance parameter $v_j(k)$ and the spatial covariance matrix $R_j$ are unknown, the variance parameter $v_j(k)$ and the spatial covariance matrix $R_j$ are requested to be estimated.

By solving the optimization problem of expression (181) based on the auxiliary function method, maximum likelihood estimation of the variance parameter $v_j(k)$ and the spatial covariance matrix $R_j$ can be performed.

In the auxiliary function method, a step of maximizing an auxiliary function $L_1^-(\Psi, \Phi)$ for an auxiliary variable $\Phi$ to update $\Phi$ based on the auxiliary variable $\Phi$ and the auxiliary function $L_1^-(\Psi, \Phi)$ satisfying the following expression, and a step of updating the parameter $\Psi$ so that the auxiliary function $L_1^-(\Psi, \Phi)$ is not reduced are alternately iterated (refer to expression (291)).

$$(\forall \Psi)(\max_\Phi L_1^-(\Psi, \Phi) = L_1(\Psi)) \tag{291}$$

In the sixth embodiment, $L_1^-(\Psi, \Phi)$ in expression (292) is used as the auxiliary function.

$$L_1^-(\Psi, \Phi) \triangleq -\sum_{k=1}^{K}\left[\ln \det U(k) + \sum_{j=1}^{J} tr(v_j(k)R_j U(k)^{-1}) + \sum_{j=1}^{J} tr\{y(k)y(k)^H G_j(k)^H (v_j(k)R_j)^{-1} G_j(k)\}\right] + \text{constant} \tag{292}$$

In this case, the "constant" on the right side is a constant independent of the parameter $\Psi$ and the auxiliary variable $\Phi$. It can be indicated that expression (292) satisfies the condition for the auxiliary function of expression (291) similarly to reference document 3 and reference document 4. It is assumed that the auxiliary variable $\Phi$ is constituted of $U(k)$ and $G_j(k)$, $U(k)$ is a positive-definite Hermitian matrix, and $G_j(k)$ satisfies expression (293).

$$\sum_{j=1}^{J} G_j(k) = E \tag{293}$$

At the step of maximizing the auxiliary function $L_1^-(\Psi, \Phi)$ for the auxiliary variable $\Phi$ to update $\Phi$, $U(k)$ and $G_j(k)$ are updated by expression (294) and expression (295) based on the estimation value ^$v_j(k)$ of the variance parameter $v_j(k)$ and the estimation value ^$R_j$ of the spatial covariance matrix $R_j$. $U(k)$ is nothing but a covariance matrix of the observation signal vector $y(k)$, so that $U(k)$ is referred to as an observation covariance matrix.

$$U(k) \leftarrow \sum_{j=1}^{J} \hat{v}_j(k)\hat{R}_j \tag{294}$$

$$G_j(k) \leftarrow \hat{v}_j(k)\hat{R}_j\left(\sum_{l=1}^{J} \hat{v}_l(k)\hat{R}_l\right)^{-1} \tag{295}$$

At the step of updating the parameter $\Psi$ so that the auxiliary function $L_1^-(\Psi, \Phi)$ is not reduced, the estimation value ^$v_j(k)$ of the variance parameter $v_j(k)$ and the estimation value ^$R_j$ of the spatial covariance matrix $R_j$ are updated by the following expression (296) and expression (297) based on the auxiliary variable that is updated as described above.

$$\hat{v}_j(k) \leftarrow \sqrt{\frac{tr(G_j(k)y(k)y(k)^H G_j(k)^H \hat{R}_j^{-1})}{tr(U(k)^{-1}\hat{R}_j)}} \tag{296}$$

$$\hat{R}_j \leftarrow C_j^{-1} \# D_j \tag{297}$$

In this case, $A\#B$ is a geometric mean of A and B defined by expression (298).

$$A\#B = B^{1/2}(B^{-1/2}AB^{-1/2})^{1/2}B^{1/2} \tag{298}$$

The matrix $C_j$ and the matrix $D_j$ are calculated by expression (299) and expression (300), respectively.

$$C_j \leftarrow \sum_{k=1}^{K} \hat{v}_j(k) U(k)^{-1} \tag{299}$$

$$D_j \leftarrow \sum_{k=1}^{K} \frac{1}{\hat{v}_j(k)} G_j(k) y(k) y(k)^H G_j(k)^H \tag{300}$$

Update expressions of expression (294) to expression (300) can be derived similarly to reference document 3 and reference document 4. Additionally, by eliminating the auxiliary variable $G_j(k)$ by substitution, an update rule in which the auxiliary variable $G_j(k)$ does not appear can be derived. The update rule (one time of iteration) in this case is represented by the following expression (301) to expression (305). Clearly, in a case of J=2, update based on expression (301) to expression (305) is equivalent to the update based on expression (156) to expression (159).

$$U(k) \leftarrow \sum_{j=1}^{J} \hat{v}_j(k)\hat{R}_j \tag{301}$$

$$\hat{v}_j(k) \leftarrow v_j(k)\sqrt{\frac{tr(U(k)^{-1}y(k)y(k)^H U(k)^{-1}\hat{R}_j)}{tr(U(k)^{-1}\hat{R}_j)}} \tag{302}$$

$$C_j \leftarrow \sum_{k=1}^{K} \hat{v}_j(k) U(k)^{-1} \tag{303}$$

$$D_j \leftarrow \hat{R}_j\left[\sum_{k=1}^{K} \hat{v}_j(k) U(k)^{-1} y(k) y(k)^H U(k)^{-1}\right] \hat{R}_j \tag{304}$$

$$\hat{R}_j \leftarrow C_j^{-1} \# D_j \tag{305}$$

However, in the method described above, the inverse matrix calculation $U(k)^{-1}$ included in expression (302) to expression (304) is requested to be performed for each sample point. Thus, the method described above requests a huge amount of calculation.

On the other hand, in the sixth embodiment, similarly to the fifth embodiment, by performing the inverse matrix calculation $U(k)^{-1}$ to result in an inverse matrix calculation with respect to a diagonal matrix that can be calculated with a small calculation amount based on simultaneous decorrelation of the J source signal components $x_1(k), \ldots, x_J(k)$, signal separation with a small calculation amount is implemented. Specifically, in the sixth embodiment, similarly to the fifth embodiment, under the constraint condition that J spatial covariance matrices are represented in the forms of expression (197) to expression (199), maximum likelihood estimation of the simultaneous decorrelation matrix P and the spatial covariance matrices $\Lambda_1, \ldots, \Lambda_J$ subjected to simultaneous decorrelation is performed. This maximum likelihood estimation is formulated as the optimization problem of expression (200). In the sixth embodiment, the maximum likelihood estimation described above is implemented based on the auxiliary function method. In this method, by applying one time of iteration in the auxiliary function method, a step of updating the estimation value $\hat{v}_j(k)$ of the variance parameter $v_j(k)$ and the estimation value $\hat{\Lambda}_j$ of the spatial covariance matrix $\Lambda_j$ subjected to simultaneous decorrelation, and a step of updating the estimation value $\hat{P}$ of the simultaneous decorrelation matrix P are alternately iterated.

The step of updating the estimation value $\hat{v}_j(k)$ of the variance parameter $v_j(k)$ and the estimation value $\hat{\Lambda}_j$ of the spatial covariance matrix $\Lambda_j$ subjected to simultaneous decorrelation on the basis of the auxiliary function method is based on the auxiliary function $L_2^-(\Theta, \Phi)$ of expression (306).

$$L_2^-(\Theta, \Phi) \triangleq \qquad (306)$$

$$\sum_{k=1}^{K} \left[ \ln \det U(k) + \sum_{j=1}^{J} tr(v_j(k)(P^{-1})^H \Lambda_j P^{-1} U(k)^{-1}) + \sum_{j=1}^{J} tr\{y(k) \right.$$

$$\left. y(k)^H G_j(k)^H (v_j(k)(P^{-1})^H \Lambda_j P^{-1})^{-1} G_j(k)\} \right] + \text{constant}$$

In this case, the "constant" on the right side is a constant independent of the parameter $\Theta$ and the auxiliary variable $\Phi$.

Similarly to the above process, by eliminating the auxiliary variable $G_j(k)$ by substitution, the update rule is given by the following expression (307) to expression (311). In this case, D in italic on the right side of expression (310) is an operator for replacing a nondiagonal component of the matrix with 0.

$$U(k) \leftarrow \sum_{j=1}^{J} \hat{v}_j(k)(\hat{P}^{-1})^H \hat{\Lambda}_j \hat{P}^{-1} \qquad (307)$$

$$\hat{v}_j(k) \leftarrow \hat{v}_j(k) \sqrt{\frac{tr(U(k)^{-1} y(k) y(k)^H U(k)^{-1} (\hat{P}^{-1})^H \hat{\Lambda}_j \hat{P}^{-1})}{tr(U(k)^{-1} (\hat{P}^{-1})^H \hat{\Lambda}_j \hat{P}^{-1})}} \qquad (308)$$

$$C'_j \leftarrow \sum_{k=1}^{K} \hat{v}_j(k) \hat{P}^{-1} U(k)^{-1} (\hat{P}^{-1})^H \qquad (309)$$

$$D'_j \leftarrow \hat{\Lambda}_j \left[ \sum_{k=1}^{K} \hat{v}_j(k) \mathcal{D}\{\hat{P}^{-1} U(k)^{-1} y(k) y(k)^H U(k)^{-1} (\hat{P}^{-1})^H\} \right] \hat{\Lambda}_j \qquad (310)$$

$$\hat{\Lambda}_j \leftarrow (C'_j)^{-1} \# D'_j \qquad (311)$$

These can be further rewritten to be the following expression (312) to expression (315).

$$y'(k) \leftarrow \hat{P}^H y(k) \qquad (312)$$

$$U'(k) \leftarrow \sum_{j=1}^{J} \hat{v}_j(k) \hat{\Lambda}_j \qquad (313)$$

$$\hat{v}_j(k) \leftarrow \sqrt{\frac{\hat{x}'_j(k)^H \hat{\Lambda}_j^{-1} \hat{x}'_j(k)}{tr(U'(k)^{-1} \hat{\Lambda}_j)}} \qquad (314)$$

$$\hat{\Lambda}_j \leftarrow \left( \sum_{k=1}^{K} \hat{v}_j(k) U'(k)^{-1} \right)^{-\frac{1}{2}} \left( \sum_{k=1}^{K} \frac{1}{\hat{v}_j(k)} \mathcal{D}(\hat{x}'_j(k) \hat{x}'_j(k)^H) \right)^{\frac{1}{2}} \qquad (315)$$

Derivation of the update rule for the estimation value $\hat{P}$ of the simultaneous decorrelation matrix P is the same as that in the second modification of the fifth embodiment, so that description thereof will not be repeated herein. In this way, the update rule in the sixth embodiment is derived.

Modification of Sixth Embodiment

In the sixth embodiment, the estimation value $\hat{P}$ of the simultaneous decorrelation matrix P is updated based on log likelihood, but the estimation value $\hat{P}$ of the simultaneous decorrelation matrix P may be updated based on the auxiliary function. Details are the same as that in the fifth embodiment and the first modification of the fifth embodiment, so that the description thereof will not be repeated herein.

Effect of Sixth Embodiment

According to the sixth embodiment, a calculation amount can be significantly reduced based on simultaneous decorrelation. With the EM algorithm, high signal separation performance is not necessarily implemented in a case in which the number of times of iteration is small. However, according to the sixth embodiment, high signal separation performance can be implemented even in a case in which the number of times of iteration is small based on the auxiliary function method. The sixth embodiment can also be applied to a case in which the number of signals is equal to or larger than 3.

Seventh Embodiment

A seventh embodiment describes a method of enabling signal separation to be performed with a small calculation amount even in a case in which the total number L of the source signals included in the observation signal satisfies $L \geq 3$. Such methods are also described in the fifth embodiment and the sixth embodiment, but the present embodiment describes another implementation method.

In the fifth embodiment and the sixth embodiment, modeling (refer to expression (179)) is performed such that "the observation signal includes all of the L source signals at all time-frequency points", and signal separation is implemented with a small calculation amount even in a case of L≥3 based on simultaneous decorrelation of all of the L source signals (simultaneous diagonalization of spatial covariance matrices of all of the L source signals). This simultaneous decorrelation (simultaneous diagonalization) is based on the constraint condition (refer to expression (197) to expression (199)) that "the spatial covariance matrices of all of the L source signals can be subjected to simultaneous diagonalization with one simultaneous decorrelation matrix". However, this constraint condition is not actually realistic in some cases. In such a case, modeling accuracy may be lowered in the fifth embodiment and the sixth embodiment, and as a result, signal separation performance may be lowered. The fifth embodiment and the sixth embodiment are based on simultaneous decorrelation of all of the L source signals (simultaneous diagonalization of the spatial covariance matrices of all of the L source signals), so that J=L is satisfied assuming that a maximum number of the source signals subjected to simultaneous decorrelation (maximum number of spatial covariance matrices of the source signals subjected to simultaneous diagonalization) is J. Thus, both of J and L are represented as J in the fifth embodiment and the sixth embodiment.

On the other hand, in the seventh embodiment, a sparse property of the source signal in the time-frequency domain is noted. The source signal often has a sparse property in the time-frequency domain, that is, the property that "energy concentrates on a small number of time-frequency components" (for example, refer to reference document 5 "O. Yilmaz and S. Rickard, "Blind separation of speech mixtures via time-frequency masking", IEEE Transactions on Signal Processing, vol. 52, no. 7, pp. 1830-1847, July 2004"). In this case, it can be often assumed that the observation signal does not include all of the L source signals but includes source signals the number of which is smaller than L at each time-frequency point.

Thus, in the seventh embodiment, modeling is performed such that "the observation signal includes only two source signals at each time frequency point", and signal separation is implemented with a small calculation amount even in a case of L≥3 based on simultaneous decorrelation of only two source signals included in the observation signal at each time-frequency point (simultaneous diagonalization of the spatial covariance matrix of only two source signals included in the observation signal at each time-frequency point). Two or less source signals can be subjected to simultaneous decorrelation by one simultaneous decorrelation matrix at all times (the spatial covariance matrices of two or less source signals can be subjected to simultaneous diagonalization by one simultaneous decorrelation matrix at all times) based on the generalized eigenvalue problem, so that an exceptional constraint condition is not requested to be imposed on the spatial covariance matrix of the source signal in the seventh embodiment unlike the fifth embodiment and the sixth embodiment.

Thus, according to the seventh embodiment, modeling can be performed with high accuracy even in a case in which the constraint condition such that "the spatial covariance matrices of all of the L source signals can be subjected to simultaneous diagonalization by one simultaneous decorrelation matrix" is not realistic, and as a result, high signal separation performance can be implemented even in such a case. In the seventh embodiment, the maximum number J of the source signals subjected to simultaneous decorrelation (maximum number J of the spatial covariance matrices of the source signals subjected to simultaneous diagonalization) is represented as J=2.

In the seventh embodiment, it is assumed that I (I is a natural number equal to or larger than 2) observation signals $y_i(t)$ acquired at different positions are input to the signal analysis device in a situation in which L (L is a natural number equal to or larger than 2) source signals are present in a mixed manner.

[Configuration and Processing of Signal Analysis Device]

With reference to FIG. 5 and FIG. 6, a configuration of the signal analysis device and a processing procedure of the signal analysis processing according to the seventh embodiment. FIG. 5 is a diagram illustrating an example of the configuration of the signal analysis device according to the seventh embodiment. FIG. 6 is a flowchart illustrating an example of the processing procedure of the signal analysis processing according to the seventh embodiment.

As illustrated in FIG. 5, the signal analysis device 301 includes the frequency domain conversion unit 310, the frequency domain signal separation unit 320, and the time domain conversion unit 330.

First, the following describes an outline of each unit of the signal analysis device 301. The frequency domain conversion unit 310 receives the input observation signal $y_i(t)$ (Step S40), and calculates the observation signal $y_i(k, f)$ of the time-frequency domain by short-time Fourier transformation and the like (Step S41). In this case, k represents an index of the time frame, and f represents an index of the frequency bin. $y_i(k, f)$ is also represented as $y_i^f(k)$.

The frequency domain signal separation unit 320 performs signal separation for each f (Step S42), and obtains the estimation value $\hat{x}_j(k, f)$ of the source signal component $x_j(k, f)$ of the time-frequency domain. $\hat{x}_j(k, f)$ is also represented as $\hat{x}_j^f(k)$.

The time domain conversion unit 330 calculates the estimation value $\hat{x}_j(t)$ of the source signal component $x_j(t)$ of the time domain by inverse short-time Fourier transformation and the like based on the estimation value $\hat{x}_j(k, f)$ of the source signal component $x_j(k, f)$ of the time-frequency domain, and outputs the estimation value (Step S43).

Figure 19:
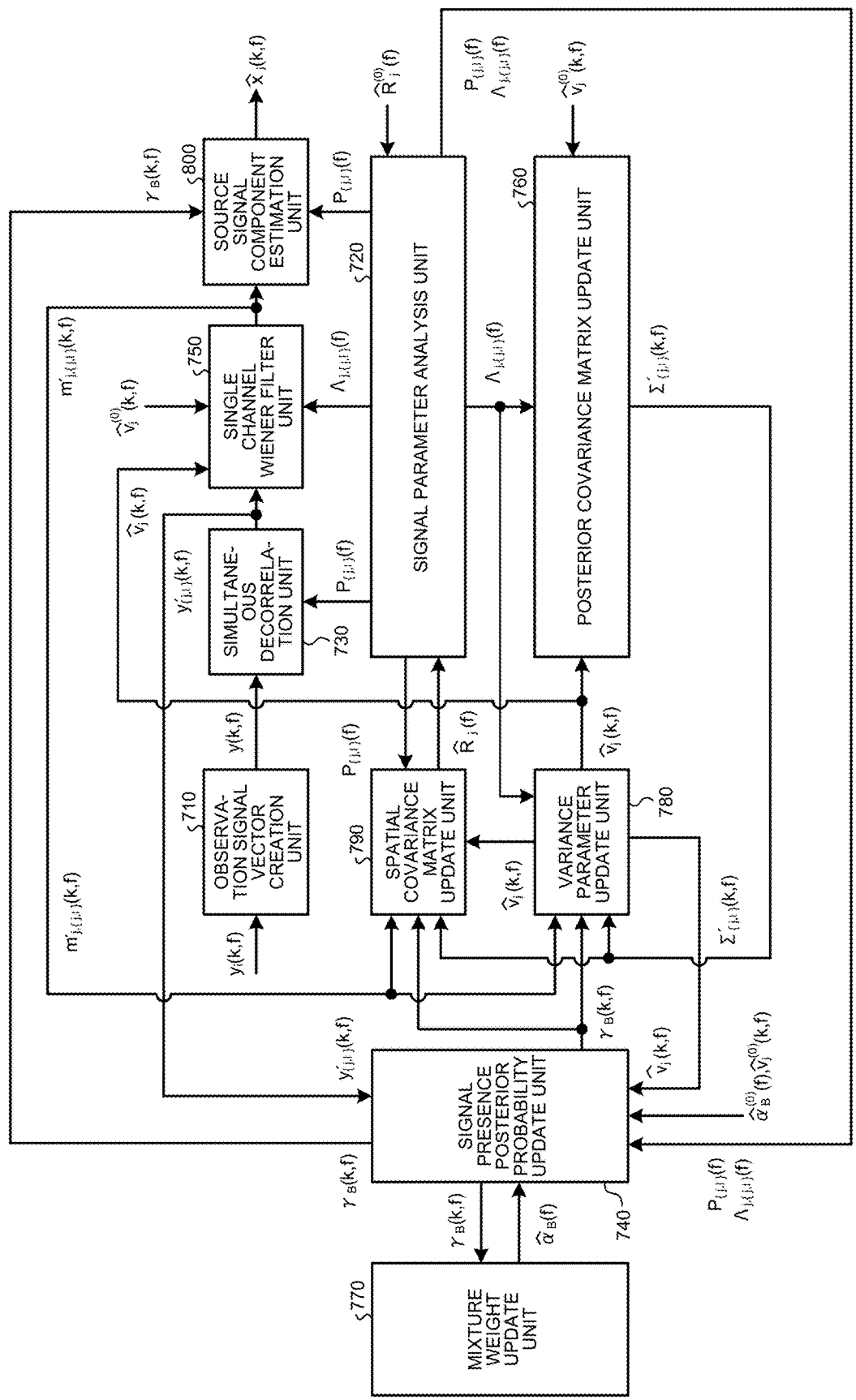
FIG. 19 is a diagram illustrating an example of a configuration of a frequency domain signal separation unit.
Figure 20:
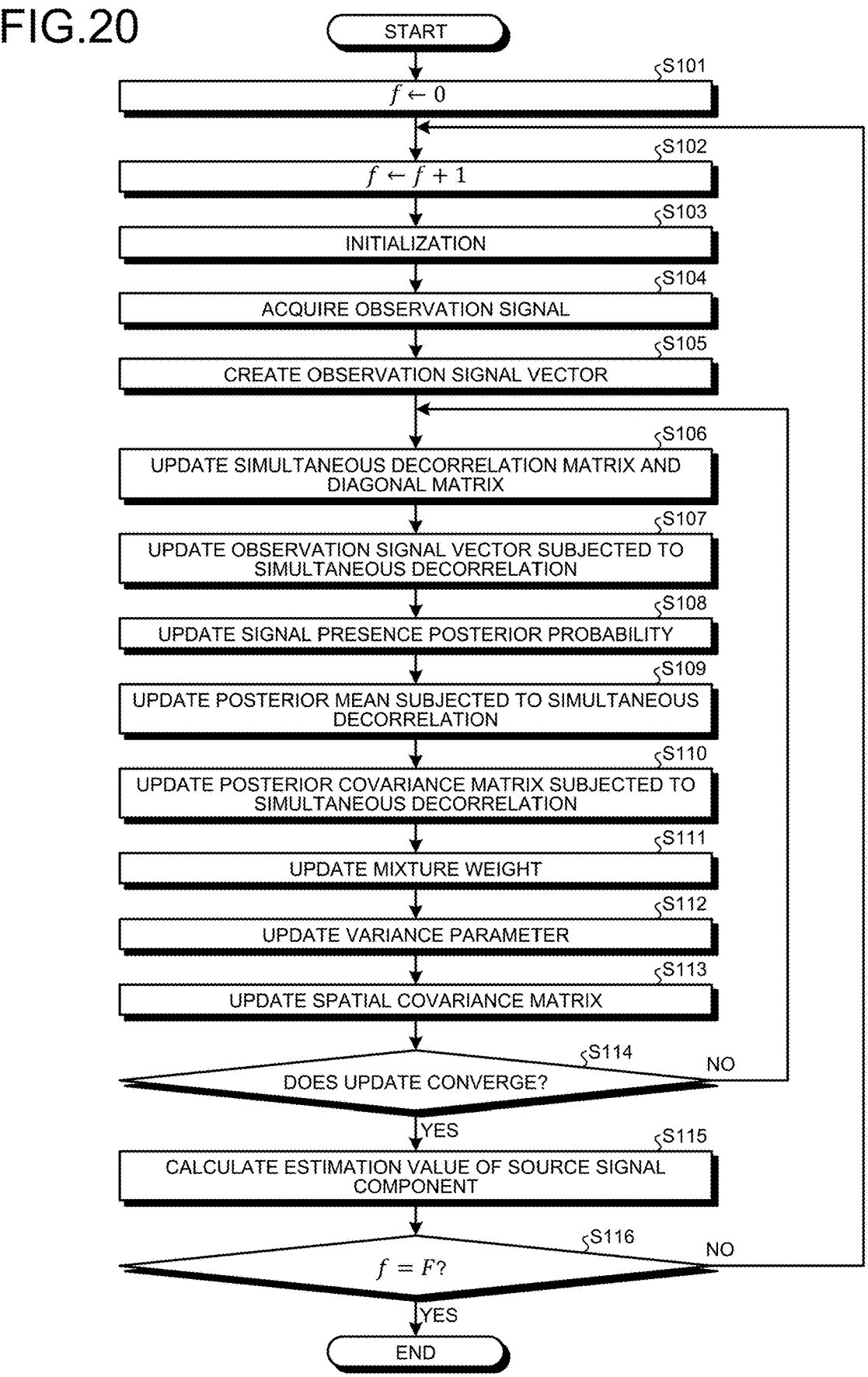
FIG. 20 is a flowchart illustrating an example of a processing procedure of frequency domain signal separation processing.

Next, the following describes the frequency domain signal separation unit 320 in more detail. With reference to FIG. 19 and FIG. 20, the following describes the configuration of the frequency domain signal separation unit 320, and a processing procedure of frequency domain signal separation processing. FIG. 19 is a diagram illustrating an example of the configuration of the frequency domain signal separation unit 320. FIG. 20 is a flowchart illustrating an example of the processing procedure of frequency domain signal separation processing.

As illustrated in FIG. 19, the frequency domain signal separation unit 320 includes an initialization unit (not illustrated), an observation signal vector creation unit 710, a signal parameter analysis unit 720, a simultaneous decorrelation unit 730, a signal presence posterior probability update unit 740, a single channel Wiener filter unit 750, a posterior covariance matrix update unit 760, a mixture weight update unit 770, a variance parameter update unit 780, a spatial covariance matrix update unit 790, a convergence determination unit (not illustrated), and a source signal component estimation unit 800. Processing by each of these units of the frequency domain signal separation unit 320 is performed for each frequency bin.

The frequency domain signal separation unit 320 initializes an index f of the frequency bin by f←0 (Step S101). The frequency domain signal separation unit 320 increments the index f of the frequency bin by 1 by f←f+1 (Step S102).

The initialization unit (not illustrated) sets an initial estimation value $\hat{\alpha}_B^{(0)}(f)$ of a mixture weight $\alpha_B(f)$, an initial estimation value $\hat{v}_j^{(0)}(k, f)$ of a variance parameter $v_j(k, f)$, and an initial estimation value $\hat{R}_j^{(0)}(f)$ of a spatial covariance matrix $R_j(f)$ (Step S103). These values may be set based on a random number, for example.

The observation signal vector creation unit 710 receives the observation signal $y_i(k, f)$ of the time-frequency domain from the frequency domain conversion unit (Step S104), and creates the observation signal vector y(k, f) by expression (316) (Step S105).

$$y(k,f) = [y_1(k,f) \ldots y_I(k,f)]^T \tag{316}$$

The following describes modeling of the observation signal vector y(k, f) in the seventh embodiment. In the present embodiment, it is assumed that the observation signal vector y(k, f) includes only two source signal components at each time-frequency point (k, f). The source signal components included in the observation signal vector y(k, f) at each time-frequency point (k, f) can be represented by a set B(k, f) as the whole index of the source signal components (in this case, it is assumed that an original number #B(k, f) of the set B(k, f) satisfies #B(k, f)≤2). In this case, the observation signal vector y(k, f) is modeled by expression (317) as a sum of source signal components $x_j(k, f)$ with respect to all sources j of B(k, f).

$$y(k, f) = \sum_{j \in B(k,f)} x_j(k, f) \tag{317}$$

For example, in a case in which B(k, f)={1, 3} is established at a certain time-frequency point (k, f), expression (317) will be expression (318) at (k, f).

$$y(k,f) = x_1(k,f) + x_3(k,f) \tag{318}$$

The whole values (set) that can be taken by B(k, f) are represented as a set system H constituted of subsets of set {1, ..., L} that is not empty (that is, subsets of a power set $2^{\{1, \ldots, L\}}$ not including an empty set as a source). For example, in a case in which B(k, f) may be any set B ⊂ {1, ..., L} that is not empty and satisfies #B≤2, H is given by expression (319) and expression (320).

$$\mathcal{H} = \{B \mid B \subset [1, \ldots, L] \text{ and } 1 \leq \#B \leq 2\} \tag{319}$$

$$= \{\{1\}, \ldots, \{L\}, \{1, 2\}, \{1, 3\}, \ldots, \{L-1, L\}\} \tag{320}$$

The set system H of expression (319) and expression (320) is represented as $H_{max}$. In the seventh embodiment, it is assumed that the set system H is given in advance and $H \subset H_{max}$ is satisfied. It is also assumed that at least a set B∈H satisfying #B=2 is present.

That is, it is assumed that a source (set) B of the set system H is present, and #B=2 is satisfied.

The signal parameter analysis unit 720 receives the estimation value $\hat{R}_j(f)$ of the spatial covariance matrix $R_j(f)$ from the spatial covariance matrix update unit 790 (as an exception, the initial estimation value $\hat{R}_j^{(0)}(f)$ of the spatial covariance matrix $R_j(f)$ from the initialization unit is used at the time of the first processing performed by the signal parameter analysis unit 720), and calculates a simultaneous decorrelation matrix $P_{\{j, l\}}(f)$ and a diagonal matrix $\Lambda_{j,\{j, l\}}(f)$ for any two components $x_j(k, f)$ and $x_l(k, f)$ (j and l are any different natural numbers equal to or larger than 1 and equal to or smaller than L) among L source signal components (Step S106). In this case, the simultaneous decorrelation matrix $P_{\{j, l\}}(f)$ is a matrix for performing simultaneous decorrelation on the two source signal components $x_j(k, f)$ and $x_l(k, f)$ (that is, a matrix for performing simultaneous diagonalization on spatial covariance matrices of the two source signal components $x_j(k, f)$ and $x_l(k, f)$), and the set {j, l} as a subscript represents an index of the source signal components $x_j(k, f)$ and $x_l(k, f)$ subjected to simultaneous decorrelation by the simultaneous decorrelation matrix $P_{\{j, l\}}(f)$. The diagonal matrix $\Lambda_{j,\{j, l\}}(f)$ is a diagonal matrix at the time of diagonalizing the spatial covariance matrix of the source signal component $x_j(k, f)$ by the simultaneous decorrelation matrix $P_{\{j, l\}}(f)$.

Specifically, the signal parameter analysis unit 720 performs the following processing. First, by solving the generalized eigenvalue problem $\hat{R}_j(f)p = \lambda \hat{R}_j(f)p$ for the estimation values of the spatial covariance matrices of the two source signal components $x_j(k, f)$ and $x_l(k, f)$ (j and l are any two natural numbers satisfying 1≤j<l≤L) (as an exception, by solving the generalized eigenvalue problem $\hat{R}_j^{(0)}(f)p = \lambda \hat{R}_j^{(0)}(f)p$ for initial estimation values of the spatial covariance matrices of the source signal components at the time of the first processing performed by the signal parameter analysis unit 720), generalized eigenvalues $\lambda_{1,\{j, l\}}(f), \ldots, \lambda_{I,\{j, l\}}(f)$ and generalized eigenvectors $p_{1,\{j, l\}}(f), \ldots, p_{I,\{j, l\}}(f)$ respectively corresponding to the generalized eigenvalues $\lambda_{1,\{j, l\}}(f), \ldots, \lambda_{I,\{j, l\}}(f)$ are obtained. The generalized eigenvectors $p_{1,\{j, l\}}(f), \ldots, p_{I,\{j, l\}}(f)$ are assumed to be taken to satisfy expression (321).

$$p_{i,\{j,l\}}(f)^H \hat{R}_j(f) p_{m,\{j,l\}}(f) = \begin{cases} 1, & i = m \\ 0, & i \neq m \end{cases} \tag{321}$$

At the time of the first processing performed by the signal parameter analysis unit 720, $\hat{R}_j(f)$ is replaced with $\hat{R}_j^{(0)}(f)$ in expression (321). Next, the signal parameter analysis unit 720 transforms a matrix including the generalized eigenvectors $p_{1,\{j, l\}}(f), \ldots, p_{1,\{j, l\}}(f)$ as column vectors to the simultaneous decorrelation matrix $P_{\{j, l\}}(f)$, transforms an I-th order unit matrix to the diagonal matrix $\Lambda_{j,\{j, l\}}(f)$, and transforms a diagonal matrix including the generalized eigenvalues $\lambda_{1,\{j, l\}}(f), \ldots, \lambda_{I,\{j, l\}}(f)$ as diagonal elements to a diagonal matrix $\Lambda_{I,\{j, l\}}(f)$.

The simultaneous decorrelation unit 730 receives the observation signal vector y(k, f) from the observation signal vector creation unit 710 and the simultaneous decorrelation matrix $P_{\{j, l\}}(f)$ from the signal parameter analysis unit 720, and calculates an observation signal vector $y'_{\{j, l\}}(k, f)$ that is subjected to simultaneous decorrelation for the source signal components $x_j(k, f)$ and $x_l(k, f)$ (j and l are any two natural numbers satisfying 1≤j<l≤L) by the following expression (322) (Step S107).

$$y'_{\{j,l\}}(k,f) \leftarrow P_{\{j,l\}}(f)^H y(k,f) \tag{322}$$

In this case, the set {j, l} as a subscript represents indexes of the source signal components $x_j(k, f)$ and $x_l(k, f)$ subjected to simultaneous decorrelation.

The signal presence posterior probability update unit 740 receives the simultaneous decorrelation matrix $P_{\{j, l\}}(f)$ and the diagonal matrix $\Lambda_{j,\{j, l\}}(f)$ from the signal parameter analysis unit 720, the observation signal vector $y'_{\{j, l\}}(k, f)$ subjected to simultaneous decorrelation from the simultaneous decorrelation unit 730, an estimation value $\hat{\alpha}_B(f)$ of the mixture weight $\alpha_B(f)$ from the mixture weight update unit 770 (as an exception, the initial estimation value $\hat{\alpha}_B^{(0)}(f)$ of the mixture weight $\hat{\alpha}_B(f)$ from the initialization unit is used at the time of the first processing performed by the signal presence posterior probability update unit 740), and an estimation value $\hat{v}_j(k, f)$ of the variance parameter $v_j(k, f)$ from the variance parameter update unit 780 (as an exception, the initial estimation value $\hat{v}_j^{(0)}(k, f)$ of the variance parameter $v_j(k, f)$ from the initialization unit is used at the time of the first processing performed by the signal presence posterior probability update unit 740), and updates a signal presence posterior probability $\gamma_B(k, f)$ for each source (set) B of the set system H by expression (323) (Step S108).

$$\gamma_B(k, f) \leftarrow \frac{\dfrac{\hat{\alpha}_B(f)|\det P_B(f)|^2}{\prod_{i=1}^{I}\sum_{j\in B}\hat{v}_j(k, f)[\Lambda_{j,B}(f)]_{ii}}\exp\left(-\sum_{i=1}^{I}\dfrac{|[y'_B(k, f)]_i|^2}{\sum_{j\in B}\hat{v}_j(k, f)[\Lambda_{j,B}(f)]_{ii}}\right)}{\sum_{B'\in\mathcal{H}}\dfrac{\hat{\alpha}_{B'}(f)|\det P_{B'}(f)|^2}{\prod_{i=1}^{I}\sum_{j\in B'}\hat{v}_j(k, f)}\exp\left(-\sum_{i=1}^{I}\dfrac{|[y'_{B'}(k, f)]_i|^2}{\sum_{j\in B'}\hat{v}_j(k, f)[\Lambda_{j,B'}(f)]_{ii}}\right)} \quad (323)$$

$$[\Lambda_{j,B'}(f)]_{ii}$$

Depending on a definition of the set system H, a simultaneous decorrelation matrix $P_{\{j\}}(f)$, a diagonal matrix $\Lambda_{j,\{j\}}(f)$, and an observation signal vector $y'_{\{j\}}(k, f)$ subjected to simultaneous decorrelation with respect to a set (singleton set) $\{j\}$ constituted of only one source may appear in expression (323), and these are defined by expression (324), expression (325), and expression (326) using $P_{\{j, l\}}(f)$, $\Lambda_{j,\{j, l\}}(f)$, and $y'_{\{j, l\}}(k, f)$ with respect to a binary set.

$$P_{\{j\}}(f) \triangleq P_{\{j, \rho(j)\}}(f) \quad (324)$$

$$\Lambda_{j,\{j\}}(f) \triangleq \Lambda_{j,\{j,\rho(j)\}}(f) \quad (325)$$

$$y'_{\{j\}}(k, f) = y'_{\{j,\rho(j)\}}(k, f) \quad (326)$$

In this case, $\rho: \{1, \ldots, L\} \to \{1, \ldots, L\}$ is a predetermined function satisfying "$\rho(j) \neq j$ for all $j \in \{1, \ldots, L\}$". The reason for this definition is as follows.

That is, simultaneous decorrelation of one source signal component $x_j(k, f)$ is nothing but simple decorrelation of $x_j(k, f)$, and this is obviously implemented by simultaneous decorrelation of two source signal components $x_j(k, f)$ and $x_{\rho(j)}(k, f)$.

The single channel Wiener filter unit 750 receives the observation signal vector $y'_{\{j, l\}}(k, f)$ subjected to simultaneous decorrelation from the simultaneous decorrelation unit 730, the diagonal matrix $\Lambda_{j,\{j, l\}}(f)$ from the signal parameter analysis unit 720, and the estimation value $\hat{v}_j(k, f)$ of the variance parameter $v_j(k, f)$ from the variance parameter update unit 780 (as an exception, the initial estimation value $\hat{v}_j^{(0)}(k, f)$ of the variance parameter $v_j(k, f)$ from the initialization unit is used at the time of the first processing performed by the single channel Wiener filter unit 750), and updates a posterior mean $m'_{j,\{j, l\}}(k, f)$ (j and l are any different natural numbers equal to or larger than 1 and equal to or smaller than L) subjected to simultaneous decorrelation by expression (327) (Step S109).

$$[m'_{j,\{j,l\}}(k, f)]_i \leftarrow \frac{\hat{v}_j(k, f)[\Lambda_{j,\{j,l\}}(f)]_{ii}}{\hat{v}_j(k, f)[\Lambda_{j,\{j,l\}}(f)]_{ii} + \hat{v}_l(k, f)[\Lambda_{l,\{j,l\}}(f)]_{ii}}[y'_{\{j,l\}}(k, f)]_i \quad (327)$$

The posterior covariance matrix update unit 760 receives the diagonal matrix $\Lambda_{j,\{j, l\}}(f)$ from the signal parameter analysis unit 720, and the estimation value $\hat{v}_j(k, f)$ of the variance parameter $v_j(k, f)$ from the variance parameter update unit 780 (as an exception, the initial estimation value $\hat{v}_j^{(0)}(k, f)$ of the variance parameter $v_j(k, f)$ from the initialization unit is used at the time of the first processing performed by the posterior covariance matrix update unit 760), and updates a posterior covariance matrix $\Sigma'_{\{j, l\}}(k, f)$ subjected to simultaneous decorrelation (j and l are any two natural numbers satisfying $1 \leq j < l \leq L$) by the following expression (328) (Step S110).

$$[\Sigma'_{\{j,l\}}(k, f)]_{ii} \leftarrow \frac{\hat{v}_j(k, f)\hat{v}_l(k, f)[\Lambda_{l,\{j,l\}}(f)]_{ii}}{\hat{v}_j(k, f) + \hat{v}_l(k, f)[\Lambda_{l,\{j,l\}}(f)]_{ii}} \quad (328)$$

The mixture weight update unit 770 receives the signal presence posterior probability $\gamma_B(k, f)$ from the signal presence posterior probability update unit 740, and updates the estimation value $\hat{\alpha}_B(f)$ of the mixture weight $\alpha_B(f)$ (B is any source (set) of the set system H) by expression (329) (Step S111).

$$\hat{\alpha}_B(f) \leftarrow \frac{1}{K}\sum_{k=1}^{K}\gamma_B(k, f) \quad (329)$$

The variance parameter update unit 780 receives the diagonal matrix $\Lambda_{j,\{j, l\}}(f)$ from the signal parameter analysis unit 720, the signal presence posterior probability $\gamma_B(k, f)$ from the signal presence posterior probability update unit 740, the posterior mean $m'_{j,\{j, l\}}(k, f)$ subjected to simultaneous decorrelation from the single channel Wiener filter unit 750, and the posterior covariance matrix $\Sigma'_{\{j, l\}}(k, f)$ subjected to simultaneous decorrelation from the posterior covariance matrix update unit 760, and updates the estimation value $\hat{v}_j(k, f)$ of the variance parameter $v_j(k, f)$ by expression (330) (Step S112).

$$\hat{v}_j(k, f) \leftarrow \frac{\sum_{B: j\in B\in\mathcal{H}}\gamma_B(k, f)\dfrac{1}{I}\sum_{i=1}^{I}\dfrac{|[m'_{j,B}(k, f)]_i|^2 + [\Sigma'_B(k, f)]_{ii}}{[\Lambda_{j,B}(f)]_{ii}}}{\sum_{B: j\in B\in\mathcal{H}}\gamma_B(k, f)} \quad (330)$$

Depending on the definition of the set system H, a posterior mean $m'_{j,\{j\}}(k, f)$ subjected to simultaneous decorrelation and a posterior covariance matrix $\Sigma'_{\{j\}}(k, f)$ subjected to simultaneous decorrelation with respect to the singleton set $\{j\}$ may appear in expression (330), and these are defined by expression (331) and expression (332).

$$m'_{j,\{j\}}(k, f) \triangleq y'(k, f) \quad (331)$$

$$\Sigma'_{\{j\}}(k, f) \triangleq O \quad (332)$$

The spatial covariance matrix update unit 790 receives the simultaneous decorrelation matrix $P_{\{j, l\}}(f)$ from the signal parameter analysis unit 720, the signal presence posterior probability $\gamma_B(k, f)$ from the signal presence posterior probability update unit 740, the posterior mean $m'_{j,\{j,\eta\}}(k, f)$ subjected to simultaneous decorrelation from the single channel Wiener filter unit 750, the posterior covariance matrix $\Sigma'_{\{j,\eta\}}(k, f)$ subjected to simultaneous decorrelation from the posterior covariance matrix update unit 760, and the estimation value $\hat{v}_j(k, f)$ of the variance parameter $v_j(k, f)$ from the variance parameter update unit 780, and updates the estimation value $\hat{R}_j(f)$ of the spatial covariance matrix $R_j(f)$ by expression (333) (Step S113).

$$\hat{R}_j(f) \leftarrow \frac{\sum_{B:\, j \in B \in \mathcal{H}} (P_B(f)^{-1})^H \left[ \sum_{k=1}^{K} \gamma_B(k, f) \frac{1}{v_j(k, f)} (m'_{j,B}(k, f) m'_{j,B}(k, f)^H + \Sigma'_B(k, f)) \right] P_B(f)^{-1}}{\sum_{B:\, j \in B \in \mathcal{H}} \sum_{k=1}^{K} \gamma_B(k, f)} \quad (333)$$

The convergence determination unit (not illustrated) determines whether the update converges (Step S114). If the convergence determination unit determines that the update does not converge (No at Step S114), the process returns to the processing performed by the signal parameter analysis unit 720, and the processing is continued.

On the other hand, if the convergence determination unit determines that the update converges (Yes at Step S114), the processing is performed by the source signal component estimation unit 800. The source signal component estimation unit 800 receives the simultaneous decorrelation matrix $P_{\{j,\eta\}}(f)$ from the signal parameter analysis unit 720, the signal presence posterior probability $\gamma_B(k, f)$ from the signal presence posterior probability update unit 740, and the posterior mean $m'_{j,\{j,\eta\}}(k, f)$ subjected to simultaneous decorrelation from the single channel Wiener filter unit 750, calculates the estimation value $\hat{x}_j(k, f)$ of the source signal component $x_j(k, f)$ by expression (334) (Step S115), and outputs the estimation value $\hat{x}_j(k, f)$.

$$\hat{x}_j(k, f) \leftarrow \sum_{B:\, j \in B \in \mathcal{H}} \gamma_B(k, f)(P_B(f)^{-1})^H m'_{j,B}(k, f) \quad (334)$$

The frequency domain signal separation unit 320 determines whether f=F is satisfied (Step S116). If it is determined that f=F is not satisfied (No at Step S116), the process returns to the processing of f←f+1 performed by the frequency domain signal separation unit 320, and the processing is continued.

On the other hand, if it is determined that f=F is satisfied (Yes at Step S116), the processing performed by the frequency domain signal separation unit 320 ends.

[Background of Processing Performed by Signal Analysis Device]

Next, the following describes a background of processing performed by the signal analysis device according to the seventh embodiment. In the seventh embodiment, the observation signal vector y(k, f) is modeled by expression (317).

In the seventh embodiment, the source signal component $x_j(k, f)$ is assumed to follow a complex gaussian distribution the mean of which is 0 and the covariance matrix thereof is $S_j(k, f) = v_j(k, f) R_j(f)$. In this case, the probability distribution of the observation signal vector y(k, f) under the condition that B(k, f) takes a value of B∈H is given by the following expression (335).

$$p(y(k, f) \mid B(k, f) = B, \Phi_1) = \mathcal{N}\left(y(k, f); 0, \sum_{j \in B} v_j(k, f) R_j(f)\right) \quad (335)$$

In this case, $\Phi_1$ collectively represents all model parameters. The probability distribution of the set B(k, f) is given by the following expression (336).

$$P(B(k,f) = B \mid \Phi_1) = \alpha_B(f) \quad (336)$$

In this case, $\alpha_B(f)$ satisfies a constraint condition of the following expression (337).

$$\sum_{B \in \mathcal{H}} \alpha_B(f) = 1 \quad (337)$$

Based on expression (338) and expression (337), the probability distribution of the observation signal vector y(k, f) is given by the following expression (338).

$$p(y(k, f) \mid \Phi_1) = \sum_{B \in \mathcal{H}} \alpha_B(f) \mathcal{N}\left(y(k, f); 0, \sum_{j \in B} v_j(k, f) R_j(f)\right) \quad (338)$$

Hereinafter, $\alpha_B(f)$ is referred to as a mixture weight. The parameter $\Phi_1$ is constituted of the mixture weight $\alpha_B(f)$, the variance parameter $v_j(k, f)$, and the spatial covariance matrix $R_j(f)$. The parameter $\Phi_1$ can be estimated by maximizing a likelihood function in the following expression (339).

$$\prod_{k=1}^{K} \prod_{f=1}^{F} p(y(k, f) \mid \Phi_1) \quad (339)$$

Reference document 6 "R. Ikeshita, M. Togami, Y. Kawaguchi, Y. Fujita, and K. Nagamatsu, "Local Gaussian model with source-set constraints in audio source separation", IEEE International Workshop on Machine Learning for Signal Processing, September 2017." discloses a method of estimating the parameter $\Phi_1$ by maximizing the likelihood function in the above expression based on the EM algorithm. In this related art, the parameter $\Phi_1$ is estimated by alternately iterating the E-step and the M-step.

At the E-step, the signal presence posterior probability $\gamma_B(k, f)$, a posterior mean $m_{j, B}(k, f)$, and a posterior covariance matrix $\Sigma_B(k, f)$ are calculated by the following expression (340) to expression (344).

$$\gamma_B(k, f) \leftarrow \frac{\hat{\alpha}_B(f) \mathcal{N}\left(y(k, f); 0, \sum_{j \in B} \hat{v}_j(k, f) \hat{R}_j(f)\right)}{\sum_{B' \in \mathcal{H}} \hat{\alpha}_{B'}(f) \mathcal{N}\left(y(k, f); 0, \sum_{j \in B'} \hat{v}_j(k, f) \hat{R}_j(f)\right)} \, (B \in \mathcal{H}) \quad (340)$$

-continued $$m_{j,\{j\}}(k, f) \leftarrow y(k, f) \ (\{j\} \in \mathcal{H}) \tag{341}$$

$$m_{j,\{j,l\}}(k, f) \leftarrow \\ \hat{v}_j(k, f)\hat{R}_j(f)(\hat{v}_j(k, f)\hat{R}_j(f) + \hat{v}_l(k, f)\hat{R}_l(f))^{-1} y(k, f) \\ (j \neq l, \{j, l\} \in \mathcal{H}) \tag{342}$$

$$\sum_{\{j\}}(k, f) \leftarrow O \ (\{j\} \in \mathcal{H}) \tag{343}$$

$$\sum_{\{j,l\}}(k, f) \leftarrow \\ \hat{v}_j(k, f)\hat{R}_j(f)(\hat{v}_j(k, f)\hat{R}_j(f) + \hat{v}_l(k, f)\hat{R}_l(f))^{-1}(\hat{v}_l(k, f)\hat{R}_l(f)) \\ (j \neq l, \{j, l\} \in \mathcal{H}) \tag{344}$$

In this case, the signal presence posterior probability $\gamma_B(k, f)$ is defined by the following expression (345) as a posterior distribution that is a conditional probability distribution of the set $B(k, f)$ under the condition that the observation signal vector $y(k, f)$ is given.

$$\gamma_B(k,f) \triangleq P(B(k,f)=B|y(k,f);\hat{\Phi}_1)(B \in H) \tag{345}$$

In this case, $\hat{\Phi}_1$ represents a present estimation value of the parameter $\Phi_1$. The posterior mean $m_{j,B}(k, f)$ and the posterior covariance matrix $\Sigma_B(k, f)$ are defined as a mean and a covariance matrix of a posterior distribution (that is indicated to be a complex gaussian distribution) that is a conditional probability distribution of the source signal component $x_j(k, f)$ under the condition that the observation signal vector $y(k, f)$ and the set $B(k, f)$ are given. This posterior distribution is represented by the following expression (346).

$$p(x_j(k,f)|y(k,f),B(k,f)=B;\hat{\Phi}_1)=N(x_j(k,f);m_{j,B}(k,f),\Sigma_B(k,f)) \\ (j \in B \in H) \tag{346}$$

At the M-step, the estimation value $\hat{\alpha}_B(f)$ of the mixture weight $\alpha_B(f)$, the estimation value $\hat{v}_j(k, f)$ of the variance parameter $v_j(k, f)$, and the estimation value $\hat{R}_j(f)$ of the spatial covariance matrix $R_j(f)$ are updated by update rules of the following expression (347) to expression (349).

$$\hat{\alpha}_B(f) \leftarrow \frac{1}{K}\sum_{k=1}^{K} \gamma_B(k, f) \ (B \in \mathcal{H}) \tag{347}$$

$$\hat{v}_j(k, f) \leftarrow \frac{\sum_{B:j \in B \in \mathcal{H}} \gamma_B(k, f)\frac{1}{I}tr\left(m_{j,B}(k, f)m_{j,B}(k, f)^H + \sum_B(k, f)\right)}{\sum_{B:j \in B \in \mathcal{H}} \gamma_B(k, f)} \tag{348}$$

$$\hat{R}_j(f) \leftarrow \frac{\sum_{B:j \in B \in \mathcal{H}}\sum_{k=1}^{K} \gamma_B(k, f)\frac{1}{\hat{v}_j(k, f)}\left(m_{j,B}(k, f)m_{j,B}(k, f)^H + \sum_B(k, f)\right)}{\sum_{B:j \in B \in \mathcal{H}}\sum_{k=1}^{K} \gamma_B(k, f)} \tag{349}$$

However, in this related art, in update of the signal presence posterior probability $\gamma_B(k, f)$ in expression (340), update of the posterior mean $m_{j,B}(k, f)$ in expression (342), and update of the posterior covariance matrix $\Sigma_{\{j, l\}}(k, f)$ in expression (344), determinant calculation, inverse matrix calculation, and matrix multiplication are requested to be performed for each time-frequency point. Specifically, determinant calculation in a form of expression (350) in expression (340), inverse matrix calculation in a form of expression (351) in expression (340), expression (342), and expression (344), and matrix multiplication in a form of expression (352) in expression (344) are requested to be performed for each time-frequency point (k, f).

$$\det(\hat{v}_j(k,f)\hat{R}_j(f)+\hat{v}_l(k,f)\hat{R}_l(f)) \tag{350}$$

$$(\hat{v}_j(k,f)\hat{R}_j(f)+\hat{v}_l(k,f)\hat{R}_l(f))^{-1} \tag{351}$$

$$\hat{v}_j(k,f)\hat{R}_j(f)(\hat{v}_j(k,f)\hat{R}_j(f)+\hat{v}_l(k,f)\hat{R}_l(f))^{-1}(\hat{v}_l(k,f)\hat{R}_l(f)) \tag{352}$$

Each of the determinant calculation, the inverse matrix calculation, and the matrix multiplication is a matrix arithmetic operation that requests a calculation amount of an order of $O(I^3)$, and the number of time-frequency points is typically very large, so that a huge amount of calculation is requested in this related art.

Assuming that the covariance matrices $\hat{v}_j(k, f)\hat{R}_j(f)$ and $\hat{v}_l(k, f)\hat{R}_l(f)$ in expression (350) to expression (352) are both diagonal matrices, determinant calculation, inverse matrix calculation, and matrix multiplication in expression (350) to expression (352) result in a simple scalar arithmetic operation for a diagonal element, so that calculation can be performed with a small calculation amount. However, different elements of the source signal component (vector) are typically correlated with each other, so that the covariance matrices $\hat{v}_j(k, f)\hat{R}_j(f)$ and $\hat{v}_l(k, f)\hat{R}_l(f)$ are not diagonal matrices.

Thus, in the seventh embodiment, it is considered that the two spatial covariance matrices $\hat{R}_j(f)$ and $\hat{R}_l(f)$ are subjected to simultaneous diagonalization based on the generalized eigenvalue problem. It is assumed that $\lambda_{1,\{j, l\}}(f), \ldots, \lambda_{I,\{j, l\}}(f)$ are generalized eigenvalues of the generalized eigenvalue problem (expression (353)) for the spatial covariance matrices $\hat{R}_j(f)$ and $\hat{R}_l(f)$, and $p_{1,\{j, l\}}(f), \ldots, p_{I,\{j, l\}}(f)$ are generalized eigenvectors corresponding to the generalized eigenvalues $\lambda_{1,\{j, l\}}(f), \ldots, \lambda_{I,\{j, l\}}(f)$.

$$\hat{R}_l(f)p=\lambda\hat{R}_j(f)p \tag{353}$$

In this case, the generalized eigenvectors $p_{1,\{j, l\}}(f), \ldots, p_{I,\{j, l\}}(f)$ are taken to satisfy the following expression (354).

$$p_{i,\{j,l\}}(f)^H \hat{R}_j(f)p_{m,\{j,l\}}(f) = \begin{cases} 1, & i = m \\ 0, & i \neq m \end{cases} \tag{354}$$

Assuming that $p_{\{j, l\}}(f)$ is a matrix including the generalized eigenvectors $p_{1,\{j, l\}}(f), \ldots, p_{I,\{j, l\}}(f)$ as column vectors, and $\Lambda_{\{j, l\}}(f)$ is a diagonal matrix including the generalized eigenvalues $\lambda_{1,\{j, l\}}(f), \ldots, \lambda_{I,\{j, l\}}(f)$ as diagonal elements, the following expression (355) is established.

$$\begin{cases} P_{\{j,l\}}(f)^H \hat{R}_j(f)P_{\{j,l\}}(f) = I \\ P_{\{j,l\}}(f)^H \hat{R}_l(f)P_{\{j,l\}}(f) = \Lambda_{\{j,l\}}(f) \end{cases} \tag{355}$$

Expression (355) indicates that the matrix $P_{\{j, l\}}(f)$ simultaneously diagonalizes the two spatial covariance matrices $\hat{R}_j(f)$ and $\hat{R}_l(f)$ (simultaneously decorrelates the two source signal components $x_j(k, f)$ and $x_l(k, f)$). Thus, the matrix $P_{\{j, l\}}(f)$ is referred to as a simultaneous decorrelation matrix.

By solving expression (355) for the spatial covariance matrices $\hat{R}_j(f)$ and $\hat{R}_l(f)$, and substituting expression (355) for expression (340), expression (342), and expression (344) to be defined as expression (356) to expression (358) (j and l are any different integral numbers equal to or larger than 1 and equal to or smaller than L), expression (362), expression (363), and expression (364) (described later) are obtained.

$$m'_{j,\{j,l\}}(k,f) \triangleq P_{\{j,l\}}(f)^H m_{j,\{j,l\}}(k,f) \quad (356)$$

$$\Sigma'_{\{j,l\}}(k,f) \triangleq P_{\{j,l\}}(f)^H \Sigma_{\{j,l\}}(k,f) P_{\{j,l\}}(f) \quad (357)$$

$$y'_{\{j,l\}}(k,f) \triangleq P_{\{j,l\}}(f)^H y(k,f) \quad (358)$$

By solving expression (356) and expression (357) for the posterior mean $m_{j,\{j,l\}}(k, f)$ and the posterior covariance matrix $\Sigma_{\{j,l\}}(k, f)$ to be substituted for expression (348) and expression (349), expression (366) and expression (368) are obtained.

In this way, the update rules for the signal analysis device according to the seventh embodiment are derived.

In this way, in the signal analysis device according to the seventh embodiment, the signal parameter analysis unit 720 obtains the simultaneous decorrelation matrix $P_{\{j,l\}}(f)$ as a matrix including I (I is an integral number equal to or larger than 2) different generalized eigenvectors $p_{1,\{j,l\}}(f), \ldots, p_{I,\{j,l\}}(f)$ as column vectors satisfying $p_{i,\{j,l\}}(f)^H \hat{R}_j(f) p_{m,\{j,l\}}(f)=0$ (i and m are any integral numbers equal to or larger than 1 and equal to or smaller than I different from each other) for the spatial covariance matrices $\hat{R}_j(f)$ and $\hat{R}_l(f)$ for modeling spatial characteristics of two source signals that are present in a mixed manner, or Hermitian transposition $P_{\{j,l\}}(f)^H$ thereof, as a parameter for decorrelating components corresponding to the two source signals for the observation signal vectors based on the observation signals acquired at I positions.

Example of Seventh Embodiment

The present example describes a specific example of the set system H. In the present example, the set system H is assumed to be expression (359).

$$\mathcal{H} = \{\{1,2\},\{1,3\},\ldots,\{1,J\}\} \quad (359)$$

This means that the observation signal vector at each time-frequency point always includes the first source signal component, and includes just one of the second to the j-th source signal components. For example, the first source signal component models a source signal component that is not sparse such as background noise, and the second to the J-th source signal components model a source signal component that is sparse such as a voice.

Expression (360) to expression (370) represent update expressions of processing performed by the signal parameter analysis unit 720, the simultaneous decorrelation unit 730, the signal presence posterior probability update unit 740, the single channel Wiener filter unit 750, the posterior covariance matrix update unit 760, the mixture weight update unit 770, the variance parameter update unit 780, the spatial covariance matrix update unit 790, and the source signal component estimation unit 800. In the seventh embodiment, sets $\{1, 2\}, \{1, 3\}, \ldots, \{1, J\}$ as sources of H correspond to indexes 2, 3, ..., J on a one-to-one basis, so that the following notation is used for simplification. That is, $y'_{\{1,j\}}(k, f)$ is written as $y'_j(k, f)$, $P_{\{1,j\}}(f)$ is written as $P_j(f)$, $\gamma_{\{1,j\}}(k, f)$ is written as $\gamma_j(k, f)$, $\hat{\alpha}_{\{1,j\}}(f)$ is written as $\hat{\alpha}_j(f)$, $\Lambda_{l,\{1,j\}}(f)$ is written as $\Lambda_{lj}(f)$, $m'_{l,\{1,j\}}(k, f)$ is written as $m'_{lj}(k, f)$, and $\Sigma'_{\{1,j\}}(k, f)$ is written as $\Sigma'_j(k, f)$. In this case, it is assumed that $j=2, \ldots, J$, and $l=1, j$ (the same applies to update the expressions described below). In the present example, the signal parameter analysis unit 720 is not requested to calculate the simultaneous decorrelation matrix $P\{j, l\}(f)$ and the diagonal matrix $\Lambda j,\{j, l\}(f)$ for any two $xj(k, f)$ and $xl(k, f)$ of the L source signal components (j and l are any different natural numbers equal to or larger than 1 and equal to or smaller than L). As represented by expression (360), it is sufficient that the signal parameter analysis unit 720 calculates the simultaneous decorrelation matrix $P\{1, j\}(f)$ (that is, $Pj(f)$) and the diagonal matrix $\Lambda l,\{1, j\}(f)$ (that is, $\Lambda lj(f)$) for $x1(k, f)$ and $xj(k, f)$ (j is any natural number equal to or larger than 2 and equal to or smaller than L).

By solving generalized eigenvalue problem $\hat{R}_j(f)p = \lambda \hat{R}_1(f)p$, simultaneous decorrelation matrix $P_j(f)$ and diagonal matrix $\Lambda_{lj}(f)$ are obtained.

(360)

$$y'_j(k, f) \leftarrow P_j(f)^H y(k, f) \quad (361)$$

$$\gamma_j(k, f) \leftarrow \frac{\dfrac{\hat{\alpha}_j(f)}{\prod_{i=1}^{I}(\hat{v}_1(k, f) + \hat{v}_j(k, f)[\Lambda_{j,j}(f)]_{ii})} \exp\left(-\sum_{i=1}^{I} \dfrac{|[y'_j(k, f)]_i|^2}{\hat{v}_1(k, f) + \hat{v}_j(k, f)[\Lambda_{j,j}(f)]_{ii}}\right)}{\sum_{j'=2}^{L} \dfrac{\hat{\alpha}_{j'}(f)}{\prod_{i=1}^{I}(\hat{v}_1(k, f) + \hat{v}_{j'}(k, f)[\Lambda_{j',j'}(f)]_{ii})} \exp\left(-\sum_{i=1}^{I} \dfrac{|[y'_{j'}(k, f)]_i|^2}{\hat{v}_1(k, f) + \hat{v}_{j'}(k, f)[\Lambda_{j',j'}(f)]_{ii}}\right)} \quad (362)$$

$$[m'_{l,j}(k, f)]_i \leftarrow \frac{\hat{v}_l(k, f)[\Lambda_{lj}(f)]_{ii}}{\hat{v}_1(k, f) + \hat{v}_j(k, f)[\Lambda_{jj}(f)]_{ii}}[y'_j(k, f)]_i \quad (363)$$

$$\left[\Sigma'_j(k, f)\right]_{ii} \leftarrow \frac{\hat{v}_1(k, f)\hat{v}_j(k, f)[\Lambda_{jj}(f)]_{ii}}{\hat{v}_1(k, f) + \hat{v}_j(k, f)[\Lambda_{jj}(f)]_{ii}} \quad (364)$$

$$\hat{\alpha}_j(f) \leftarrow \frac{1}{K}\sum_{k=1}^{K}\gamma_j(k, f) \quad (365)$$

$$\hat{v}_j(k, f) \leftarrow \frac{1}{I}\sum_{i=1}^{I}\frac{|[m'_{jj}(k, f)]_i|^2 + \left[\Sigma'_j(k, f)\right]_{ii}}{[\Lambda_{jj}(f)]_{ii}} \quad (366)$$

$$\hat{v}_1(k, f) \leftarrow \sum_{j=2}^{L}\gamma_j(k, f)\frac{1}{I}\sum_{i=1}^{I}\left(|[m'_{1j}(k, f)]_i|^2 + \left[\Sigma'_j(k, f)\right]_{ii}\right) \quad (367)$$

$$\hat{R}_j(f) \leftarrow \frac{(P_j(f)^{-1})^H\left[\begin{array}{c}\sum_{k=1}^{K}\gamma_j(k, f)\dfrac{1}{\hat{v}_j(k, f)}\\ \left(m'_{jj}(k, f)m'_{jj}(k, f)^H + \Sigma'_j(k, f)\right)\end{array}\right]P_j(f)^{-1}}{\sum_{k=1}^{K}\gamma_j(k, f)} \quad (368)$$

-continued $$\hat{R}_l(f) \leftarrow \sum_{j=2}^{J}(P_j(f)^{-1})^H\left[\frac{1}{K}\sum_{k=1}^{K}\gamma_j(k,f)\frac{1}{\hat{v}_l(k,f)}\right.$$
$$\left.\left(m'_{ij}(k,f)m'_{ij}(k,f)^H+\sum_{j}{}'(k,f)\right)\right]P_j(f)^{-1} \quad (369)$$

$$\hat{x}_j(k,f) \leftarrow \gamma_j(k,f)(P_j(f)^{-1})^H m'_{jj}(k,f) \quad (370)$$

Eighth Embodiment

Figure 21:
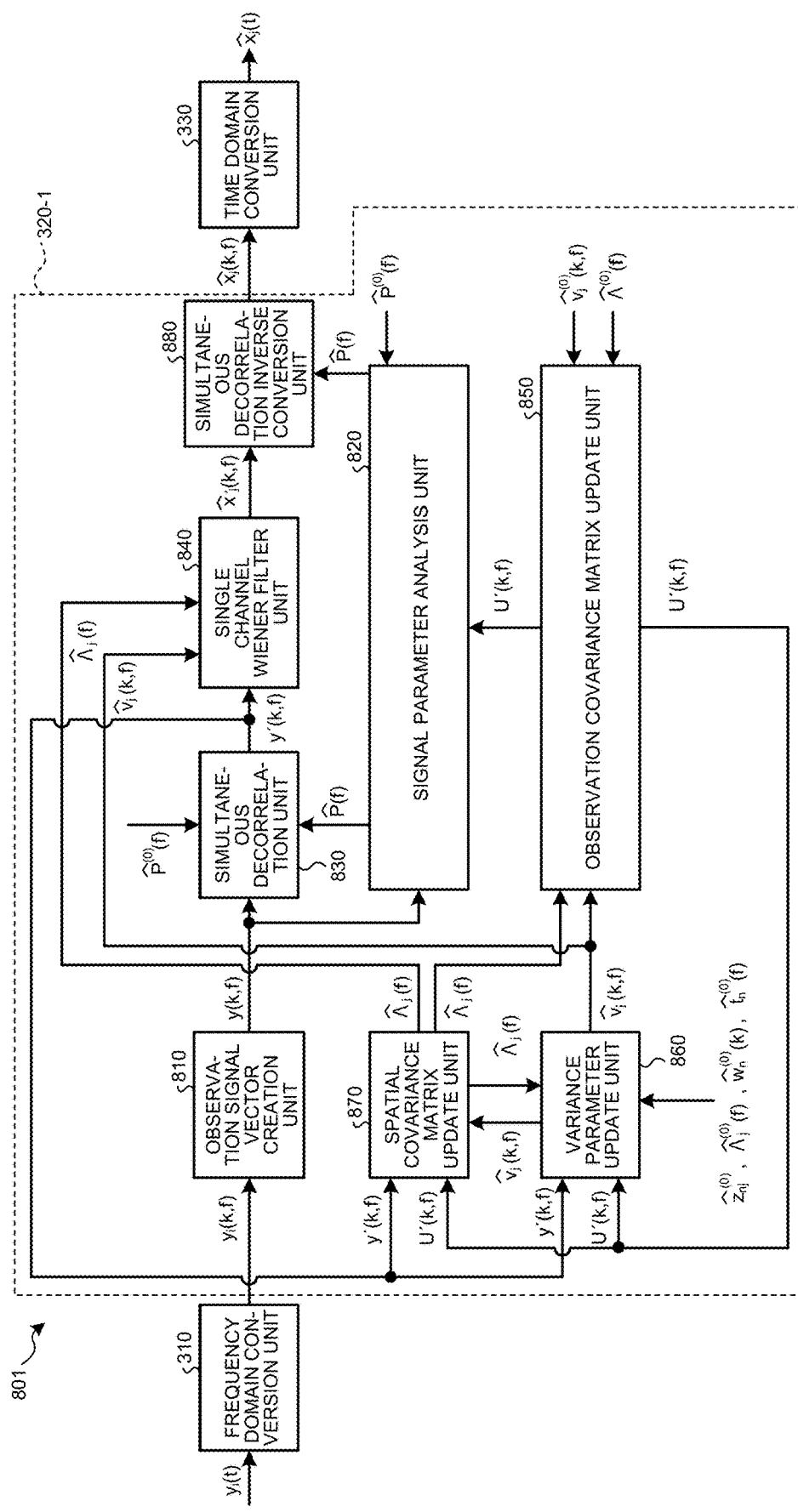
FIG. 21 is a diagram illustrating an example of a configuration of a signal analysis device according to an eighth embodiment.
Figure 22:
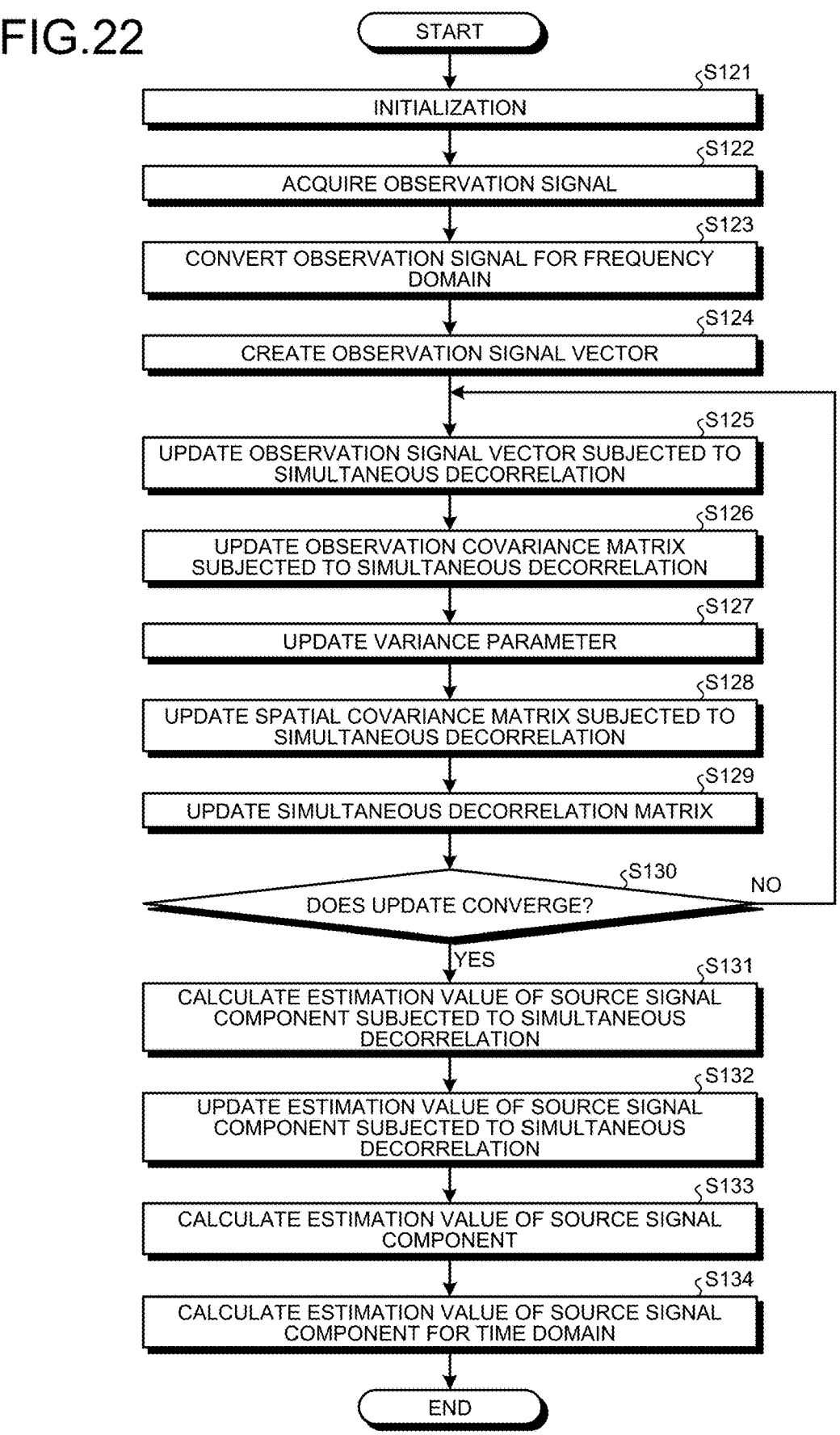
FIG. 22 is a flowchart illustrating an example of a processing procedure of signal analysis processing according to the eighth embodiment.

An eighth embodiment describes another configuration example of the signal analysis device according to the third embodiment. FIG. 21 is a diagram illustrating an example of a configuration of the signal analysis device according to the eighth embodiment. FIG. 22 is a flowchart illustrating an example of a processing procedure of signal analysis processing according to the eighth embodiment. As illustrated in FIG. 21, a signal analysis device 801 according to the eighth embodiment includes the frequency domain conversion unit 310, a frequency domain signal separation unit 320-1, and the time domain conversion unit 330.

In the signal analysis device 801, the frequency domain signal separation unit 320-1 calculates estimation values of a spectral basis $t_n(f)$, an activation basis $w_n(k)$, a partition function $z_{nj}$, a spatial covariance matrix $\Lambda_j(f)$ subjected to simultaneous decorrelation, and a simultaneous decorrelation matrix P(f).

The spectral basis $t_n(f)$, the activation basis $w_n(k)$, partition function $z_{nj}$ are parameters for modeling the variance parameter $v_j(k, f)$. The variance parameter $v_j(k, f)$ is modeled by expression (371) using these parameters.

$$v_j(k,f) = \sum_{n=1}^{N} z_{nj}t_n(f)w_n(k) \quad (371)$$

In this case, n is an index of the spectral basis and the activation basis. N is the number of spectral bases and activation bases.

The frequency domain signal separation unit 320-1 includes an initialization unit (not illustrated), an observation signal vector creation unit 810, a simultaneous decorrelation unit 830, a single channel Wiener filter unit 840, an observation covariance matrix update unit 850, a variance parameter update unit 860, a spatial covariance matrix update unit 870, a signal parameter analysis unit 820, a convergence determination unit (not illustrated), and a simultaneous decorrelation inverse conversion unit 880.

[Configuration and Processing of Signal Analysis Device]

With reference to FIG. 21 and FIG. 22, the following describes a configuration of the signal analysis device and a processing procedure of the signal analysis processing according to the eighth embodiment.

The initialization unit (not illustrated) performs initialization for calculating initial estimation values of the variance parameter $v_j(k, f)$, the spectral basis $t_n(f)$, the activation basis $w_n(k)$, the partition function $z_{nj}$, the spatial covariance matrix $\Lambda_j(f)$ subjected to simultaneous decorrelation, and the simultaneous decorrelation matrix P(f) (Step S121). The initial estimation value is represented as $\hat{v}_j^{(0)}(k, f)$ and the like by adding a superscript of (0).

The frequency domain conversion unit 310 acquires the observation signal (Step S122), and converts the observation signal for a frequency domain (Step S123) to calculate the observation signal $y_i(k, f)$ of the time-frequency domain.

The observation signal vector creation unit 810 creates the observation signal vector y(k, f) in the same way as the seventh embodiment (Step S124).

The simultaneous decorrelation unit 830 calculates the observation signal vector y'(k, f) subjected to simultaneous decorrelation by expression (372) to be updated (Step S125).

$$y'(k,f) \leftarrow \hat{P}(f)^H y(k,f) \quad (372)$$

In this case, $\hat{P}(f)$ is an estimation value of the simultaneous decorrelation matrix from the signal parameter analysis unit 820.

The observation covariance matrix update unit 850 updates an observation covariance matrix U'(k, f) subjected to simultaneous decorrelation by expression (373) (Step S126).

$$U'(k,f) \leftarrow \sum_{j=1}^{J}\hat{v}_j(k,f)\hat{\Lambda}_j(f) \quad (373)$$

In this case, $\hat{v}_j(k, f)$ is an estimation value of the variance parameter from the variance parameter update unit 860. $\hat{\Lambda}_j(f)$ is an estimation value of the spatial covariance matrix subjected to simultaneous decorrelation from the spatial covariance matrix update unit 870.

The variance parameter update unit 860 updates the estimation value $\hat{v}_j(k, f)$ of the variance parameter using the following procedure (Step S127).

First, the variance parameter update unit 860 updates a spatial covariance matrix $\Sigma_n(f)$ subjected to simultaneous decorrelation corresponding to the n-th basis by expression (374). In expression (374), $\hat{z}_{nj}$ is an estimation value of the partition function.

$$\sum_n(f) \leftarrow \sum_{j=1}^{J}\hat{z}_{nj}\hat{\Lambda}_j(f) \quad (374)$$

Next, the variance parameter update unit updates an estimation value $\hat{t}_n(f)$ of the spectral basis by expression (375). In expression (375), $\hat{w}_n(k)$ is an estimation value of the activation basis.

$$\hat{t}_n(f) \leftarrow \hat{t}_n(f)\sqrt{\frac{\sum_{k=1}^{K}\hat{w}_n(k)tr\left(\begin{array}{c}U'(k,f)^{-1}y'(k,f)\\y'(k,f)^HU'(k,f)^{-1}\sum_n(f)\end{array}\right)}{\sum_{k=1}^{K}\hat{w}_n(k)tr\left(U'(k,f)^{-1}\sum_n(f)\right)}} \quad (375)$$

Next, the variance parameter update unit 860 updates the estimation value $\hat{w}_n(k)$ of the activation basis by expression (376).

$$\hat{w}_n(k) \leftarrow \hat{w}_n(k) \sqrt{\frac{\sum_{f=1}^{F} \hat{t}_n(f) tr\left(\frac{U'(k,f)^{-1}y'(k,f)}{y'(k,f)^H U'(k,f)^{-1} \sum_n(f)}\right)}{\sum_{f=1}^{F} \hat{t}_n(f) tr\left(U'(k,f)^{-1} \sum_n(f)\right)}} \quad (376)$$

Next, the variance parameter update unit 860 updates the estimation value $\hat{z}_{nj}$ of the partition function by expression (377).

$$\hat{z}_{nj} \leftarrow \hat{z}_{nj} \sqrt{\frac{\sum_{k=1}^{K}\sum_{f=1}^{F} \hat{t}_n(f)\hat{w}_n(k) tr \begin{pmatrix} (U'(k,f)^{-1}y'(k,f) \\ y'(k,f)^H U'(k,f)^{-1}\hat{\Lambda}_j(f)) \end{pmatrix}}{\sum_{k=1}^{K}\sum_{f=1}^{F} \hat{t}_n(f)\hat{w}_n(k) tr(U'(k,f)^{-1}\hat{\Lambda}_j(f))}} \quad (377)$$

Finally, the variance parameter update unit 860 updates the estimation value $\hat{v}_j(k, f)$ of the variance parameter by expression (378).

$$\hat{v}_j(k,f) \leftarrow \sum_{n=1}^{N} \hat{z}_{nj}\hat{t}_n(f)\hat{w}_n(k) \quad (378)$$

The spatial covariance matrix update unit 870 updates the estimation value $\hat{\Lambda}_j(f)$ of the spatial covariance matrix subjected to simultaneous decorrelation by expression (379) (Step S128).

$$\hat{\Lambda}_j(f) \leftarrow A_j(f)^{-1} \# B_j(f) \quad (379)$$

In this case, # is a geometric mean of a matrix, and $A_j(f)$ and $B_j(f)$ are matrices calculated by expression (380) and expression (381).

$$A_j(f) \leftarrow \sum_{j=1}^{J} \hat{v}_j(k,f) U'(k,f)^{-1} \quad (380)$$

$$B_j(f) \leftarrow \hat{\Lambda}_j(f) \left(\sum_{j=1}^{J} \hat{v}_j(k,f) U'(k,f)^{-1} \mathcal{D}(y'(k,f)y'(k,f)^H) U'(k,f)^{-1}\right) \hat{\Lambda}_j(f) \quad (381)$$

The signal parameter analysis unit 820 updates the estimation value $\hat{P}(f)$ of the simultaneous decorrelation matrix by expression (382) (Step S129).

$$[\hat{P}(f)]_i \leftarrow \left(\frac{1}{K}\sum_{k=1}^{K} \frac{1}{[U'(k,f)]_{ii}} y(k,f)y(k,f)^H\right)^{-1} [\hat{P}(f)^H]_i \quad (382)$$

The convergence determination unit (not illustrated) determines whether the update converges (Step S130). If the convergence determination unit determines that the update does not converge (No at Step S130), the process returns to the processing performed by the simultaneous decorrelation unit 830 (Step S125), and the processing is continued.

On the other hand, if the convergence determination unit determines that the update converges (Yes at Step S130), the single channel Wiener filter unit 840 calculates an estimation value $\hat{x}'_j(k, f)$ of the source signal component subjected to simultaneous decorrelation by expression (383) (Step S131).

$$[\hat{x}'_j(k,f)]_i \leftarrow \frac{\hat{v}_j(k,f)[\hat{\Lambda}_j(f)]_{ii}}{\sum_{l=1}^{J} \hat{v}_l(k,f)[\hat{\Lambda}_l(f)]_{ii}} [y'(k,f)]_i \quad (383)$$

The single channel Wiener filter unit 840 updates the estimation value $\hat{x}'_j(k, f)$ of the source signal component subjected to simultaneous decorrelation (Step S132).

The simultaneous decorrelation inverse conversion unit 880 calculates the estimation value $\hat{x}_j(k, f)$ of the source signal component by expression (384) (Step S133).

$$\hat{x}_j(k,f) \leftarrow (P(f)^{-1})^H \hat{x}'_j(k,f) \quad (384)$$

The time domain conversion unit 330 performs processing similar to that in the seventh embodiment to calculate (Step S134) and output the estimation value $\hat{x}_j(t)$ of the source signal component of the time domain.

Effect of Eighth Embodiment

In the third embodiment, signal processing is performed based on only directivity of sound. On the other hand, in the eighth embodiment, signal analysis is performed while considering a structure (parts) of sound, so that accuracy in sound source separation can be improved.

The eighth embodiment exhibits the effect that a permutation problem is not caused in principle. In the eighth embodiment, processing is performed while considering what kinds of parts are present in all frequencies, so that processing is not independently performed for each frequency, and the permutation problem is not caused in principle.

[System Configuration and the Like]

The constituent elements of the devices illustrated in the drawings are merely conceptual, and it is not requested that they be physically configured as illustrated necessarily. That is, specific forms of distribution and integration of the devices are not limited to those illustrated in the drawings. All or part thereof may be functionally or physically distributed and/or integrated in any units depending on various loads and/or usage states. Furthermore, all or any part of the processing functions performed by each device may be implemented by a CPU and a computer program that is analyzed and executed by the CPU, or implemented as hardware based on wired logic.

Among the pieces of processing described in the embodiments, all or some of the pieces of the processing described as being automatically performed can be manually performed, or all or some of the pieces of the processing described as being manually performed can be automatically performed using a known method. The processing procedures, the control procedures, the specific names, and the information including various pieces of data and parameters described herein or illustrated in the drawings can be optionally changed unless otherwise specifically noted. That is, the processing described in the learning method and the voice recognition method described above is not only performed in the described order on a time-series basis, but also may be performed in parallel or individually as needed or depending on a processing capacity of a device that performs the processing.

[Computer Program]

Figure 23:
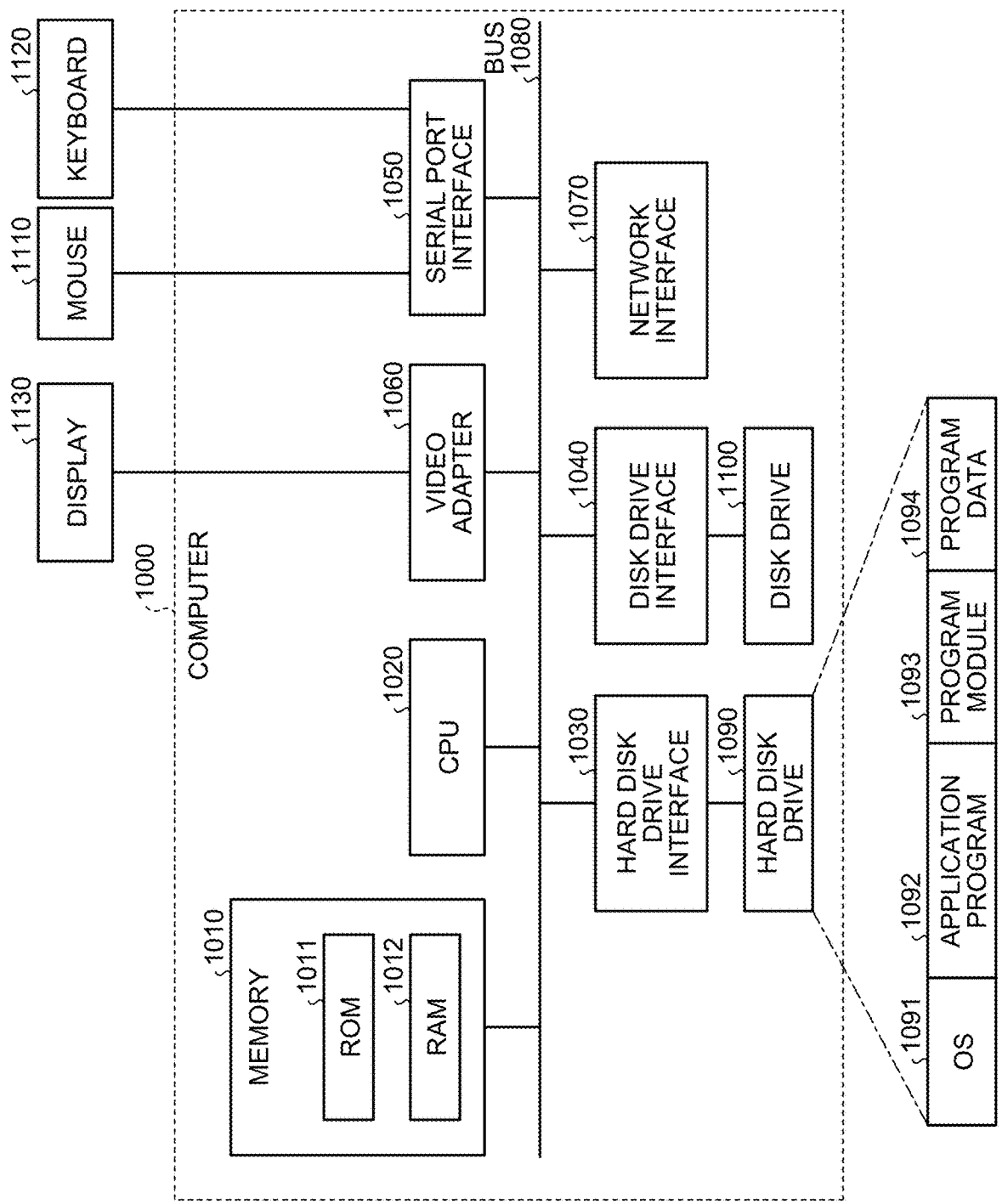
FIG. 23 is a diagram illustrating an example of a computer in which a computer program is executed to implement a signal analysis device.
Figure 24:
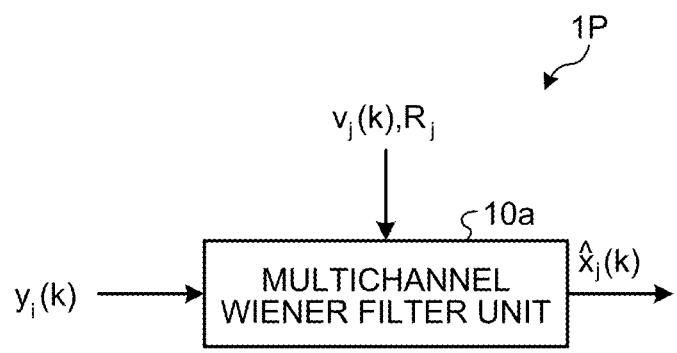
FIG. 24 is a diagram illustrating a configuration of a conventional signal analysis device.

FIG. 23 is a diagram illustrating an example of a computer in which a computer program is executed to implement the signal analysis devices 1, 201, 301, 401, 501, and 601. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are connected to each other via a bus 1080.

The memory 1010 includes a ROM 1011 and a RAM 1012. The ROM 1011 stores therein, for example, a boot program such as Basic Input Output System (BIOS). The hard disk drive interface 1030 is connected to a hard disk drive 1090. The disk drive interface 1040 is connected to a disk drive 1100. For example, a removable storage medium such as a magnetic disk and an optical disc is inserted into the disk drive 1100. The serial port interface 1050 is connected, for example, to a mouse 1110 and a keyboard 1120. The video adapter 1060 is connected to a display 1130, for example.

The hard disk drive 1090 stores therein, for example, an operating system (OS) 1091, an application program 1092, a program module 1093, and program data 1094. That is, a computer program that specifies each of the pieces of processing performed by the signal analysis devices 1, 201, 301, 401, 501, and 601 is implemented as the program module 1093 in which a code that can be executed by the computer 1000 is written. The program module 1093 is stored in the hard disk drive 1090, for example. For example, the hard disk drive 1090 stores therein the program module 1093 for executing processing similar to the functional configuration of each of the signal analysis devices 1, 201, 301, 401, 501, and 601. The hard disk drive 1090 may be replaced with a solid state drive (SSD).

Setting data used for the processing in the embodiments described above is stored in the memory 1010 or the hard disk drive 1090, for example, as the program data 1094. The CPU 1020 then reads the program module 1093 or the program data 1094 stored in the memory 1010 or the hard disk drive 1090 into the RAM 1012 to be executed, as needed.

The program module 1093 and the program data 1094 are not necessarily stored in the hard disk drive 1090, but may be stored in a removable storage medium and read by the CPU 1020 via the disk drive 1100 and the like, for example. Alternatively, the program module 1093 and the program data 1094 may be stored in another computer connected via a network (a local area network (LAN), a wide area network (WAN), and the like). The program module 1093 and the program data 1094 may be read out from another computer by the CPU 1020 via the network interface 1070.

The embodiments to which the invention made by the present inventors is applied are described above, but the present invention is not limited to the description and the drawings constituting part of the disclosure of the present invention according to the embodiments. That is, other embodiments, examples, operation techniques, and the like that are performed by those skilled in the art based on the embodiments are all encompassed by a scope of the present invention.

DESCRIPTION OF SIGNS

1, 201, 301, 401, 501, 601, 801 Signal analysis device
10, 210, 410, 510, 610, 710, 810 Observation signal vector creation unit
20, 220, 420, 520, 620, 720, 820 Signal parameter analysis unit
30, 230, 430, 530, 630, 730, 830 Simultaneous decorrelation unit
40, 240, 540, 640, 750, 840 Single channel Wiener filter unit
50, 280, 580, 680, 880 Simultaneous decorrelation inverse conversion unit
250, 550, 760 Posterior covariance matrix update unit
260, 440, 560, 780, 860 Variance parameter update unit
270, 450, 570, 790, 870 Spatial covariance matrix update unit
310 Frequency domain conversion unit
320 Frequency domain signal separation unit
330 Time domain conversion unit
650, 850 Observation covariance matrix update unit
740 Signal presence posterior probability update unit
770 Mixture weight update unit
800 Source signal component estimation unit

The invention claimed is:

1. A signal analysis device comprising:
a memory; and
processing circuitry coupled to the memory and configured to:
obtain, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a simultaneous decorrelation matrix P as a matrix in which all $P^H R_j P$ are diagonal matrices, or/and Hermitian transposition $P^H$ thereof, as a parameter for decorrelating components corresponding to the J source signals for observation signal vectors based on observation signals acquired at I (I is an integral number equal to or larger than 2) different positions, wherein the source signals are sound, brain waves, or radio signals.

2. The signal analysis device according to claim 1, wherein the processing circuitry is further configured to obtain, for the spatial covariance matrix $R_j$ (j is an integral number equal to or larger than 1 and equal to or smaller than J), the simultaneous decorrelation matrix P as a matrix that is obtained so that all $P^H R_j P$ become closer to diagonal matrices, or/and the Hermitian transposition $P^H$ thereof, as a parameter for decorrelating the components corresponding to the J source signals for the observation signal vectors based on the observation signals acquired at I (I is an integral number equal to or larger than 2) different positions.

3. The signal analysis device according to claim 1, wherein the processing circuitry is further configured to update an estimation value of the simultaneous decorrelation matrix P based on a fixed point method, a gradient method, a natural gradient method, or a Newton's method.

4. The signal analysis device according to claim 1, wherein the processing circuitry is further configured to obtain a simultaneously decorrelated observation signal vector in which the components corresponding to the J source signals are decorrelated by multiplying the Hermitian transposition $P^H$ of the simultaneous decorrelation matrix P obtained by observation signal vectors based on I input observation signals.

5. The signal analysis device according to claim 4, wherein the processing circuitry is further configured to obtain a vector based on a simultaneously decorrelated source signal component estimation value by applying, to each element of the simultaneously decorrelated observation signal vector obtained, a single channel Wiener filter based on a diagonal component of a matrix $P^H R_j P$ (j is an integral number equal to or larger than 1 and equal to or smaller than J) based on the simultaneous decorrelation matrix P.

6. The signal analysis device according to claim 5, wherein the processing circuitry is further configured to obtain an estimation value of a source signal component by multiplying the vector based on the simultaneously decorrelated source signal component estimation value obtained by an inverse matrix of the Hermitian transposition $P^H$ of the simultaneous decorrelation matrix P.

7. A signal analysis device comprising:
a memory; and
processing circuitry coupled to the memory and configured to:
obtain a simultaneous decorrelation matrix P as a matrix including I (I is an integral number equal to or larger than 2) different generalized eigenvectors $p_1, \ldots, p_I$ as column vectors satisfying $p_i^H R_2 p_m = 0$ (i and m are any integral numbers equal to or larger than 1 and equal to or smaller than I different from each other) for spatial covariance matrices $R_1$ and $R_2$ for modeling spatial characteristics of two source signals that are present in a mixed manner, or Hermitian transposition $P^H$ thereof, as a parameter for decorrelating components corresponding to two source signals for observation signal vectors based on observation signals acquired at I positions, wherein the source signals are sound, brain waves, or radio signals.

8. The signal analysis device according to claim 7, wherein the processing circuitry is further configured to obtain a simultaneously decorrelated observation signal vector in which components corresponding to two source signals are decorrelated by multiplying the Hermitian transposition $P^H$ of the simultaneous decorrelation matrix P obtained by observation signal vectors based on I input observation signals.

9. The signal analysis device according to claim 8, wherein the processing circuitry is further configured to obtain a vector based on a simultaneously decorrelated source signal component estimation value by applying, to each element of the simultaneously decorrelated observation signal vector obtained, a single channel Wiener filter based on a diagonal component of a matrix $P^H R_j P$ (j is 1 or 2) based on the simultaneous decorrelation matrix P.

10. The signal analysis device according to claim 9, wherein the processing circuitry is further configured to obtain an estimation value of a source signal component by multiplying the vector based on the simultaneously decorrelated source signal component estimation value obtained by an inverse matrix of the Hermitian transposition $P^H$ of the simultaneous decorrelation matrix P.

11. A signal analysis device comprising:
a memory; and
processing circuitry coupled to the memory and configured to:
obtain a simultaneously decorrelated observation signal vector in which components corresponding to J source signals are decorrelated by assuming, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a matrix P in which all $P^H R_j P$ become diagonal matrices as a simultaneous decorrelation matrix for decorrelating components corresponding to the J source signals for observation signal vectors based on observation signals acquired at I (I is an integral number equal to or larger than 2) different positions, and multiplying Hermitian transposition of the simultaneous decorrelation matrix by the observation signal vector, wherein the source signals are sound, brain waves, or radio signals.

12. The signal analysis device according to claim 11, wherein the processing circuitry is further configured to obtain a vector based on a simultaneously decorrelated source signal component estimation value by applying, to each element of the simultaneously decorrelated observation signal vector obtained, a single channel Wiener filter based on a diagonal component of a matrix $P^H R_j P$ (j is an integral number equal to or larger than 1 and equal to or smaller than J) based on the simultaneous decorrelation matrix P.

13. The signal analysis device according to claim 12, wherein the processing circuitry is further configured to obtain an estimation value of a source signal component by multiplying the vector based on the simultaneously decorrelated source signal component estimation value obtained by an inverse matrix of the Hermitian transposition $P^H$ of the simultaneous decorrelation matrix P.

14. A signal analysis device comprising:
a memory; and
processing circuitry coupled to the memory and configured to:
obtain a spatial covariance matrix as a parameter for modeling a spatial characteristic of a source signal based on a covariance matrix subjected to simultaneous decorrelation obtained from J (J is an integral number equal to or larger than 2) source signals that are present in a mixed manner, and obtain a variance parameter as a parameter for modeling a variance for each sample point of the source signal based on the covariance matrix subjected to simultaneous decorrelation, wherein the source signals are sound, brain waves, or radio signals.

15. The signal analysis device according to claim 14, wherein the processing circuitry is further configured to obtain the spatial covariance matrix or/and the variance parameter using an auxiliary function method.

16. A signal analysis method executed by a computer, the signal analysis method comprising:
obtaining, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a simultaneous decorrelation matrix P as a matrix in which all $P_H R_j P$ are diagonal matrices, or/and Hermitian transposition $P^H$ thereof, as a parameter for decorrelating components corresponding to the J source signals for observation signal vectors based on observation signals acquired at I (I is an integral number equal to or larger than 2) different positions, wherein the source signals are sound, brain waves, or radio signals.

17. A signal analysis method executed by a computer, the signal analysis method comprising:
obtaining a simultaneous decorrelation matrix P as a matrix including I (I is an integral number equal to or larger than 2) different generalized eigenvectors $p_1, \ldots, p_I$ as column vectors satisfying $p_i^H R_2 p_m = 0$ (i and m are any integral numbers equal to or larger than 1 and equal to or smaller than I different from each other) for spatial covariance matrices $R_1$ and $R_2$ for modeling spatial characteristics of two source signals that are present in a mixed manner, or Hermitian transposition $P^H$ thereof, as a parameter for decorrelating components corresponding to two source signals for observation signal vectors based on observation signals acquired at I positions, wherein the source signals are sound, brain waves, or radio signals.

18. A signal analysis method executed by a computer, the signal analysis method comprising:

obtaining a simultaneously decorrelated observation signal vector in which components corresponding to J source signals are decorrelated by assuming, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a matrix P in which all $P_H R_j P$ become diagonal matrices as a simultaneous decorrelation matrix for decorrelating components corresponding to the J source signals for observation signal vectors based on observation signals acquired at I (I is an integral number equal to or larger than 2) different positions, and multiplying Hermitian transposition of the simultaneous decorrelation matrix by the observation signal vector, wherein the source signals are sound, brain waves, or radio signals.

19. A signal analysis method executed by a computer, the signal analysis method comprising:

obtaining a spatial covariance matrix as a parameter for modeling a spatial characteristic of a source signal based on a covariance matrix subjected to simultaneous decorrelation obtained from J (J is an integral number equal to or larger than 2) source signals that are present in a mixed with manner, and obtain a variance parameter as a parameter for modeling a variance for each sample point of the source signal based on the covariance matrix subjected to simultaneous decorrelation, wherein the source signals are sound, brain waves, or radio signals.

20. A non-transitory computer-readable recording medium storing therein a signal analysis program that causes a computer to execute a process comprising:

obtaining, for a spatial covariance matrix $R_j$ (j is an integral number equal to or larger than 1 and equal to or smaller than J) for modeling spatial characteristics of J (J is an integral number equal to or larger than 2) source signals that are present in a mixed manner, a simultaneous decorrelation matrix P as a matrix in which all $P^H R_j P$ are diagonal matrices, or/and Hermitian transposition $P^H$ thereof, as a parameter for decorrelating components corresponding to the J source signals for observation signal vectors based on observation signals acquired at I (I is an integral number equal to or larger than 2) different positions, wherein the source signals are sound, brain waves, or radio signals.

* * * * *